US011635607B2

(12) United States Patent
Song et al.

(10) Patent No.: US 11,635,607 B2
(45) Date of Patent: Apr. 25, 2023

(54) SPECTROSCOPIC SINGLE-MOLECULE LOCALIZATION MICROSCOPY

(71) Applicant: Northwestern University, Evanston, IL (US)

(72) Inventors: Ki-Hee Song, Evanston, IL (US); Cheng Sun, Evanston, IL (US); Hao F. Zhang, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 17/323,302

(22) Filed: May 18, 2021

(65) Prior Publication Data
US 2021/0396982 A1 Dec. 23, 2021

Related U.S. Application Data

(60) Provisional application No. 63/027,140, filed on May 19, 2020, provisional application No. 63/026,465, filed on May 18, 2020.

(51) Int. Cl.
*G02B 21/16* (2006.01)
*G01N 21/64* (2006.01)
(Continued)

(52) U.S. Cl.
CPC ......... *G02B 21/16* (2013.01); *G01N 21/6458* (2013.01); *G02B 5/04* (2013.01);
(Continued)

(58) Field of Classification Search
CPC ................................................. G02B 21/367
See application file for complete search history.

(56) References Cited

U.S. PATENT DOCUMENTS 5,808,791 A * 9/1998 Kawano ................ G02B 21/14
  359/368
7,636,158 B1 * 12/2009 Pawluczyk ........... G01J 3/0208
  356/326
(Continued)

FOREIGN PATENT DOCUMENTS

WO  WO 2016/049544  3/2016
WO  WO 2017/027818  2/2017
WO  WO-2018085531 A2 * 5/2018 ............ G01J 3/0205

OTHER PUBLICATIONS

Hagen et al. Compound prism design principles, I, Applied Optics vol. 50, No. 25, pp. 4998-5011 (Year: 2011).*
(Continued)

*Primary Examiner* — David P Porta
*Assistant Examiner* — Meenakshi S Sahu
(74) *Attorney, Agent, or Firm* — Leydig, Voit & Mayer, Ltd.

(57) ABSTRACT

A method of microscopy comprises collecting an emission light; symmetrically dispersing the collected emission light into a first order ("$1^{st}$") light and a negative first order ("$-1^{st}$") light using a grating; wherein the $1^{st}$ light comprises spectral information and the $-1^{st}$ light comprises spectral information; capturing the $1^{st}$ light and the $-1^{st}$ light using a camera, localizing the one or more light-emitting materials using localization information determined from both the first spectral image and the second spectral image; and determining spectral information from the one or more light-emitting materials using the first spectral image and/or the second spectral image; wherein the steps of localizing and obtaining are performed simultaneously. A spectrometer for a microscope comprises a dual-wedge prism ("DWP") for receiving and spectrally dispersing a light beam, wherein the
(Continued)

DWP comprises a first dispersive optical device and a second dispersive optical device adhered to each other.

20 Claims, 34 Drawing Sheets
(33 of 34 Drawing Sheet(s) Filed in Color)

(51) Int. Cl.
  *G02B 21/36* (2006.01)
  *G02B 5/04* (2006.01)
  *G02B 27/14* (2006.01)
(52) U.S. Cl.
  CPC ............ *G02B 21/36* (2013.01); *G02B 21/367* (2013.01); *G02B 27/149* (2013.01); *G01N 2021/6417* (2013.01); *G01N 2201/0638* (2013.01)

(56) References Cited

U.S. PATENT DOCUMENTS

| | | | |
|---|---|---|---|
| 7,880,149 B2 | 2/2011 | Bewersdorf et al. | |
| 10,830,639 B2 | 11/2020 | Urban et al. | |
| 2004/0125228 A1* | 7/2004 | Dougherty | G02B 9/62 348/345 |
| 2018/0088048 A1 | 3/2018 | Dong et al. | |

OTHER PUBLICATIONS

Deschout et al. Precisely and accurately localizing single emitters in fluorescence microscopy, Nature Methods vol. 11, No. 3, pp. 253-266 (Year: 2014).*
Banterle et al. (2013) "Fourier ring correlation as a resolution criterion for super-resolution microscopy," Journal of Structural Biology 183, 363-367.
Bongiovanni et al. (2016) "Multi-dimensional super-resolution imaging enables surface hydrophobicity mapping," Nat Commun 7, 13544, doi: 10.1038/ncomms13544.
Comtet et al. (Mar. 2019) "Wide-Field Spectral Super-Resolution Mapping of Optically Active Defects in Hexagonal Boron Nitride," Nano Letters 19, 4, 2516-2523, doi:10.1021/acs.nanolett.9b00178.
Davis et al. (Feb. 2020) "Super-Resolution Imaging of Self-Assembled Nanocarriers Using Quantitative Spectroscopic Analysis for Cluster Extraction," Langmuir 36, 9, 2291-2299, doi:10.1021/acs.langmuir.9b03149.
Dempsey et al. (2011) "Evaluation of fluorophores for optimal performance in localization-based super-resolution imaging," Nature Methods 8, 1027-1036.
Deschout et al. (2014) "Precisely and accurately localizing single emitters in fluorescence microscopy," Nature Methods 11, 253-266.
Dong et al. (2016) "Super-resolution spectroscopic microscopy via photon localization," Nat Commun 7, 12290, doi:10.1038/ncomms12290.
Dong et al. (2017) "Parallel three-dimensional tracking of quantum rods using polarization-sensitive spectroscopic photon localization microscopy," ACS Photonics 4, 1747-1752.
Ebeling et al. (2015) "Increased localization precision by interference fringe analysis," Nanoscale 7, 10430-10437.
Feng et al. (2012) "Chromatically-corrected, high-efficiency, multicolour, multi-plane 3D imaging," Opt. Express 20, 20705-20714.
HOWARD (1985) "Formulas for the coma and astigmatism of wedge prisms used in converging light," Appl. Opt. 24, 4265-4268, doi:10.1364/AO.24.004265.
Huang et al. (2018) "Simultaneous multicolor single-molecule tracking with single-laser excitation via spectral imaging," Biophysical Journal 114, 301-310.
Kakizuki et al. (2016) "Simultaneous nano-tracking of multiple motor proteins via spectral discrimination of quantum dots," Biomedical Optics Express 7, 2475-2493.
Kao et al. (1994) "Tracking of single fluorescent particles in three dimensions: use of cylindrical optics to encode particle position," Biophysical Journal 67, 1291-1300.
Kurvits et al. (2015) "Comparative analysis of imaging configurations and objectives for Fourier microscopy," J Opt Soc Am A Opt Image Sci Vis 32, 2082-2092, doi:10.1364/JOSAA.32.002082.
Lee et al. (2018) "Mapping surface hydrophobicity of α-synuclein oligomers at the nanoscale," Nano Letters 18, 7494-7501 (2018).
Long et al. (2014) "Effects of fixed pattern noise on single molecule localization microscopy," Physical Chemistry Chemical Physics 16, 21586-21594.
Mlodzianoski et al. (2016) "Super-Resolution Imaging of Molecular Emission Spectra and Single Molecule Spectral Fluctuations," PLoS One 11, e0147506, doi:10.1371/journal.pone.0147506.
Ovesný et al. (2014) "ThunderSTORM: a comprehensive ImageJ plug-in for PALM and STORM data analysis and super-resolution imaging," Bioinformatics 30, 2389-2390.
Prabhat et al. (2004) "Simultaneous imaging of different focal planes in fluorescence microscopy for the study of cellular dynamics in three dimensions," IEEE Trans Nanobioscience 3, 237-242, doi:10.1109/tnb.2004.837899.
Rieger et al. (2014) "The Lateral and Axial Localization Uncertainty in Super-Resolution Light Microscopy," ChemPhysChem 15, 664-670, doi:10.1002/cphc.201300711.
Song et al. (2018) "Theoretical analysis of spectral precision in spectroscopic single-molecule localization microscopy," Review of Scientific Instruments 89, 123703, doi:10.1063/1.5054144.
Song et al. (May 2019) "Three-dimensional biplane spectroscopic single-molecule localization microscopy," Optica vol. 6, Issue 6, 709-715; doi.org/10.1364/OPTICA.6.000709).
Song et al. (May 2020) "Symmetrically dispersed spectroscopic single-molecule localization microscopy," Light: Science & Applications 9, 92, doi:10.1038/s41377-020-0333-9.
Suzuki et al. (2002) "Imaging of the fluorescence spectrum of a single fluorescent molecule by prism-based spectroscopy," FEBS Letters 512, 235-239, doi:https://doi.org/10.1016/S0014-5793(02)02269-X.
Zhang et al. (2015) "Ultrahigh-throughput single-molecule spectroscopy and spectrally resolved super-resolution microscopy," Nature Methods 12, 935-938, doi:10.1038/nmeth.3528.
Zhang et al. (2018) "Far-red photoactivatable BODIPYs for the super-resolution imaging of live cells," Journal of the American Chemical Society 140, 12741-12745.
Zhang et al. (Mar. 2019) "Multicolor super-resolution imaging using spectroscopic single-molecule localization microscopy with optimal spectral dispersion," Applied Optics 58(9): 2248-2255, doi:10.1364/AO.58.002248.

* cited by examiner

Spatial beam path 0.41 µm　　0.01 µm　　1.83 µm
(21.95 µm)　(26.83 µm)　(31.71 µm)

Spectral beam path 1.05 µm　　0.01 µm　　1.86 µm
(21.95 µm)　(26.83 µm)　(31.71 µm)

▨ From SD-sSMLM
▨ From zeroth order

FIG. 8A  FIG. 8C  FIG. 8B

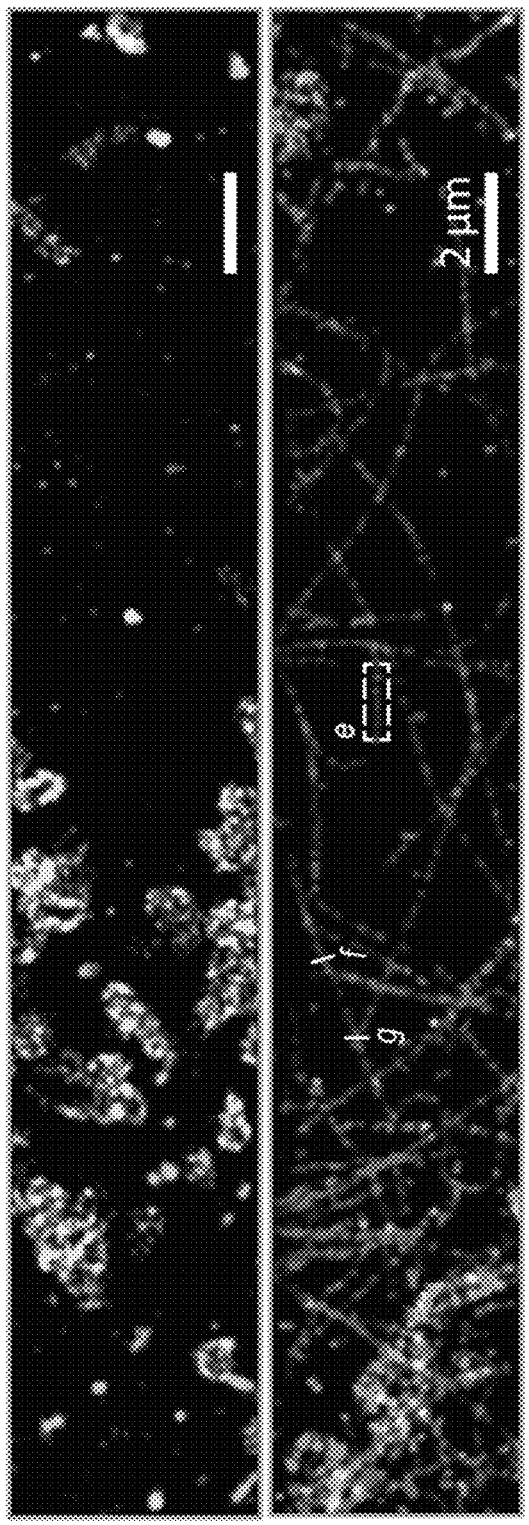
FIG. 12C
FIG. 12D
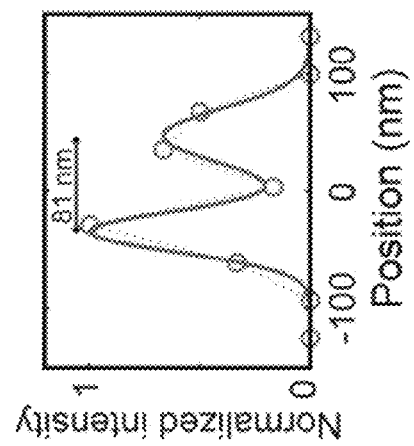
FIG. 12G
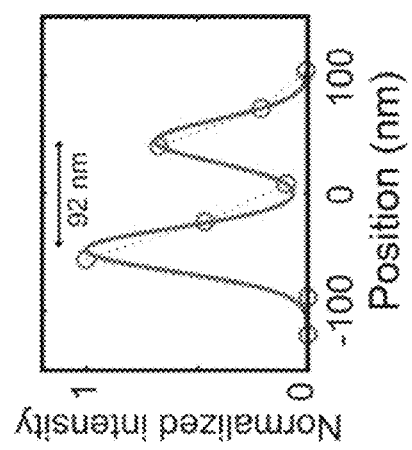
FIG. 12F
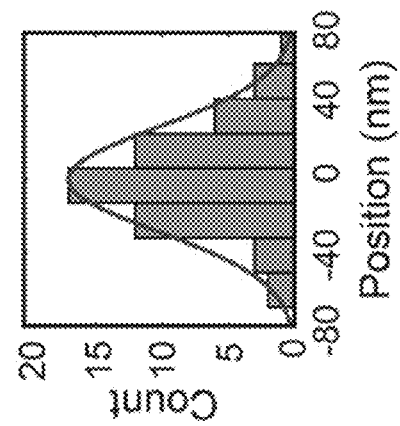
FIG. 12E

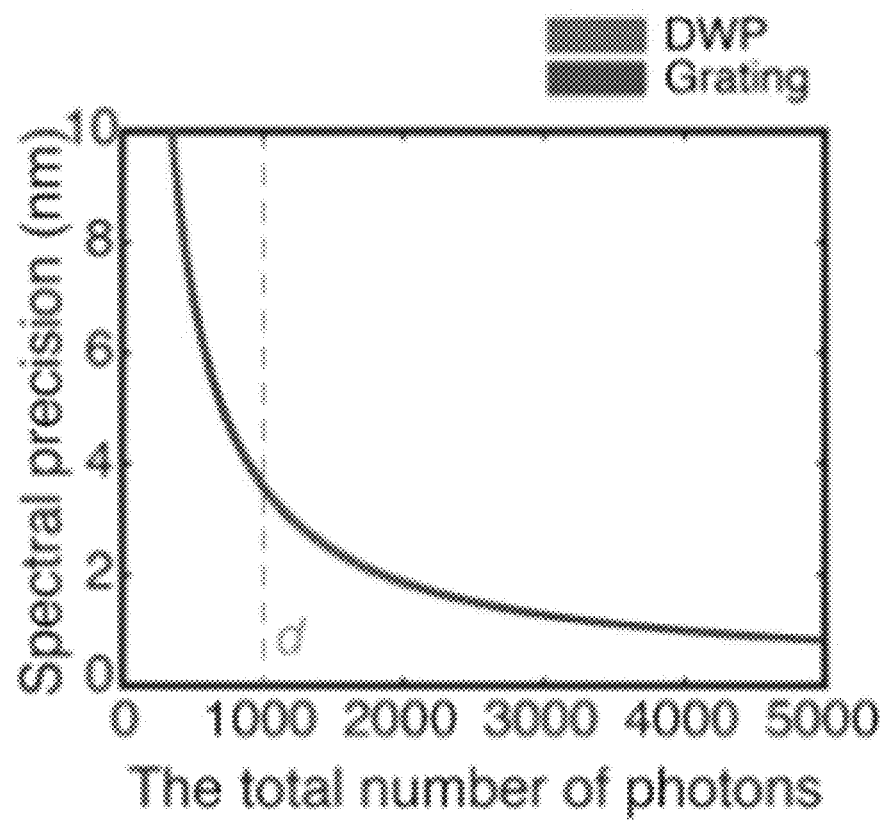
FIG. 20B
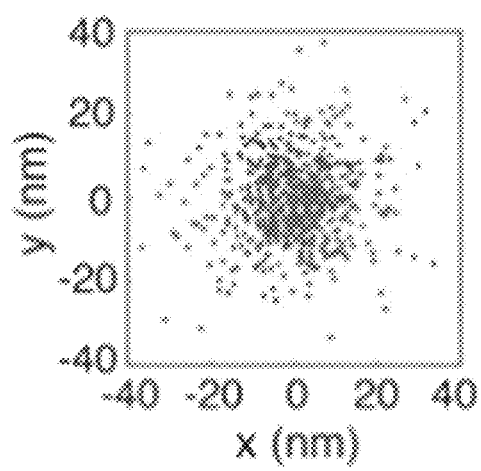 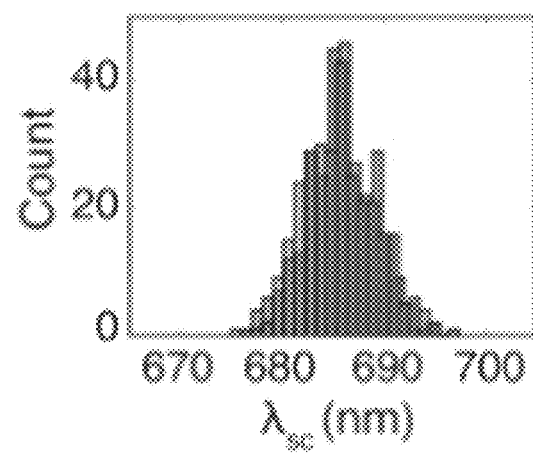
FIG. 20C     FIG. 20D

SPECTROSCOPIC SINGLE-MOLECULE LOCALIZATION MICROSCOPY

CROSS-REFERENCE TO RELATED APPLICATIONS

This application claims the benefit of priority to U.S. Provisional Patent Application Nos. 63/026,465 filed May 18, 2020, and 63/027,140 filed May 19, 2020, each of which is hereby incorporated by reference in its entirety to the extent not inconsistent herewith.

STATEMENT REGARDING FEDERALLY SPONSORED RESEARCH OR DEVELOPMENT

This invention was made with government support under Award Numbers NSF 1706642 and NSF 1830969 awarded by the National Science Foundation and under Award Numbers NIH EY026078, NIH EY029121, and NIH EY028304 awarded by the National Institutes of Health. The government has certain rights in the invention.

BACKGROUND OF INVENTION

Spectroscopic single-molecule localization microscopy (sSMLM) simultaneously captures and accumulates spatial and spectral information of single-molecule fluorescence to reconstruct super-resolution images of multiple molecular contrasts simultaneously. It has become a powerful tool in cell biology and material science. The ability of spectroscopic single-molecule localization microscopy (sSMLM) to capture the spectroscopic signatures of individual molecules along with their spatial distribution allows the observation of subcellular structures and dynamics at the nanoscale. As a result, sSMLM has shown great potential in understanding fundamental biomolecular processes in cell biology and material science. It also enables the characterization of nanoparticle properties based on the emission spectrum at the single-particle level.

Similar to other localization-based super-resolution techniques, such as stochastic optical reconstruction microscopy (STORM) and point accumulation for imaging in nanoscale topography (PAINT), the localization precision of sSMLM is fundamentally limited by the number of collected photons per emitter. However, typical sSMLM techniques suffer from further photon budget constraints since the collected photons of each molecule need to be divided into two separate channels to simultaneously capture the spatial and spectral information. Thus, the spatial localization precision of typical sSMLM also depends on the splitting ratio between the spatial and spectral channels and is typically limited to 15-30 nm in cell imaging. The splitting of photons into two channels in typical sSMLM forces an inherent trade-off between the spatial and spectral localization precisions. Currently, a method to fully utilize the full photon budget to maximize both the spatial and spectral localization precisions in sSMLM is lacking.

Compared with traditional single-molecule localization microscopy (SMLM) recording only the spatial information, sSMLM introduces additional dispersive optical components, such as prisms or diffraction gratings, to collect the associated spectral signatures. The prism-based sSMLM system used a beam splitter and discrete optical components to divide the collected photons into two separate optical beam paths (one for spatial image and another for spectral image). The increased number of air/dielectric interfaces results in higher photon loss. And the stringent requirements for aligning these discrete optical components further compromise the system reliability. Users need to have sophisticated optical alignment skills to achieve and maintain optimal performances, which imposed challenges to biological researchers. In contrast, the grating-based sSMLM system unifies the photon-splitting and dispersion functions using a blazed diffraction grating. Typically, it separates the incident beam into the $0^{th}$ and $1^{st}$ diffraction orders, which typically corresponds to the spatial and spectral images, respectively. The reduced number of discrete components favorably improves system reliability and footprint. The linear dispersion of the grating brings an additional benefit to the ease of spectral analysis. However, the grating-based design also has limitations. Specifically, the large angular offset between the $0^{th}$ and $1^{st}$ diffraction orders violates the paraxial condition, making the resulting spatial or spectral image vulnerable to geometrical and chromatic aberrations. Both aberrations may undermine the accuracy or precision of the reconstructed image and spectra analysis. Moreover, gratings generally have higher transmission losses (~30%) than prisms, which reduce the photon budgets and imaging resolution in sSMLM.

Accordingly, there is a need in the art for methods, components, and systems (spectrometers, microscopes, etc.) that address the above issues, such as by utilizing captured photons more efficiently, reducing photon loss, and increasing precision.

SUMMARY OF THE INVENTION

The methods, components, and systems, including spectrometers and microscopes, disclosed herein overcome these and other challenges in the art, particularly in the art of single-molecule localization microscopy and spectroscopic single-molecule localization microscopy.

The trade-off in typical sSMLM techniques associated with the division of captured photons between spatial and spectral channels is addressed herein using a symmetrically dispersed sSMLM, or SDsSMLM, which has two symmetrically dispersed spectral channels (e.g., $1^{st}$ order diffraction and $-1^{st}$ order diffraction) instead of one spatial and one spectral channel. SDsSMLM fully utilizes all collected photons for both spatial localization and spectral analysis. The associated methods and systems demonstrate, as described below, superior spatial and spectral precisions compared to typical or traditional spectroscopic single-molecule localization microscopy (sSMLM) techniques.

The above described challenges associated with typical sSMLM, such as a high number of air/dielectric interfaces, stringent requirements for aligning many discrete optical components, and the geometrical and chromatic aberrations in typical grating-based sSMLM, are addressed herein using a spectrometer comprising a dual-wedge prism, which reduces the number of discrete optical components for simplified optical configuration and alignment, significantly reduced transmission loss, and potentially higher system reliability.

Aspects of the invention include a method of microscopy comprising: collecting an emission light emitted by one or more light-emitting materials, symmetrically dispersing the collected emission light into a first order ("1st") light and a negative first order ("$-1^{st}$") light using a grating; wherein the $1^{st}$ light comprises spectral information and the $-1^{st}$ light comprises spectral information; capturing the $1^{st}$ light and the $-1^{st}$ light using a camera, wherein the $1^{st}$ light and the $-1^{st}$ light are captured simultaneously by the camera; the step of capturing comprising simultaneously forming a first spectral image using the captured $1^{st}$ light and a second spectral image using the captured $-1^{st}$ light; localizing the one or more light-emitting materials using localization information determined from both the first spectral image and the second spectral image; determining spectral information from the one or more light-emitting materials using the first spectral image and/or the second spectral image; wherein the steps of localizing and obtaining are performed simultaneously. Optionally in any method or system of the invention, the localization information is determined using at least 85%, preferably at least 90%, more preferably at least 95%, still more preferably at least 99%, further more preferably at least 99.9%, of photons from the captured $1^{st}$ light and $-1^{st}$ light. Optionally in any method or system of the invention, the step of localizing comprising generating a virtual spatial image using the first spectral image and the second spectral image; wherein the virtual spatial image comprises localization information from the one or more light-emitting materials. Optionally in any method or system of the invention, the first spectral image comprises one or more first spots, each of the one or more first spots corresponding to the emission light captured from each of the one or more light-emitting materials, respectively; wherein the second spectral image comprises one or more second spots, each of the one or more second spots corresponding to the emission light captured from each of the one or more light-emitting materials; and wherein generating the virtual spatial image comprises: determining one or more first centroid positions for the one or more first spots and determining one or more second centroid positions for the one or more second spots; and aligning the one or more first centroid positions and the one or more second centroid positions. Optionally in any method or system of the invention, the virtual spatial image is an image generated using two spectral images. Optionally in any method or system of the invention, photons of the collected emission light are not divided or split into or between a spectral channel and a spatial channel. Optionally in any method or system of the invention, the method does not comprise forming a non-virtual (or non-calculated) spatial image or spatial information, which is free of spectral information. Optionally in any method of microscopy or microscopy system described herein, the emission light or collected light comprises visible light or light having wavelength(s) selected from the range of 450 nm to 750 nm. Optionally in any method of microscopy or microscopy system described herein, the emission light or collected light substantially consists of visible light or light having wavelength(s) selected from the range of 450 nm to 750 nm. Generally, any method of microscopy or microscopy system described herein can be tuned to be compatible with any emission light wavelength, or ranges thereof, such as, but not limited to, wavelengths in the visible light range.

Optionally in any method or system of the invention, the $1^{st}$ light and the $-1^{st}$ light comprises at least 85%, preferably at least 90%, more preferably at least 95%, still more preferably at least 99%, further more preferably at least 99.9%, of photons of the collected emission light and wherein said at least 85% of photons are captured by said camera to form the first and second spectral images. Optionally in any method or system of the invention, the first spectra image and the second spectral image are mirror images with respect to each other. Optionally in any method or system of the invention, the step of symmetrically dispersing is performed according to a splitting ratio of photons of the $1^{st}$ light to photons of the $-1^{st}$ light, wherein the splitting ratio is 1:1.

Optionally in any method or system of the invention, the method comprises repeating at least the steps of collecting an emission light, symmetrically dispersing the collected emission light, capturing the $1^{st}$ light and the $-1^{st}$ light using the camera, localizing the one or more light-emitting materials, and determining spectral information; wherein the method further comprises combining the determined localization information from each repetition to improve a precision of the localization information or reduce a value of the spatial resolution of the localization information; and wherein the method further comprises combining the spectral information determined from each repetition to reduce a value of the spectral resolution of the spectral information. Optionally in any method or system of the invention, the method comprising illuminating a target, wherein the target comprises the one or more light-emitting materials, to activate the one or more light-emitting materials. Optionally in any method or system of the invention, illuminating the target comprises stochastically photoswitching the activated one or more light emitting materials.

Optionally in any method or system of the invention, the one or more light emitting materials is selected from the group consisting of one or more: polymers, proteins, nucleic acids, lipids, carbohydrates, cells, subcellular organelles, subcellular structures, extracellular structures, nanofabricated structures, nanoparticles, quantum dots, nanostructures, semiconductor chips, crystals, and any combination thereof.

Optionally in any method or system of the invention, the method comprising displaying the first spectral image, the second spectral image, and/or the virtual spatial image. Optionally in any method or system of the invention, the method displaying the virtual spatial image. Optionally in any method or system of the invention, the method comprising identifying a composition and/or one or more characteristics of the one or more light emitting materials based on the determined spectral information. Optionally in any method or system of the invention, the identified one or more characteristics is selected from the group consisting of: a structural characteristic, a chemical characteristic, a structural defect, a chemical defect, a target quality, a disease, a disease state, a sequence, a molecular formula, a molecular structure, and any combination thereof.

Optionally in any method or system of the invention, the method performing a spectral calibration on each of the first spectral image and second spectral image and generating a calibrated first spectral image and a calibrated second spectral image, respectively; wherein the virtual spatial image is generated using the calibrated first spectral image and the calibrated second spectral image.

Optionally in any method or system of the invention, the method or system is characterized by a field of view that is 90 µm or less by 15 µm or less, optionally 60 µm or less by 10 µm or less, 30 µm or less by 5 µm or less. Optionally in any method or system of the invention, the spectral information is characterized by a spectral resolution of 5 nm or less, preferably 3 nm or less, more preferably 2 nm or less, more preferably 1 nm or less, still more preferably 0.8 nm or less, over at least a portion of the wavelength range of the spectral information, preferably over the entire wavelength range of the spectral information. Optionally in any method or system of the invention, the portion of the wavelength range of the spectral information is at least 20 nm wide, preferably at least 50 nm wide, more preferably at least 80 nm wide, still more preferably at least 100 nm wide, further more preferably at least 150 nm wide, further more preferably at least 175 nm wide. Optionally in any method or system of the invention, the localization information is characterized by a spatial resolution of 30 nm or less, preferably 25 nm or less, more preferably 20 nm or less, more preferably 15 nm or less, still more preferably 10 nm or less.

Optionally in any method or system of the invention, the localization information comprises three-dimensional localization information and wherein the spectral information comprises three-dimensional spectral information. Optionally in any method or system of the invention, the method or system comprising spatially tracking the one or more light-emitting materials using the three-dimensional localization information.

Optionally in any method or system of the invention, the grating is a phase grating.

Optionally in any method or system of the invention, the step of symmetrically dispersing further comprises dispersing the collected emission light into a $0^{th}$ order light and the step of capturing further comprises capturing the $0^{th}$ order light using the camera.

Aspects of the invention include a microscopy system comprising: a collection optics for collecting an emission light emitted by one or more light-emitting materials; a grating for symmetrically dispersing the collected emission light into a first order ($1^{st}$) light and a negative first order ($-1^{st}$) light; wherein the $1^{st}$ light comprises spectral information and the $-1^{st}$ light comprises spectral information; and a camera for capturing the $1^{st}$ light and the $-1^{st}$ light, wherein the $1^{st}$ light and the $-1^{st}$ light are captured simultaneously by the camera; wherein the system is configured to simultaneously form a first spectral image using the captured $1^{st}$ light and a second spectral image using the captured $-1^{st}$ light; wherein the system is configured to localize the one or more light-emitting materials using localization information determined from both the first spectral image and the second spectral image; wherein the system is configured to determine spectral information from the one or more light-emitting materials using the first spectral image and/or the second spectral image; wherein the system is configured to simultaneously localize the one or more light-emitting materials and determine the spectral information from the one or more light-emitting materials. Optionally in any method or system of the invention, the method or system comprising a non-transitory computer-readable storage medium including instructions, which, when executed, cause at least one processor to at least localize the one or more light-emitting materials and determine the spectral information from the one or more light-emitting materials. Optionally in any method or system of the invention, the system is configured determine the localization information via generating a virtual spatial image using the first spectral image and the second spectral image; wherein the virtual spatial image comprises localization information from the one or more light-emitting materials. Optionally in any method or system of the invention, the first spectral image comprises one or more first spots, each of the one or more first spots corresponding to the emission light captured from each of the one or more light-emitting materials, respectively; wherein the second spectral image comprises one or more second spots, each of the one or more second spots corresponding to the emission light captured from each of the one or more light-emitting materials; and wherein the system is configured to generate the virtual spatial image via: determining one or more first centroid positions for the one or more first spots and determining one or more second centroid positions for the one or more second spots; and aligning the one or more first centroid positions and the one or more second centroid positions. Optionally in any method of microscopy or microscopy system described herein, the emission light or collected light comprises visible light or light having wavelength(s) selected from the range of 450 nm to 750 nm. Optionally in any method of microscopy or microscopy system described herein, the emission light or collected light substantially consists of visible light or light having wavelength(s) selected from the range of 450 nm to 750 nm. Generally, any method of microscopy or microscopy system described herein can be tuned to be compatible with any emission light wavelength, or ranges thereof, such as, but not limited to, wavelengths in the visible light range.

Optionally in any method or system of the invention, the $1^{st}$ light and the $-1^{st}$ light comprises at least 85%, preferably at least 90%, more preferably at least 95%, still more preferably at least 99%, further more preferably at least 99.9%, of photons of the collected emission light and wherein said at least 85% of photons are captured by said camera to form the first and second spectral images. Optionally in any method or system of the invention, the first spectra image and the second spectral image are mirror images with respect to each other. Optionally in any method or system of the invention, the system symmetrically disperses according to a splitting ratio of photons of the $1^{st}$ light to photons of the $-1^{st}$ light, wherein the splitting ratio is 1:1.

Optionally in any method or system of the invention, the system is configured to perform repetitions of collecting an emission light, symmetrically dispersing the collected emission light, capturing the $1^{st}$ light and the $-1^{st}$ light using the camera, localizing the one or more light-emitting materials, and determining spectral information; wherein the system is further configure to combine the determined localization information from each repetition to improve a precision of the localization information or reduce a value of the spatial resolution of the localization information; and wherein the system is further configured to combine the spectral information determined from each repetition to reduce a value of the spectral resolution of the spectral information.

Optionally in any method or system of the invention, the system or method comprising a light source configured to illuminate a target, wherein the target comprises the one or more light-emitting materials, to activate the one or more light-emitting materials. Optionally in any method or system of the invention, the system or method comprising a display for displaying the first spectral image, the second spectral image, and/or the virtual spatial image. Optionally in any method or system of the invention, the system is configured to identify a composition and/or one or more characteristics of the one or more light emitting materials based on the determined spectral information. Optionally in any method or system of the invention, the system is configured to perform a spectral calibration on each of the first spectral image and second spectral image and generate a calibrated first spectral image and a calibrated second spectral image, respectively; wherein the virtual spatial image is generated using the calibrated first spectral image and the calibrated second spectral image.

Optionally in any method or system of the invention, the system is characterized by a field of view that is 90 μm or less by 15 μm or less. Optionally in any method or system of the invention, the spectral information is characterized by a spectral resolution of 3 nm or less over at least a portion of the wavelength range of the spectral information. Optionally in any method or system of the invention, the portion of the wavelength range of the spectral information is at least 20 nm wide. Optionally in any method or system of the invention, the localization information is characterized by a spatial resolution of 30 nm or less. Optionally in any method or system of the invention, the localization information comprises three-dimensional localization information and wherein the spectral information comprises three-dimensional spectral information. Optionally in any method or system of the invention, the system is configured to spatially track the one or more light-emitting materials using the three-dimensional localization information. Optionally in any method or system of the invention, the grating is a phase grating.

Aspects of the invention include a spectrometer for a microscope, the spectrometer comprising: a beam splitter for splitting an incident light into a first beam and a second beam; wherein a light incident to the spectrometer first interacts with the beam splitter; a light-reflecting device for receiving the first beam and redirecting said first beam to a first image plane; wherein: the first beam forms a spatial image at the first image plane; and the first beam and the spatial image comprise spatial information; and a dual-wedge prism ("DWP") for receiving the second beam, spectrally dispersing the second beam into a third beam, and directing the third beam to a second image plane; wherein: the third beam forms a spectral image at the second image plane; the third beam and the spectral image comprise spectral information; the first image plane and the second image plane are parallel or substantially parallel; the first image plane and the second image plane are perpendicular to an optical axis; the DWP comprises a first dispersive optical device and a second dispersive optical device such that the second beam interacts with the first dispersive optical device and the third beam exits the second dispersive optical device of the DWP. Preferably, the first beam has normal or near normal incidence at the first image plane. Preferably, the third beam has normal or near normal incidence at the second image plane. Preferably, the first image plane and the second image plane are parallel to each other to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°. Optionally in any spectrometer or microscope or method using said spectrometer disclosed herein, the beam splitter is a cube beam splitter. Optionally in any spectrometer or microscope or method using said spectrometer disclosed herein, the light-reflecting device is a prism or a right-angle prism. Optionally in any spectrometer or microscope or method using said spectrometer disclosed herein, in the first dispersive optical device is a first wedge prism. Optionally in any spectrometer or microscope or method using said spectrometer disclosed herein, the second dispersive optical device is a second wedge prism. Optionally in any spectrometer or microscope or method using said spectrometer disclosed herein, the redirected first light beam, after it exits the light-reflecting device, is parallel to the optical axis. Optionally in any spectrometer or microscope or method using said spectrometer disclosed herein, the third light beam is parallel to the optical axis. Optionally in any spectrometer or microscope or method using said spectrometer disclosed herein, each of the redirected first light beam, after it exits the light-reflecting device, and the third light beam is independently parallel to the optical axis. For example, the first light beam is optionally parallel to the optical axis to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°. For example, the third light beam is optionally parallel to the optical axis to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°. Optionally in any method, spectrometer, or microscope having a spectrometer described herein, any of the first, second, and third light beams comprises visible light or light having wavelength(s) selected from the range of 450 nm to 750 nm. Optionally in any method, spectrometer, or microscope having a spectrometer described herein, any of the first, second, and third light beams substantially consists of visible light or light having wavelength(s) selected from the range of 450 nm to 750 nm. Generally, any method, spectrometer, or microscope having a spectrometer described herein can be tuned to be compatible with any emission light wavelength, or ranges thereof, such as, but not limited to, wavelengths in the visible light range.

A spectrally dispersed light beam, such as a dispersed beam exiting the DWP, such as the third beam, may comprise light having a plurality of directions, angles, or vectors, such as with respect to an optical axis or with respect to an axis of the beam immediately prior to being dispersed or with respect to an average axis or direction of the beam, each direction, angle, or vector corresponding to a wavelength or subset of wavelengths of the dispersed beam, allowing for the dispersed beam to form, be measured as, or be collected as a spectral image. A spectrally dispersed light beam, such as a dispersed beam exiting the DWP, such as the third beam, may be optionally characterized as comprising a plurality of sub-beams having a common origin (e.g., immediately prior to the respective beam being dispersed) and each sub-beam having its own direction, angle, or vector and comprising a wavelength or subset of wavelengths from the original beam prior to it being dispersed.

Where any two of features, light beams, and axes (e.g., two light beams being parallel, two axes being parallel, or a light beam and an axis being parallel) are characterized as parallel, the term parallel generally refers to the two being parallel to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°.

Aspects of the invention include a spectrometer for a microscope, the spectrometer comprising: a beam splitter for splitting an incident light into a first beam and a second beam; wherein: a light incident to the spectrometer first interacts with the beam splitter; the first beam forms a spatial image at a first image plane; and the first beam and the spatial image comprise spatial information; and a dual-wedge prism ("DWP") for receiving the second beam, spectrally dispersing the second beam into a third beam, and directing the third beam to a second image plane; wherein: the third beam forms a spectral image at the second image plane; the third beam and the spectral image comprise spectral information; the first image plane and the second image plane are parallel; the first image plane and the second image plane are each independently perpendicular to an optical axis; and the DWP comprises a first dispersive optical device and a second dispersive optical device such that the second beam interacts with the first dispersive optical device and the third beam exits the second dispersive optical device of the DWP. Optionally, the first beam has normal or near normal incidence at the first image plane. Optionally, the third beam has normal or near normal incidence at the second image plane. Optionally, the first image plane and the second image plane are parallel to each other to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°. Optionally in any method, spectrometer, or microscope having a spectrometer described herein, any of the first, second, and third light beams comprises visible light or light having wavelength(s) selected from the range of 450 nm to 750 nm. Optionally in any method, spectrometer, or microscope having a spectrometer described herein, any of the first, second, and third light beams substantially consists of visible light or light having wavelength(s) selected from the range of 450 nm to 750 nm. Generally, any method, spectrometer, or microscope having a spectrometer described herein can be tuned to be compatible with any emission light wavelength, or ranges thereof, such as, but not limited to, wavelengths in the visible light range.

Optionally in any spectrometer, microscope having said spectrometer, or method using said spectrometer disclosed herein, the spectrometer comprises: a light-reflecting device for receiving the second beam from the beam splitter and redirecting said second beam to the DWP; wherein the DWP receives the second beam from the light-reflecting device. The latter spectrometer configuration may be referred to as a second configuration. Optionally in any spectrometer, microscope having said spectrometer, or method using said spectrometer disclosed herein, such as in the case of a spectrometer having the second configuration, the first dispersive optical device is characterized by a refractive index that is equal to or within 0.5 (referring to an absolute value of the difference), optionally equal to or within 0.1, optionally equal to or within 0.05, optionally equal to or within 0.03, optionally equal to or within 0.02, optionally equal to or within 0.01, optionally equal to or within 0.005, optionally equal to or within 0.002, optionally equal to or within 0.001, of a refractive index of the second dispersive optical device at a same wavelength (such as 550 nm). The particular difference between the refractive indices of the two dispersive optical devices may vary or be tuned depending on the wavelength(s) of light being collected or measured (e.g., the wavelength(s) of the first, second, and third beams). For example, the refractive difference of the two wedge prisms at 550 nm may be −0.001, the difference at 450 nm may be 0.0132, and the difference at 650 nm may be −0.0067. For example, the first wedge prism refractive indices at 450 nm, 550 nm, and 650 nm may be 1.8191, 1.791, and 1.7767, respectively. For example, the second wedge prism refractive indices at 450 nm, 550 nm, and 650 nm may be 1.8059, 1.792, 1.7834, respectively. Optionally in any spectrometer, microscope having said spectrometer, or method using said spectrometer disclosed herein, such as in the case of a spectrometer having the second configuration, the first dispersive optical device is characterized by a refractive index that is equal to or within 0.5 (referring to an absolute value of the difference), optionally equal to or within 0.1, optionally equal to or within 0.05, optionally equal to or within 0.03, optionally equal to or within 0.02, optionally equal to or within 0.01, optionally equal to or within 0.005, optionally equal to or within 0.002, optionally equal to or within 0.001, of a refractive index of the second dispersive optical device at a same wavelength (such as 550 nm); and wherein the first dispersive optical device is characterized by a chromatic dispersion different from that of the second dispersive optical device. Optionally in any spectrometer, microscope having said spectrometer, or method using said spectrometer disclosed herein, such as in the case of a spectrometer having the second configuration, the first beam comprises a portion of the incident light that is transmitted by the beam splitter toward the first image plane and wherein the second beam comprises a portion of the incident light that is reflected by the light-reflecting device onto the DWP. Optionally in any spectrometer, microscope having said spectrometer, or method using said spectrometer disclosed herein, such as in the case of a spectrometer having the second configuration: the incident light is incident onto a first side of the beam splitter; the first beam exits the beam splitter at a third side of the beam splitter toward the first image plane; the second beam exists the beam splitter at a second side of the beam splitter; after the second beam exists the beam splitter, the second beam is incident onto a first side of the light-reflecting device and the second beam exits a second side of the light-reflecting device; after exiting the light-reflecting device, the second beam is incident onto a first side of the first dispersive optical device; photons from the second beam pass from a second side of the first dispersive optical device to a first side of the second dispersive optical device; and the third beam exists at a second side of the second dispersive optical device. Optionally in any spectrometer, microscope having said spectrometer, or method using said spectrometer disclosed herein, such as in the case of a spectrometer having the second configuration, the second side of the beam splitter is adhered to the first side of the light-reflecting device and wherein the second side of the light-reflecting device is adhered to the first side of the first dispersive optical device.

Optionally in any spectrometer, microscope having said spectrometer, or method using said spectrometer disclosed herein, the spectrometer comprises: a light-reflecting device for receiving the first beam from the beam splitter and redirecting said first beam to the first image plane; wherein the DWP receives the second beam from the beam splitter. The latter spectrometer configuration may be referred to as a first configuration. Optionally in any spectrometer, microscope having said spectrometer, or method using said spectrometer disclosed herein, such as in the case of a spectrometer having the first configuration, the first dispersive optical device is characterized by a refractive index that is different from a refractive index of the second dispersive optical device by an absolute value greater than 0.1, optionally the absolute value selected from the range of 0.1 to 0.4, optionally the absolute value selected from the range of 0.2 to 0.3, at a same wavelength (such as 550 nm). Optionally in any spectrometer, microscope having said spectrometer, or method using said spectrometer disclosed herein, such as in the case of a spectrometer having the first configuration, the first beam comprises a portion of the incident light that is reflected by the beam splitter to the light-reflecting device and wherein the second beam comprises a portion of the incident light that is transmitted by the beam splitter on the DWP. Optionally in any spectrometer, microscope having said spectrometer, or method using said spectrometer disclosed herein, such as in the case of a spectrometer having the first configuration: the incident light is incident onto a first side of the beam splitter; the first beam exits the beam splitter at a second side of the beam splitter; the first beam is incident onto a first side of the light-reflecting device and the first beam exits a second side of the light-reflecting device toward the first image plane; the second beam exists the beam splitter at a third side of the beam splitter; the second beam is incident onto a first side of the first dispersive optical device; photons from the second beam pass from a second side of the first dispersive optical device to a first side of the second dispersive optical device; and the third beam exists at a second side of the second dispersive optical device toward the second image plane. Optionally in any spectrometer, microscope having said spectrometer, or method using said spectrometer disclosed herein, such as in the case of a spectrometer having the first configuration, the second side of the beam splitter is adhered to the first side of the light-reflecting device and wherein the third side of the beam splitter is adhered to the first side of the first dispersive optical device. Optionally in any spectrometer, microscope having said spectrometer, or method using said spectrometer disclosed herein, each of the first dispersive optical device and the second dispersive optical device is characterized by a refractive index selected from the range of 1.5 to 1.9.

Optionally in any spectrometer, microscope having said spectrometer, or method using said spectrometer disclosed herein, the beam splitter is a cube beam splitter. Optionally in any spectrometer, microscope having said spectrometer, or method using said spectrometer disclosed herein, the beam splitter is characterized by a 1:1 splitting ratio. Optionally in any spectrometer, microscope having said spectrometer, or method using said spectrometer disclosed herein, the light-reflecting device is a prism or a right-angle prism. Optionally in any spectrometer, microscope having said spectrometer, or method using said spectrometer disclosed herein, in the first dispersive optical device is a first wedge prism. Optionally in any spectrometer, microscope having said spectrometer, or method using said spectrometer disclosed herein, the second dispersive optical device is a second wedge prism. Optionally in any spectrometer, microscope having said spectrometer, or method using said spectrometer disclosed herein, the first dispersive optical device is characterized by a chromatic dispersion and/or a refractive index different from that of the second dispersive optical device, respectively.

Optionally in any spectrometer, microscope having said spectrometer, or method using said spectrometer disclosed herein, at least a portion of the first light beam is parallel to the optical axis at the first image plane. Optionally in any spectrometer, microscope having said spectrometer, or method using said spectrometer disclosed herein, the third light beam is parallel to the optical axis. Optionally in any spectrometer, microscope having said spectrometer, or method using said spectrometer disclosed herein, the third light beam is parallel to the optical axis at the second image plane. Optionally in any spectrometer or microscope or method using said spectrometer disclosed herein, at least a portion of each of the first beam and the third beam is independently parallel to the optical axis. For example, the first light beam at the first image plane is optionally parallel to the optical axis to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°. For example, the third light beam is optionally parallel to the optical axis at the second image plane to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°.

Optionally in some embodiments of a spectrometer or microscope or method using said spectrometer disclosed herein, the first beam comprises a portion of the incident light that is reflected by the beam splitter to the light-reflecting device and wherein the second beam comprises a portion of the incident light that is transmitted by the beam splitter on the DWP. Optionally in some embodiments of a spectrometer or microscope or method using said spectrometer disclosed herein: the incident light is incident onto a first side of the beam splitter; the first beam exits the beam splitter at a second side of the beam splitter; the first beam is incident onto a first side of the light-reflecting device and the first beam exits a second side of the light-reflecting device; the second beam exists the beam splitter at a third side of the beam splitter; the second beam is incident onto a first side of the first dispersive optical device; photons from the second beam pass from a second side of the first dispersive optical device to a first side of the second dispersive optical device; and the third beam exists at a second side of the second dispersive optical device. Optionally in some embodiments of a spectrometer or microscope or method using said spectrometer disclosed herein, the second side of the beam splitter is adhered to the first side of the light-reflective device (e.g., right angle prism). Optionally in some embodiments of a spectrometer or microscope or method using said spectrometer disclosed herein, the third side of the beam splitter is adhered to the first side of the first dispersive optical device. Optionally in some embodiments of a spectrometer or microscope or method using said spectrometer disclosed herein, the second side of the first dispersive optical device is adhered to the first side of the second dispersive optical device.

Optionally in any spectrometer or microscope or method using said spectrometer disclosed herein, any two sides adhered to each other are adhered via an optical adhesive (e.g., optical bonding).

Optionally in any spectrometer or microscope or method using said spectrometer disclosed herein, the spectrometer comprises the first image plane and/or the second image plane. Optionally in any spectrometer or microscope or method using said spectrometer disclosed herein, spectrometer comprises one or more cameras for capturing the spatial image and/or the spectral image. Optionally in any spectrometer or microscope or method using said spectrometer disclosed herein, the one or more cameras is a camera configured to capture both the spatial image and the spectral image. Optionally in any spectrometer or microscope or method using said spectrometer disclosed herein, the one or more cameras is a single camera configured to capture both the spatial image and the spectral image. Optionally in any spectrometer or microscope or method using said spectrometer disclosed herein, the spatial image and the spectral image are captured simultaneously. Optionally in any spectrometer or microscope or method using said spectrometer disclosed herein, the spectrometer does not comprise a grating. Optionally in any spectrometer or microscope or method using said spectrometer disclosed herein, the spectrometer does not comprise a lens.

Optionally in any spectrometer or microscope or method using said spectrometer disclosed herein, the incident light or an axis of the incident light is parallel to the optical axis. For example, the incident light beam is optionally parallel to the optical axis to within 5°, preferably to within 3°, more preferably to within 1°, still more preferably to within 0.5°, further more preferably to within 0.3°, still further more preferably to within 0.1°, yet more preferably within to 0.05°, still yet more preferably to within 0.03°, further still more preferably to within 0.01°, and further more preferably to within 0.005°.

Optionally in any spectrometer or microscope or method using said spectrometer disclosed herein, the first image plane and the second image plane are spatially separated along the optical axis by an image plane separation distance. Optionally in any spectrometer or microscope or method using said spectrometer disclosed herein, image plane separation distance is 4 mm±1 mm. Optionally in any spectrometer or microscope or method using said spectrometer disclosed herein, image plane separation distance is 5 mm±1 mm. Optionally in any spectrometer or microscope or method using said spectrometer disclosed herein, image plane separation distance is selected from the range of 3 to 6 mm. Optionally in any spectrometer or microscope or method using said spectrometer disclosed herein, the spectrometer or microscope is configured for determining bi-plane three-dimensional information using the spatial image and the spectral image.

Optionally in any spectrometer or microscope or method using said spectrometer disclosed herein, the spectrometer has at least one overall or external dimension (e.g., including claimed components and features according to certain embodiments) that is less than or equal to 100 mm, optionally less than or equal to 60 mm, optionally less than or equal to 50 mm, optionally less than or equal to 40 mm. Optionally in any spectrometer or microscope or method using said spectrometer disclosed herein, each of the overall or external length, width, and height of the spectrometer is independently is less than or equal to 100 mm, optionally less than or equal to 60 mm, optionally less than or equal to 50 mm, optionally less than or equal to 40 mm.

Optionally in any spectrometer or microscope or method using said spectrometer disclosed herein, the third beam at the second image plane is characterized by an error of less than or equal to 0.5 wave, optionally less than or equal to 0.3 wave, optionally less than or equal to 0.1 wave, optionally less than or equal to 0.08 wave. Optionally in any spectrometer or microscope or method using said spectrometer disclosed herein, the third beam at the second image plane is characterized by spectral dispersion selected from the range of 3±0.5 nm/pixel to 6±0.5 nm/pixel. Optionally in any spectrometer or microscope or method using said spectrometer disclosed herein, the third beam at the second image plane is characterized by spectral dispersion selected from the range of 2 to 4 nm/pixel. Optionally in any spectrometer or microscope or method using said spectrometer disclosed herein, the third beam at the second image plane is characterized by spectral dispersion selected from the range of 2 to 8 nm/pixel, optionally 3 to 6 nm/pixel, optionally 2 to 7 nm/pixel, optionally 3 to 7 nm/pixel. Optionally in any spectrometer or microscope or method using said spectrometer disclosed herein, the first beam at the first image plane is characterized by an RMS radius that is less than or equal to 0.5 µm, optionally less than or equal to 0.3 µm, optionally less than or equal to 0.2 µm, optionally less than or equal to 0.15 µm, optionally 0.147 µm RMS radius at 450 nm. Optionally in any spectrometer or microscope or method using said spectrometer disclosed herein, the spatial image is characterized by a spatial precision of 30 nm or less, preferably 25 nm or less, more preferably 20 nm or less, further more preferably 15 nm or less, still more preferably 10 nm or less, further more preferably 9 nm or less, further more preferably 8 nm or less, further more preferably 7 nm or less, further more preferably 6 nm or less, further more preferably 5 nm or less, still further more preferably 4.12 nm or less. Optionally in any spectrometer or microscope or method using said spectrometer disclosed herein, the spectral image is characterized by a spectral precision of 5 nm or less, preferably 3 nm or less, more preferably 2 nm or less, more preferably 1.9 nm or less, still more preferably 1 nm or less, further more preferably 0.8 nm or less. Optionally in any spectrometer or microscope or method using said spectrometer disclosed herein, a bi-plane three-dimensional information determined using the spectrometer is characterized by an axial precision of less than or equal to 30 nm, preferably less than or equal to 26.9 nm, more preferably less than or equal to 25.8 nm.

Aspects of the invention disclosed herein include a microscope comprising: a first optical assembly configured to collect a measurement light from one or more materials and direct at least a portion of the measurement light as the incident light to the spectrometer of any of the embodiments disclosed herein; the spectrometer of any of the embodiments disclosed herein; wherein: the spatial information is spatial information from the one or more materials; and the spectral information is spectral information from the one or more material; and one or more cameras for capturing the spatial image and the spectral image. Optionally in any spectrometer or microscope or method using said spectrometer disclosed herein, the measurement light is an emission light emitted by the one or more material; wherein the one more materials is one or more light-emitting material. Optionally in any spectrometer or microscope or method using said spectrometer disclosed herein, the microscope comprises a camera for capturing the spatial image and the spectral image. Optionally in any spectrometer or microscope or method using said spectrometer disclosed herein, the camera captures the spatial image and the spectral image simultaneously. Optionally in any spectrometer or microscope or method using said spectrometer disclosed herein, the microscope comprises a non-transitory computer-readable storage medium including instructions, which, when executed, cause at least one processor to at least localize the one or more materials using the spatial information from the one or more materials and to analyze the spectral information from the one or more materials. For example, the one or more materials can be one or more natural materials, synthetic or man-made materials, biological materials, organic materials, inorganic materials, compounds, molecules, biological cells, fluids, or any combination of these. Optionally in any method, spectrometer, or microscope having a spectrometer described herein, any of the first, second, and third light beams comprises visible light or light having wavelength(s) selected from the range of 450 nm to 750 nm. Optionally in any method, spectrometer, or microscope having a spectrometer described herein, any of the first, second, and third light beams substantially consists of visible light or light having wavelength(s) selected from the range of 450 nm to 750 nm. Generally, any method, spectrometer, or microscope having a spectrometer described herein can be tuned to be compatible with any emission light wavelength, or ranges thereof, such as, but not limited to, wavelengths in the visible light range.

Aspects of the invention disclosed herein include a method for imaging one or more materials, the method being performed using a microscope comprising the spectrometer of any of the embodiments disclosed herein. Optionally, the method for imaging comprises performing three-dimensional multi-color or spectral imaging of biological cells.

Also disclosed herein are any methods, including methods for imaging, spectroscopy, and/or localization, systems, microscopes, and spectrometers according to any one or any combination of any embodiments of methods, microscopes, and spectrometers disclosed herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2E: Simulated RMS wavefront errors of spatial and spectral beam paths in both designs. FIG. 2F: Wavelength-pixel shift relationship. We used a groove density of 50 grooves/mm showing a comparable SD value to the DWP-based design using off-the-shelf optics. Overall SD of bot designs is 3 nm/pixel. Scale bar: 30 µm in FIG. 2C and FIG. 2D.

FIGS. 8A-8B: First frame of the simultaneously captured spectral images of nanospheres from the $-1^{st}$ and $1^{st}$ spectral channels, respectively. FIG. 8C: Calculated virtual spatial image of the nanospheres.

FIG. 12C: Reconstructed multicolour SDsSMLM image of mitochondria (yellow) and peroxisomes (cyan). FIG. 12D: Reconstructed multicolour SDsSMLM image of microtubules labelled with AF647 (magenta) and mitochondria labelled with CF680 (green). FIG. 12E: Histogram of the cross-section highlighted by the white-dashed box in FIG. 12D. FIGS. 12F-12G: Intensity profiles of two imaged tubulin filaments highlighted by the white-solid lines in FIG. 12D.

FIG. 19C. Simulated RMS wavefront errors of spatial and spectral beam paths in both designs. FIG. 19D. Wavelength-pixel shift relationship. Simulated spot diagrams at different wavelengths (from the left to right: 450, 550, and 650 nm; from the top to bottom: spatial and spectral beam paths) for (FIG. 19E) the grating-based and (FIG. 19F) the DWP-based designs. We used a groove density of 50 grooves/mm showing a comparable SD value to the proposed DWP-based design using off-the-shelf optics. Overall SD of bot designs is 3 nm/pixel. Scale bar: 30 μm in FIGS. 19E and 19F.

FIG. 20C. Scatterplot of spatial precision and (FIG. 20D) histogram of spectral precision of both designs at 1000 photons.

STATEMENTS REGARDING CHEMICAL COMPOUNDS AND NOMENCLATURE

Figure 1A:
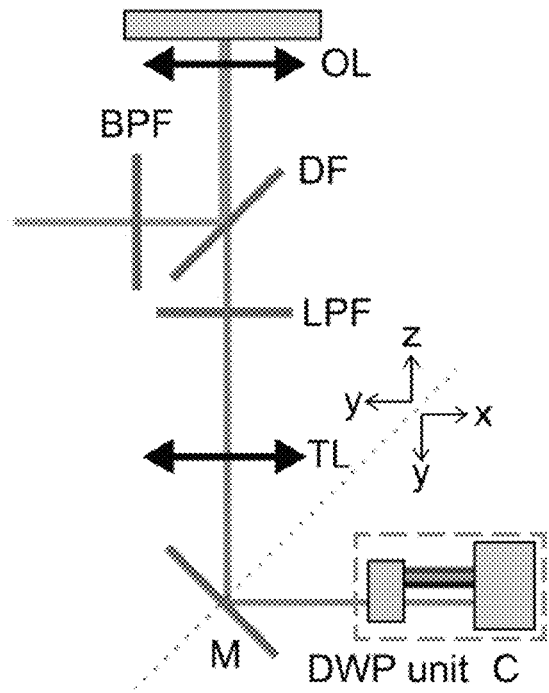
FIG. 1A: Schematic of the 3D sSMLM system with a DWP-containing spectrometer.

In general, the terms and phrases used herein have their art-recognized meaning, which can be found by reference to standard texts, journal references and contexts known to those skilled in the art, particularly in the art of single-molecule localization microscopy or spectroscopic single-molecule localization microscopy. The following definitions are provided to clarify their specific use in the context of the invention.

As known in the art of optics, light or spectral information that is characterized as "first order" or "$1^{st}$ order" refers to light or spectral information that corresponds to or has positive first order light (m=1, where m is an integer representing the propagation-mode or diffraction order) formed by or dispersed by a diffraction grating. As known in the art of optics, light or spectral information that is characterized as "negative first order" or "$-1^{st}$ order" refers to light or spectral information that corresponds to or has negative first order (m=−1) light formed by or dispersed by a diffraction grating. Light or spectral information characterized as "zero order" or "$0^{th}$ order" (m=0) corresponds to light that is transmitted, reflected, and/or refracted by or through a grating without dispersion or diffraction.

The term "microscope" is intended to be consistent with the term as known by one skilled in the relevant art, particularly in the art of single-molecule localization microscopy or spectroscopic single-molecule localization microscopy, and generally refers to an instrument or system that is used or is configured to be used to examine, visualize, and/or analyze objects, such as molecules or cells, that are too small to be seen by the naked human eye. The term "microscopy" is intended to be consistent with the term as known by one skilled in the relevant art, particularly in the art of single-molecule localization microscopy or spectroscopic single-molecule localization microscopy, and generally refers to the science or method utilizing a microscope to examine, visualize, and/or analyze objects, such as molecules or cells, that are too small to be seen by the naked human eye. The term "spectrometer" is intended to be consistent with the term as known by one skilled in the relevant art, particularly in the art of single-molecule localization microscopy or spectroscopic single-molecule localization microscopy, and generally refers to a scientific instrument used to or configured to separate and measure, collected, and/or analyze spectral components of a physical phenomenon. For example, a spectrometer may be used to measure intensity of a light (or more generally, electromagnetic spectrum), such as a collected emission light, as a function of wavelength or frequency of the light (or more generally, electromagnetic spectrum).

The term "grating" refers to an optical device or component recognized as such in the field of optics, particularly in the art of spectroscopy or spectroscopic single-molecule localization microscopy, and comprising a structural pattern (e.g., slits, grooves, or other) that facilitates the splitting, diffracting, and/or dispersing of light into multiple beams of light traveling in different directions (or, at different angles or vectors relative to each other). In some embodiments, a grating is a diffraction grating. In some embodiments, a grating is a diffraction grating characterized as a transmission amplitude diffraction grating, a reflection amplitude diffraction grating, phase diffraction grating, and/or an optical axis diffraction grating.

As used here, the term "localization" is intended to be consistent with the meaning of the term in the art of single-molecule localization microscopy, generally referring to determining a spatial information of one or more materials, compounds, cells, or molecules. Single-molecule localization refers to determining spatial information of a single molecule and/or characterized by a precision corresponding to ability to resolve a single molecule. Localization may be performed as part of a method and/or using a system or apparatus capable of or configured for localization.

The term "spatial information" refers to information or data corresponding to or comprising an absolute and/or relative location and/or spatial arrangement. In embodiments, spatial information does not comprise spectral or wavelength-resolved information. In embodiments, a spatial image comprises spatial information and does not comprise spectral or wavelength-resolved information.

The term "spectral information" refers to spectroscopic information or data comprising resolution of multiple wavelengths of the electromagnetic spectrum. In some embodiments, spectral information is not limited to one, two, or three discrete color channels selected from red, green, and blue, and instead comprises information or data having one or more continuous spectral ranges. In some embodiments, spectral information corresponds to spectroscopic information or data having multiple wavelengths which were dispersed using a grating, such as a diffraction grating, prism, or another device capable of dispersing or diffracting electromagnetic spectrum. A spectral image is an image comprising spectral information.

As used herein, the term "virtual spatial image" refers to an image, or data or information comprising an image or visual display, comprising spatial or localization information and which is formed, calculated, or determined from other data or information. In embodiments, a virtual spatial image is calculated from or using a combination of a plurality of spectral images, such as an image or spectral information corresponding to $1^{st}$ order light and an image or spectral information corresponding to $-1^{st}$ order light. In embodiments, a virtual spatial image is not a real image or an image formed directly by photons captured at a camera, but rather an image calculated from a plurality of images which are real or formed directly from photons captured by a camera.

The term "activating" refers to directly or indirectly inducing or causing a change in the electronic state of a material, compound, or molecule. Optionally, the material, compound, or molecule may be part of another material, compound, object, or a biological cell, for example. In some embodiments, a material, compound, or molecule may be activated by exposing the material, compound, or molecule to a light (photo-activated). In some embodiments, activating refers to excitation of a material, compound, or molecule to emit light, such as via fluorescence of the material, compound, or molecule.

The term "beam splitter" is intended to be consistent with the term as used in the art of optics and generally refers to an optical component or device that can split or divide a beam of light into separate beams of light, such as two separate beams of light.

The term "beam" refers to a light beam or beam of light as known and used in the field of optics, and particularly in the art of single-molecule localization microscopy or spectroscopic single-molecule localization microscopy.

The term "image plane" is intended to be consistent with the term as used in the field of optics, and particularly in the art of single-molecule localization microscopy or spectroscopic single-molecule localization microscopy, and generally refers to a spatial plane containing a projected image, or arrangement of photons that may form an image, or a collection of focus points of light rays coming from a material, compound, molecule, or other object.

The term "image" is intended to be consistent with the term as used in the field of optics, and particularly in the art of single-molecule localization microscopy or spectroscopic single-molecule localization microscopy, and generally refers to a collection of focus points of light rays coming from a material, compound, molecule, or other object. An image or data or information comprising an image generally indicates a visual display or any data representation that may be interpreted for visual display. For example, a three-dimensional image may include a dataset of values of a given quantity that varies in three spatial dimensions. A three-dimensional image (e.g., a three-dimensional data representation) may be displayed in two-dimensions (e.g., on a two-dimensional screen, or on a two-dimensional printout).

The term "simultaneously" is intended to refer to two or more events or processing occurring concurrently, rather than sequentially or otherwise at different times. For example, spectral and spatial information may be captured simultaneously on the same camera, such as by having a first portion of the camera's pixels capture photons corresponding to spatial or localization information and a second portion of the camera's pixels capture photos corresponding to spectral or spectroscopic information, This is in contrast to capturing photons for spatial information and photons for spectral information in sequential or otherwise time-separated events.

The term "substantially" refers to a property, condition, or value that is within 20%, 10%, within 5%, within 1%, optionally within 0.1%, or is equivalent to a reference parameter, property, condition, or value. The term "substantially equal", "substantially equivalent", or "substantially unchanged", when used in conjunction with a reference value describing a parameter, property, or condition, refers to a value that is within 20%, within 10%, optionally within 5%, optionally within 1%, optionally within 0.1%, or optionally is equivalent to the provided reference value. For example, a diameter is substantially equal to 100 mm (or, "is substantially 100 mm") if the value of the diameter is within 20%, optionally within 10%, optionally within 5%, optionally within 1%, within 0.1%, or optionally equal to 100 mm. The term "substantially greater", when used in conjunction with a reference value describing a parameter, property, or condition, refers to a value that is at least 1%, optionally at least 5%, optionally at least 10%, or optionally at least 20% greater than the provided reference value. The term "substantially less", when used in conjunction with a reference value describing a parameter, property, or condition, refers to a value that is at least 1%, optionally at least 5%, optionally at least 10%, or optionally at least 20% less than the provided reference value. As used herein, the terms "about" and "substantially" are interchangeable and have identical means. For example, a particle having a size of about 1 µm is understood to have a size is within 20%, optionally within 10%, optionally within 5%, optionally within 1%, optionally within 0.1%, or optionally equal to 1 µm.

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

The term "±" refers to an inclusive range of values, such that "X±Y," wherein each of X and Y is independently a number, refers to an inclusive range of values selected from the range of (X−Y) to (X+Y).

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The present disclosure provides three-dimensional (3D) spectroscopic single-molecule localization microscopy (sSMLM) module using a dual-wedge prism (DWP) lensless spectrometer. It simultaneously offers 3D spatial and spectral information of single molecules. The DWP-based spectrometer assembly disperses an incident beam without beam deviation, which allows for manufacturing a single unit of the optical element. It thus reduces the number of discrete optical components and complexity of the microscope system, as well as absolute transmission loss. By manufacturing it as a compact assembly, it ensures straightforward implementation and reliable operation of the 3D sSMLM system.

Brief Summary of Technology: Spectroscopic single-molecule localization microscopy (sSMLM) simultaneously provides spatial and spectral information of fluorescent molecules. Currently reported sSMLM implementation can be generally classified into 2 categories: (i) prism-based design, e.g. Zhang et al, Nature Methods, 12: 935-938 (2015); Mlodzianoski et al, Plos One, 11:e0147506 (2016); Comtet et al, Nano Letters, 19: 2516-2523 (2019); and (ii) grating-based design, e.g. Dong et al, Nature Communications, 7:12290 (2016); Bongiovanni et al, Nature Communications, 7:13544 (2016); Zhang et al, Applied Optics, 58: 2248-2255 (2010). Despite the popularity of the prism-based design, it still suffers from its inherent difficulty as it splits the collected photons into two separate optical beam paths using a beam splitter (BS) and additional discrete optical components, to simultaneously form spatial and spectral images, which imposes stringent requirement of precise alignment of the discrete optical components.

In contrast, the grating-based design addresses these practical issues. It uses a diffraction grating to separate an incident beam into $0^{th}$ and $1^{st}$ diffraction orders, of which being imaged onto a camera using the same imaging lens. This design, in general, significantly reduces the number of the discrete optical components and improves the reliability of the system, e.g. Davis et al, Langmuir, 36:2291-2299 (2020). However, the grating-based design has its own limitations. Specifically, the $1^{st}$ diffraction order beam has angular incidence with respect to the imaging lens (or an optical axis), which may undermine either accuracy or precision of the reconstructed image and the spectra analysis. This can be further problematic in the existing three-dimensional (3D) sSMLM techniques using astigmatism or biplane method as extra discrete optical elements, such as a cylindrical lens or pickoff mirrors, need to be added, e.g. Zhang et al, Nature Methods, 12: 935-938 (2015); Song et al, Optica, 6:709-715 (2019). Thus, despite the demonstrated capability of sSMLM in several applications, the reported studies are rather limited to the users with extensive expertise in optical instrumentations. More importantly, the grating has a significant absolute transmission loss, typically ~30%, which reduces the photon budget of single molecules. This accordingly restricts spatial and spectral precisions of the reconstructed image, e.g. Song et al, Optica, 6:709-715 (2019). Currently, this issue has not been fully addressed in the sSMLM implementation.

To make sSMLM broadly accessible by biology research community, we aim to develop a novel optical sSMLM design to overcome the above-mentioned issues by reducing the number of discrete optical components and complexity of the configuration, as well as transmission loss. Here, we thus propose a compact 3D sSMLM module using a DWP-based lensless spectrometer.

Commercialization: In a prism-based sSMLM design, it still suffers from its inherent difficulty as it splits the collected photons into two separate optical beam paths using a beam splitter and additional discrete optical components, to simultaneously form spatial and spectral images. Spectral analysis of the sSMLM technique requires a precise mapping of the recorded spatial and spectral images, which imposes stringent requirement of precise alignment of the discrete optical components. It thus requires users with delicate optical skills to make recurrent adjustments and alignments of the optical system. This invention addresses the above-mentioned issues by manufacturing the module in a single unit of optical element, which allows straightforward implementation and reliable operation of the 3D sSMLM system.

In a grating-based sSMLM, the $1^{st}$ diffraction order beam has angular incidence with respect to the imaging lens (or an optical axis), which may undermine uncertainty, either accuracy or precision, of the reconstructed image and the spectra analysis. This invention vastly minimizes absolute transmission efficiency using a dual-wedge prism spectrometer assembly. Accordingly, it increases the photon budget of each emitters and thus improves the uncertainty.

In addition, the field-of-view (FOV) is restricted by diffraction angle of a grating. This invention maximizes the FOV in a single camera configuration by disperse light parallel to the spatial beam path.

In existing sSMLM systems, in order to tune a spectral dispersion, one needs to replace a dispersive component itself (a prism or a grating) or modify the whole system configuration. This invention removes the necessity to replace any optical components as it can tune the SD by changing an inserting location of the module.

Aspects of this invention offer superior compatibility with an existing wide-field fluorescence microscope system due to its compactness and cost effectiveness. It also provides diverse multi-modal imaging functionalities including 3D, spectroscopic, and high-throughput single-molecule imaging. Thus, it can facilitate current super-resolution microscope market by reducing the cost to build the 3D sSMLM microscope system. In addition, aspects of this invention can be useful to observe a variety of features in cellular material for the molecular characterization of disease and nanomaterials.

This application incorporates by reference in its entirety, to the extent not inconsistent herewith, each of the following: U.S. Provisional Application No. 63/026,465 filed May 18, 2020, U.S. application Ser. No. 15/514,084 filed Mar. 24, 2017, U.S. application Ser. No. 15/584,018 filed May 1, 2017, Dong, et al. (Biqin Dong, Luay Almassalha, Ben E. Urban, The-Quyen Nguyen, Satya Khuon, Teng-Leong Chew, Vadim Backman, Cheng Sun, & Hao F. Zhang; "Super-resolution spectroscopic microscopy via photon localization"; Nature Communications volume 7, Article number: 12290 (2016); 10.1038/ncomms12290), and Song, et al. (Ki-Hee Song, Yang Zhang, Gaoxiang Wang, Cheng Sun, and Hao F. Zhang; "Three-dimensional biplane spec- The invention can be further understood by the following non-limiting examples.

Example 1: Dual-Wedge Prism-Based Monolithic Spectrometer for Three-Dimensional Spectroscopic Single-Molecule Localization Microscopy Spectroscopic single-molecule localization microscopy achieves simultaneous spectral analysis and super-resolution imaging using either an optical grating or a prism to enable. However, it suffers from intrinsic photon loss or nonlinear spectral dispersion respectively caused by grating and prism. We designed a novel dual-wedge prism (DWP)-based monolithic imaging spectrometer to overcome both obstacles. We optimized the DWP for spectrally dispersing focused beam without deviation and with minimal wavefront error. We integrated all components into a compact assembly, minimizing total transmission loss and significantly reducing optical alignment requirements. We show the feasibility of this DWP design using ray-tracing and numerical simulations. Comparing with existing grating-based designs, the DWP design improves lateral spatial precision by 44% (from 7.38 nm to 4.12 nm) and maintains a similar spectral precision (1.9 nm) at a photon budget of 2000. It also improves the axial precision by 28% (from 35.7 nm to 25.8 nm) in bi-plane 3D imaging. Also, we demonstrated its capability in 3D multi-color imaging using U2OS cells.

Spectroscopic single-molecule localization microscopy (sSMLM) simultaneously captures and accumulates spatial and spectral information of single-molecule fluorescence to reconstruct super-resolution images of multiple molecular contrasts simultaneously. It has become a powerful tool in cell biology and material science[1-7]. Compared with traditional single-molecule localization microscopy (SMLM) recording only the spatial information, sSMLM introduces additional dispersive optical components, such as prisms[1-3] or diffraction gratings[4-6], to collect the associated spectral signatures. The prism-based sSMLM system used a beam splitter and discrete optical components to divide the collected photons into two separate optical beam paths (one for spatial image and another for spectral image). The increased number of air/dielectric interfaces resulted in higher photon loss. And the stringent requirements for aligning these discrete optical components further compromise the system reliability. Users need to have sophisticated optical alignment skills to achieve and maintain optimal performances, which imposed challenges to biological researchers.

In contrast, the grating-based sSMLM system unifies the photon-splitting and dispersion functions using a blazed diffraction grating. It separates the incident beam into the $0^{th}$ and $1^{st}$ diffraction orders, which corresponds to the spatial and spectral images, respectively[5,6,8]. The reduced number of discrete components favorably improves system reliability and footprint. The linear dispersion of the grating brings an additional benefit to the ease of spectral analysis. However, the grating-based design has its limitations. Specifically, the large angular offset between the $0^{th}$ and $1^{st}$ diffraction orders violates the paraxial condition, making the resulting spatial or spectral image vulnerable to geometrical and chromatic aberrations [ref]. Both aberrations may undermine the accuracy or precision of the reconstructed image and spectra analysis. Moreover, gratings generally have higher transmission losses (~30%) than prisms, which reduce the photon budgets and imaging resolution in sSMLM[6,8,9].

The embodiments herein include a monolithic optical modular design that vastly reduces the number of discrete optical components for simplified optical configuration and alignment, significantly reduced transmission loss, and potentially higher system reliability. We designed a compact optical assembly using a dual-wedge prism (DWP), referred to as DWP spectrometer, to achieve 3D sSMLM with improved spatial precision.

DWP design. FIG. 1A shows the schematic of the 3D sSMLM system or spectrometer using a DWP-containing spectrometer. The overall system is based on an inverted optical microscope (Ti-U, Nikon) with an objective lens (OL, 100×, NA=1.49, CFI apochromat TIRF lens, Nikon) and a matching tube lens (TL). We placed a DWP-containing spectrometer between the TL and a scientific complementary metal-oxide-semiconductor (sCMOS) camera (Prime95B, Photometrics). The filter set comprises a band-pass filter (FF01-642/10-25, Semrock), a dichroic mirror (FF649-D101-25X36, Semrock), and a long-pass filter (BLP01-647R-25, Semrock) for fluorescent imaging. The fluorescence emission exiting the TL then passes a DWP-containing spectrometer to create spatial and spectral images. The term "DWP unit," as used in the Figures, refers to a spectrometer or portion of a spectrometer comprising a DWP and optionally also a beam splitter and/or light-reflective device, according to embodiments herein.

Figure 1C:
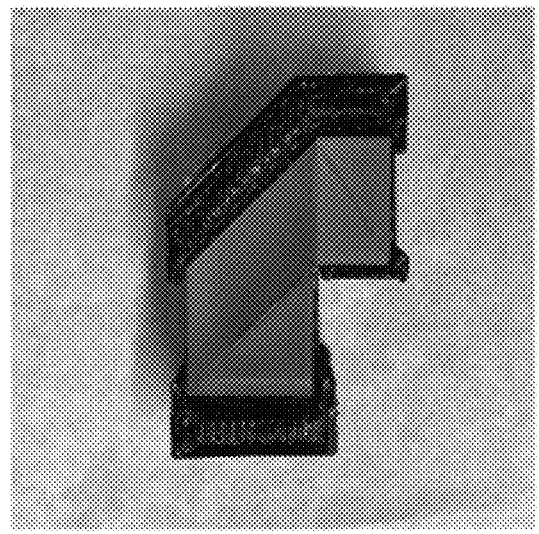
FIG. 1C: Picture of a DWP-containing spectrometer optical assembly, which comprises a customized DWP pair and a commercially available lateral beam splitter. BS: cube beam splitter; RP: right-angle prism; WP: wedge prism; AR: anti-reflection coating; OL: objective lens; BPF: band pass filter; DF: dichroic filter; LPF: long pass filter; TL: tube lens; M: mirror; DWP unit: dual-wedge prism unit; IP: Image plane; C: Camera plane.
Figure 1B:
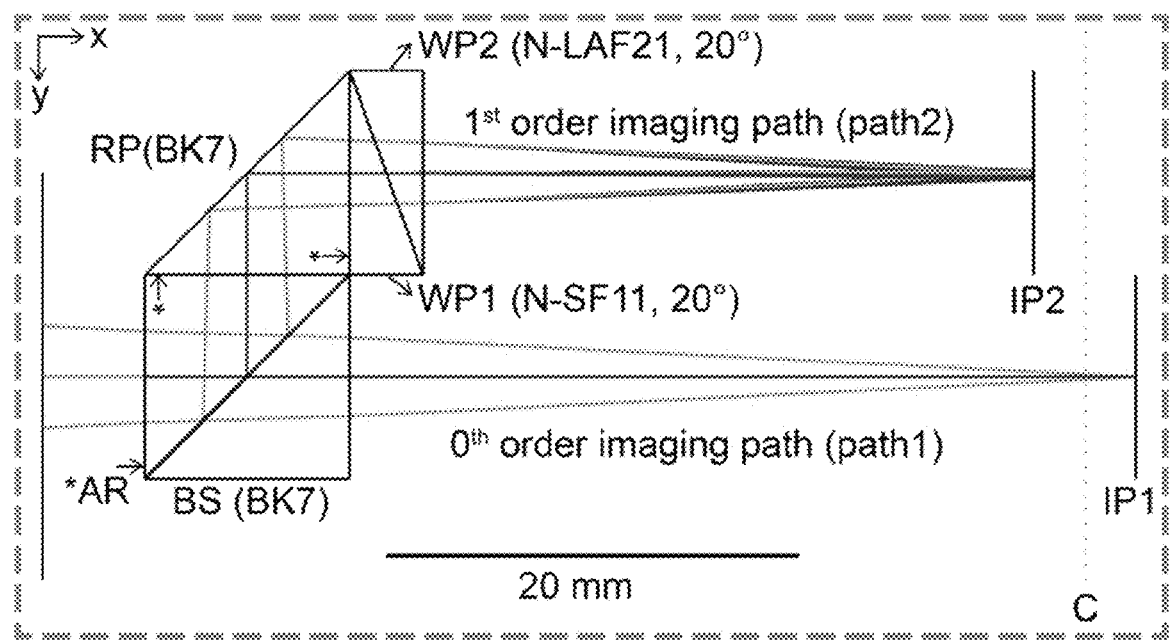
FIG. 1B: Zemax design of a DWP-containing spectrometer optical assembly.

FIG. 1B illustrates the DWP spectrometer design, according to certain embodiments, which comprises a cube beam splitter (BS, 50:50 split ratio), a right-angle prism (RP), and DWP for spectrally dispersing focused beam without deviation. The BS first splits the incident beam at a 50:50 split ratio. The transmitted beam (path 1) forms a spatial image on its image plane, IP1. The reflected beam (path 2) is further reflected by the RP along the x-axis and dispersed along the y-axis after passing through the DWP. A DWP-containing spectrometer comprises a pair of wedge prisms, which include one with strong chromatic dispersion (WP1, N-SF11 glass, refractive index n=1.791 at 550 nm) and another one with weak chromatic dispersion (WP2, N-LAF21 glass, refractive index n=1.792 at 550 nm)[10]. WP1 exhibiting strong chromatic dispersion is mainly used to disperse the incident beam to reveal the spectroscopic signatures. The resulting diversion angle of the refracted beam is subsequently compensated for by WP2 and, thus, the beam exiting WP2 remains parallel to the x-axis. It should be noted that WPs are known to introduce aberrations in the convergent light, resulting in imaging artifacts such as astigmatism[11]. Thus, we optimized the geometry and materials of WP1 and WP2 to minimize the wavefront error induced by DWP. Such design ensures the resulting spectral image plane (IP2) to be parallel with the spatial image plane (IP1) and minimizes the image aberration when we recording both IP1 and IP2 using the same camera (C). In FIG. 1B: "BS" refers to a beam splitter, according to embodiments herein; "RP" refers to a right angle prism, which is an exemplary light-reflective device, according to embodiments herein; "WP" refers to a wedge prism, which is an exemplary dispersive optical device (e.g., WP1 is a first dispersive optical device and WP2 is a second dispersive optical device), according to embodiments herein; "IP" refers to an image plane, according to embodiments herein; and "AR" refers to an antireflective coating, according to embodiments herein.

We adjusted the optical pathlength difference between path 1 and path 2 to about 5 mm to create an axial separation between IP1 and IP2, enabling 3D biplane imaging[9]. We cemented all the optical components together to form the single DWP unit, as shown in FIG. 1B. The size of each sub component can be customized to fit specific experimental needs. As the spatial and spectral imaging paths are parallel with the z-axis, this monolithic imaging spectrometer can be inserted in-line into an existing imaging path of a commercial microscope. All exposed surfaces are anti-reflection coated to minimize transmission loss further. FIG. 1C shows the picture of a DWP-containing spectrometer optical assembly, which comprises custom-made WPs and a commercially available lateral beam splitter (#47188, Edmund Optics).

Figure 2A:
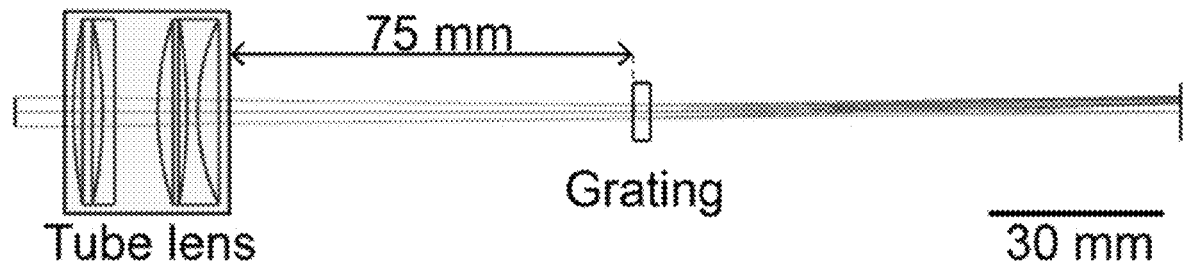
FIGS. 2A-2F. Layouts of (FIG. 2A) the grating-based and (FIG. 2B) the DWP-based designs using Zemax; Simulated spot diagrams at different wavelengths (from the left to right: 450, 550, and 650 nm; from the top to bottom: spatial and spectral beam paths) for (FIG. 2C) the grating-based and (FIG. 2D) the DWP-based designs.

Theoretical simulations. We compared the performances of grating-based and DWP-based sSMLM using Zemax®. We show their optical layouts in FIGS. 2A and 2B, respectively. In both designs, we focused the incident beam using a TL modeled as a microscope component as previously reported[12]. We placed both the grating and a DWP-containing spectrometer 75-mm away from the TL.

Figure 2B:
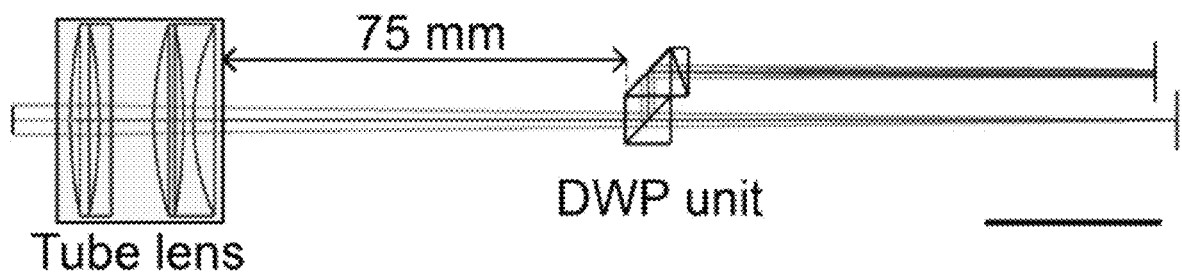
Figure 2C:
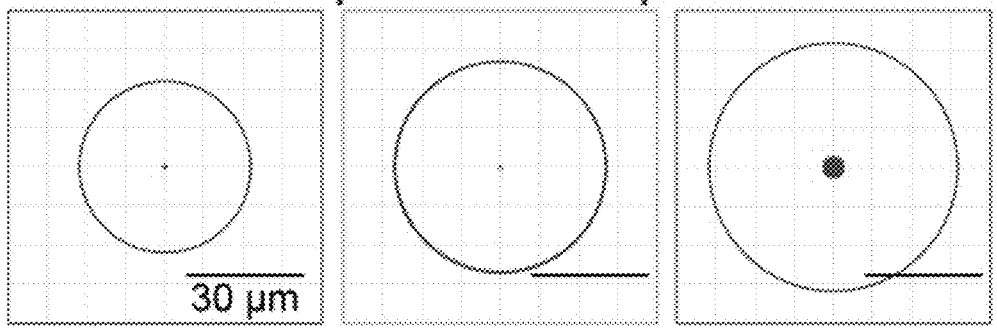
Figure 2C:
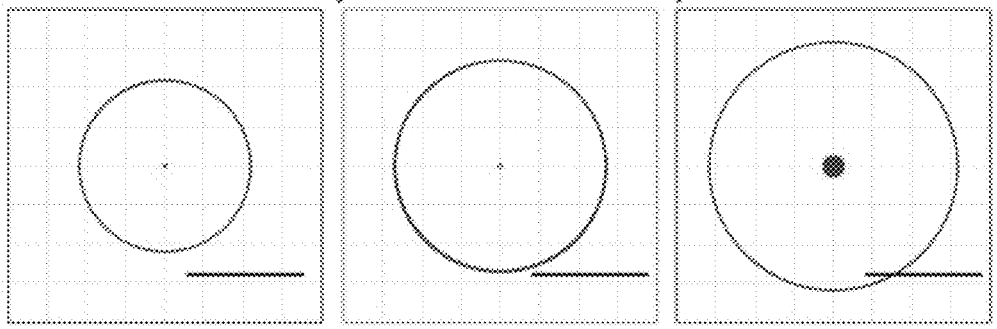
Figure 2D:
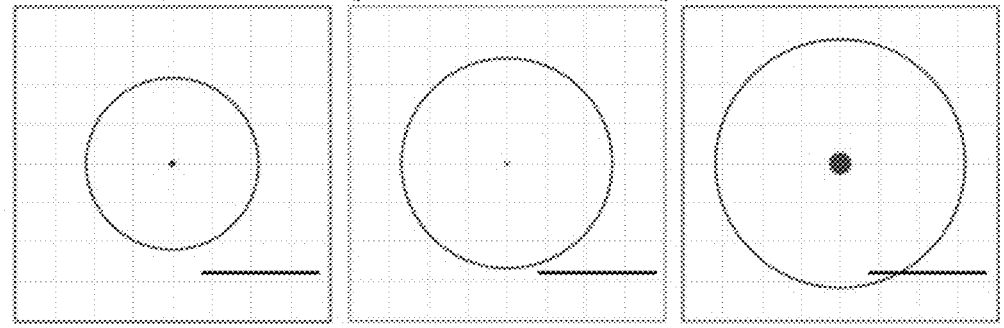
Figure 2D:
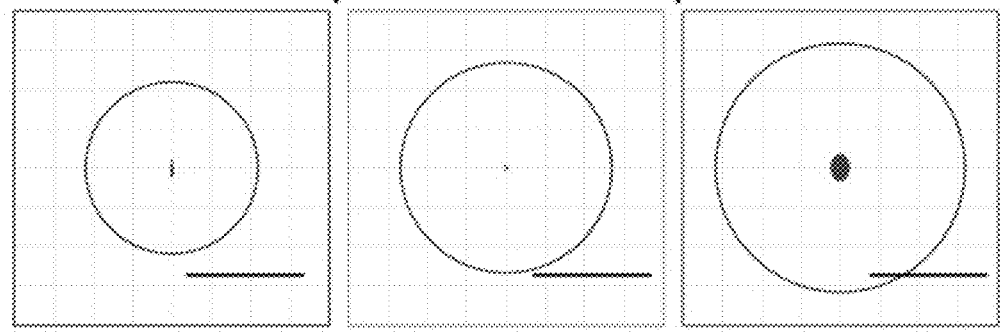
Figure 2E:
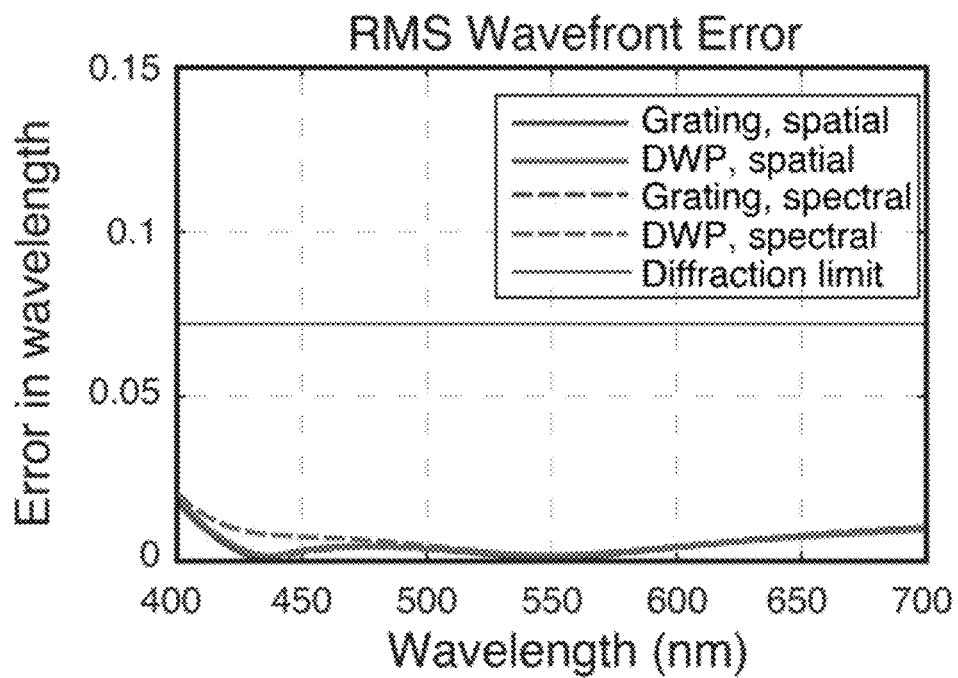

FIGS. 2C and 2D show the simulated spot diagrams of the spatial and spectral beam paths in both designs at three representative wavelengths (450 nm, 550 nm, and 650 nm). Overall, the root-mean-square (RMS) radiuses in both designs are significantly lower than the reference diffraction-limited criterion, indicating that both designs offer diffraction-limited performances. For example, we observed a 0.15-μm RMS radius in the grating-based design and a 0.41-μm RMS radius in the DWP-based design, both of which are significantly smaller than the 21.95-μm Airy disk radius at 450 nm. Also, the simulated RMS wavefront errors of spatial and spectral beam paths are compared with the diffraction-limited case, as shown in FIG. 2E. The wavefront errors in both designs are significantly lower than the reference diffraction-limited criterion (0.08λ) across the entire simulated range. These results suggest that our DWP design effectively minimized the wavefront errors.

Figure 2F:
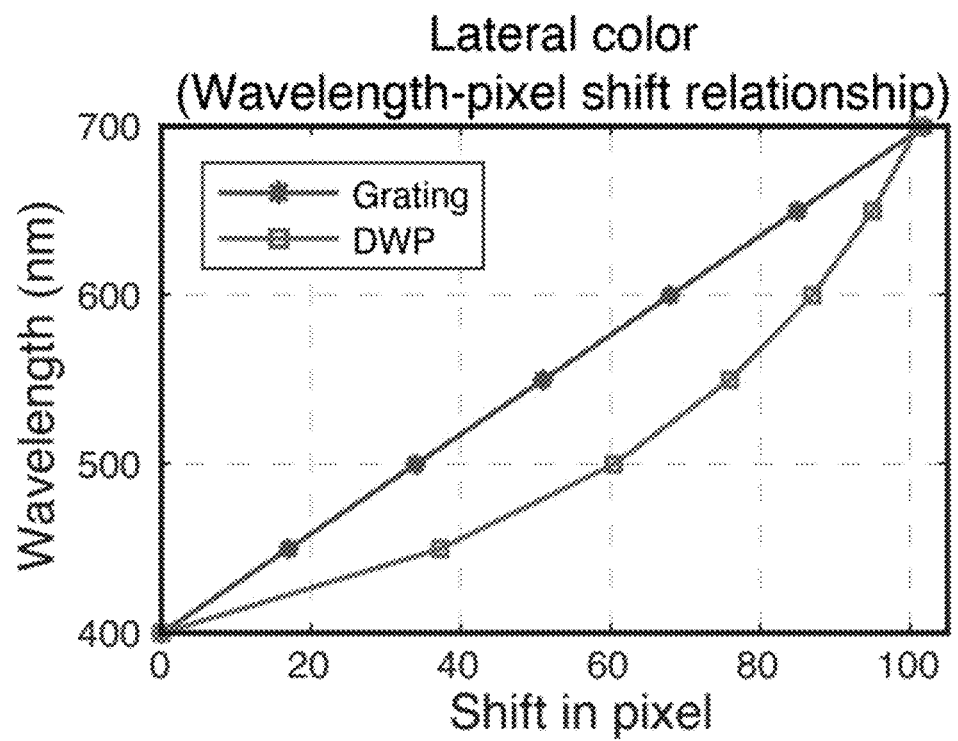

FIG. 2F compares the simulated wavelength-pixel shift relationship, which quantifies the achievable spectral dispersion (SD), in the grating-based and DWP-based design with a camera pixel size of 11 μm[13]. The grating-based design is known for its linear dispersion (the blue curve). In contrast, the DWP-based design shows a non-linear dispersion (the orange curve), which can be fitted using a third-order polynomial equation[1]. Overall, both designs provide an SD of 3 nm/pixel. The SD can be tuned either by changing the wedge angles of the DWP or translating the DWP module along the x-axis, as labeled in FIG. 2B, in a converging beam bath[6].

We theoretically compared the spatial and spectral precisions of the DWP-based and the grating-based designs[6,8]. According to the manufacturer's specifications, we assumed an absolute transmission loss (at 670 nm) of 30% by the grating in the grating-based sSMLM system, and 5% by the BS, 0.5% by the RP, 2% by the DWP in the DWP-based sSMLM system. Considering a given quantum efficiency of the selected sCMOS camera (85% at 670 nm) and a previously reported ~1:3 split ratio[6,8,9] between the spatial and spectral channels, the absolute transmission efficiencies of the spatial and spectral images in the grating-based sSMLM system are 14% and 42%, respectively. The absolute transmission efficiencies of the spatial and spectral images in the DWP-based sSMLM system are 40% and 39%, respectively. Then, we estimated the lateral spatial precision Δx using 14

$$\Delta x^2 = \frac{\sigma^2 + a^2/12}{N}\left(1 + 4\tau + \sqrt{\frac{2\tau}{1+4\tau}}\right), \quad (1)$$

where $\tau=2\pi(b+n_{ro}^2)(\sigma^2+a^2/12)/Na^2$; σ [nm] is the standard deviation of the Gaussian function; a [nm] is the back-projected pixel size; N is the number of detected photons; b is the number of background photons per pixel; and $n_{ro}$ [e−] is the readout noise. We estimated the spectral precision $\sigma_\lambda$ using[13]

$$\sigma_\lambda^2 = \frac{s_\lambda^2}{N} + \frac{1024 n_{bg}^2 s_\lambda^3 s_x}{3\Delta\lambda\Delta xN^2} + \frac{1024 n_{ro}^2 s_\lambda^3 s_x}{3\Delta\lambda\Delta xN^2}, \quad (2)$$

where $s_\lambda$ [nm] and $s_x$ [nm] are the standard deviations of the Gaussian function along the spectral-axis and the x-axis, respectively; $n^2$ is the number of background photons per pixel; Δλ is the SD [nm/pixel]; Δx [nm] is the back-projected pixel size along the x-axis.

Figure 3A:
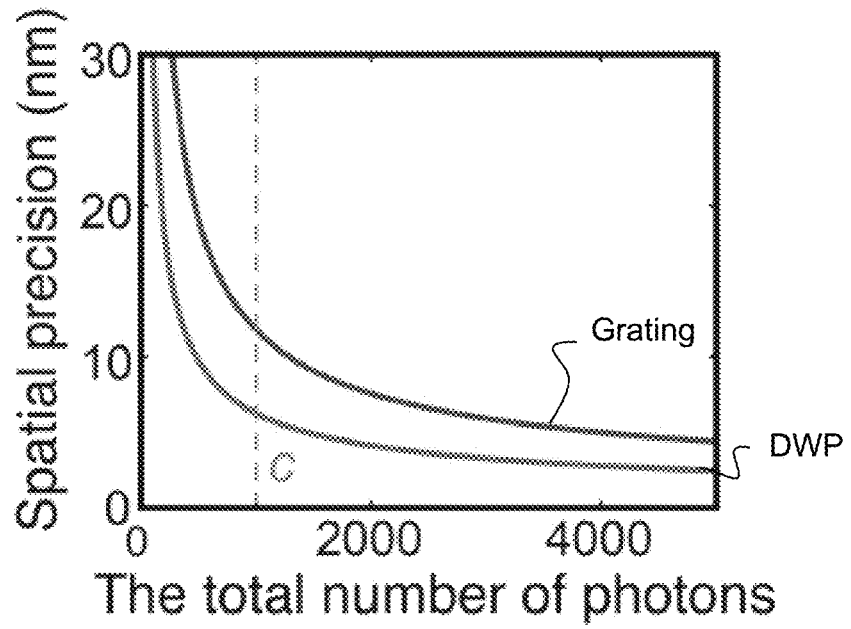
FIG. 3A: Theoretically estimated lateral spatial precision and (FIG. 3B) spectral precision of the grating-based (the blue color) and the DWP-based (the orange color) designs.
Figure 3B:
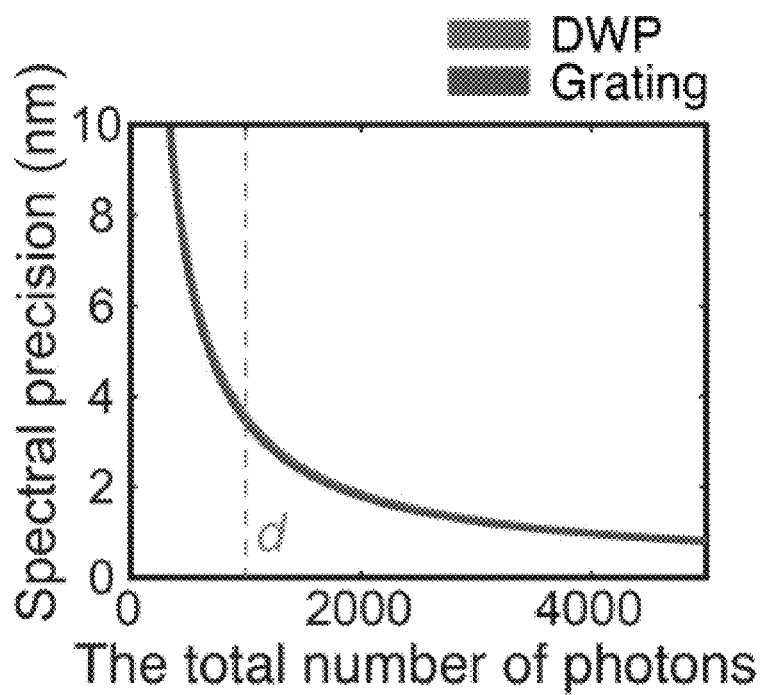
FIG. 3C: Scatterplot of spatial precision and (FIG. 3D) histogram of spectral precision of both designs at 2000 photons.
FIG. 3E: Depth calibration curve of biplane imaging for 3D imaging.
FIG. 3F: Theoretically estimated axial spatial precision of the grating-based and the DWP-based designs.

As shown in FIG. 3A, we observed that the DWP-based design offers an improved lateral spatial precision of 4.12 nm, representing a XX % improvement over the grating-based design's spatial presanction (7.38 nm). The higher transmission efficiency of the dispersive prism than the grating contributes primarily to such precision improvement. Meanwhile, these two designs provide comparable spectral precisions due to their similar absolute transmission efficiencies and spectral dispersion in the spectral channel (1.86 nm for the DWP-based design; 1.70 nm for the grating-based design), as shown in FIG. 3B.

Figure 3C:
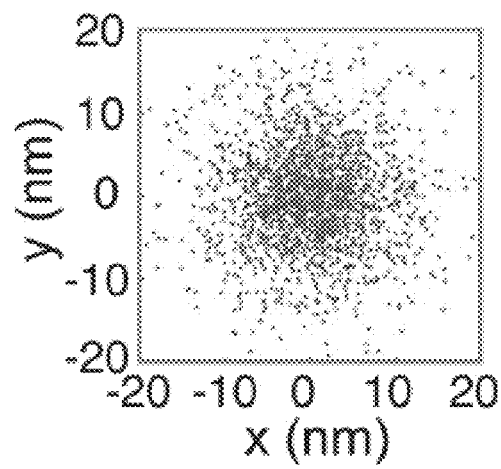
Figure 3D:
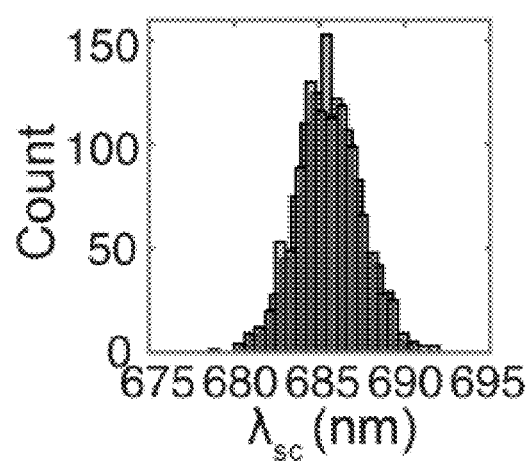

We performed a numerical simulation to estimate the spatial and spectral precisions and compared them with the results obtained by the analytical model. We used the previously reported numerical simulation method[7,13] and provided all the key parameters in Table 1. From the numerical simulation, we found that the spatial precisions in the DWP- and grating-based designs were 4.06 nm and 7.73 nm, respectively, as shown in FIG. 3C, when the total photons were 2000. We observed comparable spectral precisions in the DWP- and grating-based designs as 1.94 nm and 1.74 nm, respectively (FIG. 3D), closely matching the analytical solution. These results suggest that the DWP-based design reduced the system complexity and improved photon utilization efficiency, which is better suited for sSMLM to accommodate a limited photon budget.

TABLE 1

| List of parameters used in analytical solutions | | | | | |
| --- | --- | --- | --- | --- | --- |
| | σ (nm) | a (nm) | b (photons/pixel) | | $n_{ro}$ (e-) |
| For Δx | 96 | 110 | 5 | | 1.6 |
| | $s_\lambda$ (nm) | $s_y$ (nm) | $n_{bg}^2$ (photons/pixel) | $n_{ro}$ (e-) | Δλ (nm/pixel) | Δy (nm) |
| For $\sigma_\lambda$ | 20 | 96 | 5 | 1.6 | 6 | 110 |

Figure 3E:
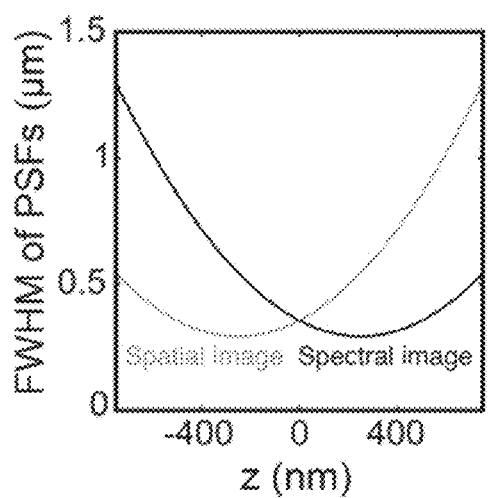
Figure 3F:
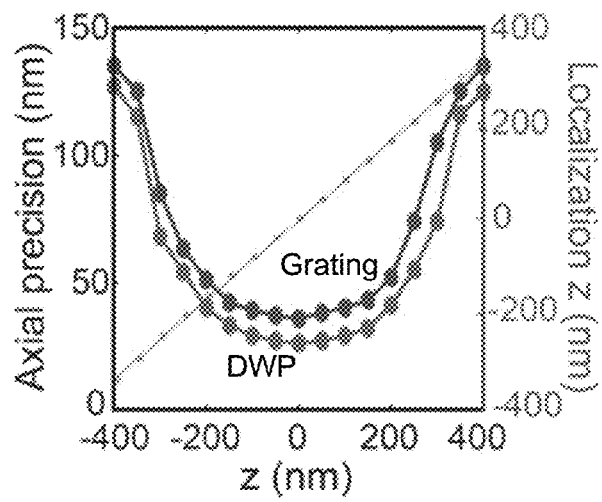

We further extended the numerical simulation to 3D imaging to estimate the axial spatial precision of the DWP-based design. As shown in FIG. 2B, we achieved an optical path difference of ~5 mm between the spatial (IP1) and spectral (IP2) image planes, which generates an axial separation of ~500 nm using a 100×OL[15]. We first generated an ideal 3D calibration curve for biplane imaging based on this axial separation, as shown in FIG. 3E. The calibration curves show the full-width-at-half-maximum (FWHM) values of the PSFs along the x-axis in both spatial and spectral images. We used these calibration curves to generate PSFs at different depths as the ground truth. We used these ground-truth PSFs to estimate the axial precision of the biplane sSMLM system in the same manner as we previously reported[9]. Other key parameters used in this simulation are listed in Table 2. FIG. 3F shows the simulated axial precision (the left vertical axis) and the reconstructed localization z-position (the right vertical axis). For example, we obtained the axial precision of 25.78 nm for the DWP-based design and 35.74 nm for the grating-based design, respectively, at a 0-nm depth, 2,000 photons, and a background of 5-photons/pixel. The DWP-based design provided a 28% improvement.

TABLE 2

List of parameters used in simulations

| Camera | Pixel size (μm) | Quantum efficiency @ 670 nm | Readout noise (e-) | Signal (photons) | Background (photons/pixel) |
|---|---|---|---|---|---|
| Prime 95B | 11 | 0.85 | 1.6 | 2000 | 5 |

| Standard deviation of PSF (nm) | Iteration number | Precision | Spectral dispersion (nm/pixel) | Axial separation (nm) |
|---|---|---|---|---|
| 96 | 1000 | For lateral | — | |
| | | For spectral | 6 | |
| | | For axial | — | 500 |

Figures 4A, 4B:
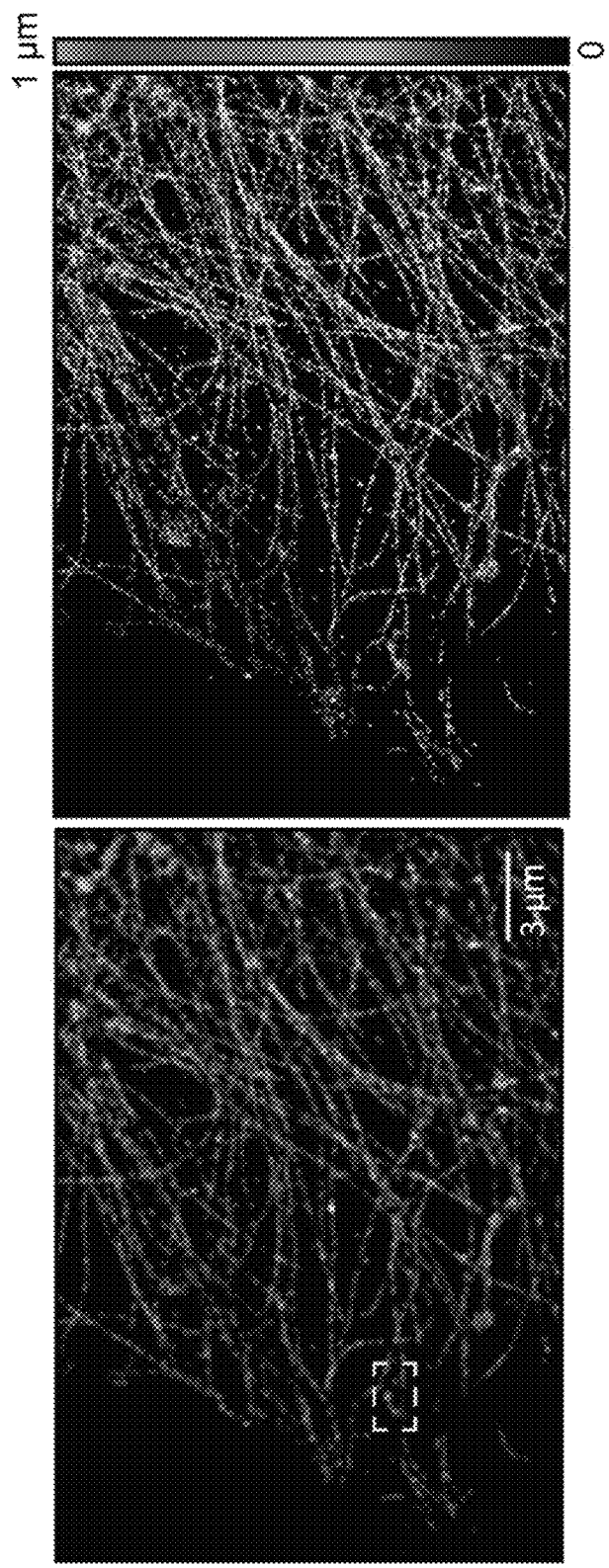
FIG. 4A: Two-color 2D and (FIG. 4B) 3D sSMLM reconstruction image of microtubules (cyan) and mitochondria (red) labeled with AF647 and CF680. 3D reconstruction image is visualized with pseudo colors corresponding to the axial coordinates of individual molecules.
Figure 4C:
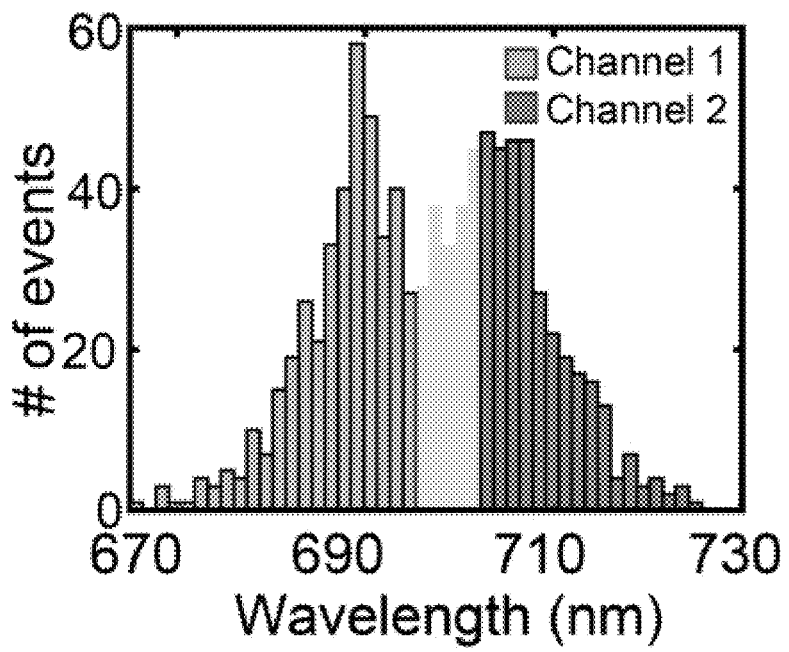
FIG. 4C: SC distributions of AF647 and CF680 corresponding to the yellow dashed box in FIG. 4A.
Figure 4D:
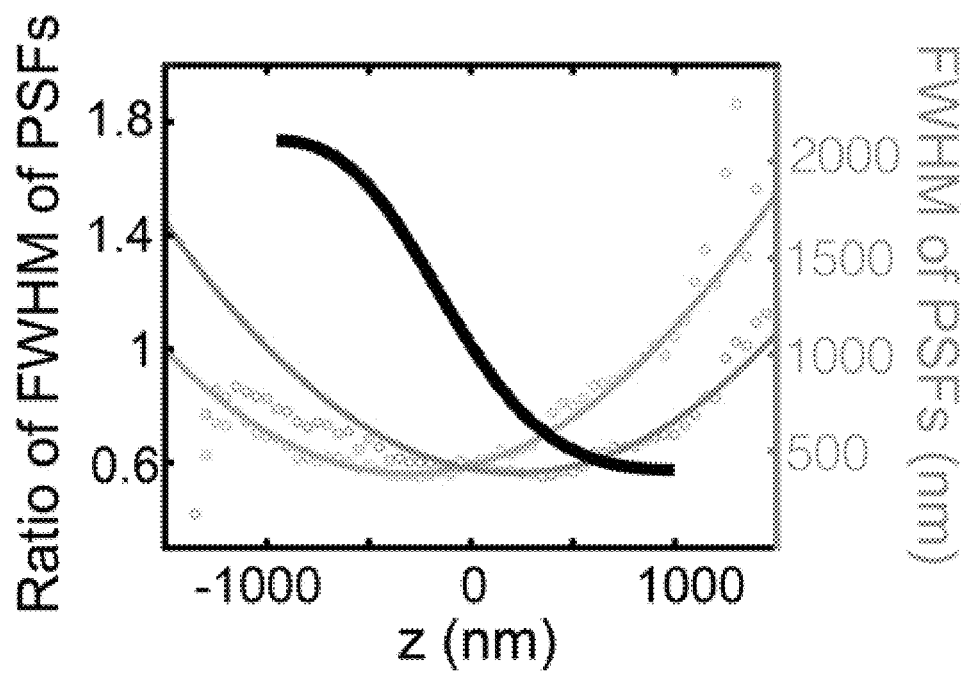
FIG. 4D: Experimentally obtained 3D calibration curve.

Experimental results. We experimentally demonstrated multi-color 3D imaging of U2OS cells using the DWP-based system. We labeled microtubules and mitochondria using AF647 and CF680, respectively. FIGS. 4A and 4B respectively show the two-color 2D and 3D sSMLM reconstruction images. We used a weighted spectral centroid (SC) method to identify individual molecules in multi-color imaging[5,7,9,13]. We first calculated spectral centroids of individual molecules and classified them by defining different spectral windows: the first window, the cyan color in FIG. 4A, is below 697 nm, and the second window, the red color in FIG. 4B, is above 705 nm. FIG. 4C shows the SC distributions of AF647 and CF680 within the yellow dashed box highlighted in FIG. 4A. We reconstructed 3D images using the biplane method as previously reported[9]. We first estimated the full-width-at-half-maximum (FWHM) values of the PSFs along the x-axis in both spatial and spectral images. Then, we assigned axial coordinates of individual localizations based on the 3D calibration, as shown in FIG. 4D. Lastly, we visualized 3D reconstruction image with pseudo colors corresponding to the axial coordinates of each molecule.

Discussion We designed a compact 3D sSMLM module with monolithic imaging spectrometer. Using ray-tracing and numerical simulations, we estimated theoretically achievable spatial and spectral precisions. We also compared the results with those acquired by an existing grating-based design. Finally, we validated its spectroscopic 3D multi-color imaging capability using 2UOS cells, which shows the potential to uncover rich information about single molecules for the fundamental understanding of subcellular structures and nanomaterial properties. The reported 3D sSMLM module eliminates the need for time-consuming alignment and maintenance of discrete optical components by manufacturing a single unit of the compound optical element. We anticipate that the compactness of DWP unit allows for easy integration with commercial fluorescence microscope bodies and makes sSMLM broadly accessible by users in the biology research community.

Exemplary Protocols:

Sample preparation. We maintained U2OS cells in Dulbecco's modified Eagle medium (DMEM, Gibco/Life Technologies) supplemented with 2 mM L-glutamine (Gibco/Life Technologies), 10% fetal bovine serum (Gibco/Life Technologies), and 1% penicillin and streptomycin (100 U/mL, Gibco/Life Technologies) at 37° C. We fixed the cells with 3% paraformaldehyde and 0.1% glutaraldehyde in phosphate buffered saline (PBS) for 10 min and rinsed them with PBS twice. Then, we permeabilized the cells with a buffer (3% bovine serum albumin (BSA) and 0.5% Triton X-100 in PBS for 10 min), blocked in 2.5% goat serum in PBS for 30 min, and incubated with the primary antibodies in the blocking buffer (2.5% goat serum in PBS) overnight in the refrigerator with rotation. For primary antibody incubation, we used mouse anti-TOM20(F-10) (1:100 dilution. 200 μg/mL, sc-17764, Santa Cruz) and rabbit anti-B-tubulin (1:100 dilution, 200 ug/ml, PAS-16863, Thermo Fisher Scientific). We washed the samples with washing buffer (0.2% BSA and 0.1% Triton X-100 in PBS) for 5 min three times and incubated with secondary antibodies labeled with mouse CF680 (1:100 dilution, 100 ug/ml, donkey anti-mouse IgG-CF680) for TOM20 and rabbit AF647 (1:100 dilution, 100 ug/ml, donkey anti-rabbit IgG-AF647) for B-Tubulin for 30 min. Then, we washed the cells with washing buffer (0.2% BSA and 0.1% Triton X-100 in PBS) twice and with PBS twice for 5 min each and stored them in PBS at 4° C. We used an imaging buffer (pH=~8.0, 50 mM Tris, 10 mMNaCl, 0.5 mgmL-1 glucose oxidase (G2133, Sigma-Aldrich), 2000 U/mL catalase (C30, Sigma-Aldrich), 10% (w/v) D-glucose, and 100 mM cysteamine) for imaging.

Spectral calibration. We imaged a nanohole array using a white-light lamp and 550-, 605-, 642-, 685-, and 750-nm BPFs. The nanohole array contains 5 holes with a spacing of 2 μm along the x-axis and 5 μm along the y-axis. This calibration image included multiple PSFs of nanoholes in a spatial image and corresponding spectral PSFs in a spectral image. By integrating the PSFs in the spectral image along the y-axis, we obtained the emission peaks defined by the BPFs. Then, we obtained a calibration curve by fitting the wavelengths of the emission peaks with their corresponding pixel distances using a third-order polynomial function. For multi-color imaging, we fitted the wavelengths of the emission peaks using a first-order polynomial function because the pixel-wavelength relationship within the 650 nm-750 nm is considered linear. Its pixel-wavelength variation within the range is less than 1 pixel.

REFERENCES CORRESPONDING TO EXAMPLE 1

1 Zhang, Z., Kenny, S. J., Hauser, M., Li, W. & Xu, K. Ultrahigh-throughput single-molecule spectroscopy and spectrally resolved super-resolution microscopy. *Nat Methods* 12, 935-938, doi:10.1038/nmeth.3528 (2015).
2 Mlodzianoski, M. J., Curthoys, N. M., Gunewardene, M. S., Carter, S. & Hess, S. T. Super-Resolution Imaging of Molecular Emission Spectra and Single Molecule Spec- 3 Comtet, J. et al. Wide-Field Spectral Super-Resolution Mapping of Optically Active Defects in Hexagonal Boron Nitride. *Nano Letters* 19, 2516-2523, doi:10.1021/acs.nanolett.9b00178 (2019).
4 Dong, B. et al. Super-resolution spectroscopic microscopy via photon localization. *Nat Commun* 7, 12290, doi:10.1038/ncomms12290 (2016).
5 Bongiovanni, M. N. et al. Multi-dimensional super-resolution imaging enables surface hydrophobicity mapping. *Nat Commun* 7, 13544, doi:10.1038/ncomms13544 (2016).
6 Zhang, Y. et al. Multicolor super-resolution imaging using spectroscopic single-molecule localization microscopy with optimal spectral dispersion. *Appl. Opt.* 58, 2248-2255, doi:10.1364/AO.58.002248 (2019).
7 Song, K.-H., Zhang, Y., Brenner, B., Sun, C. & Zhang, H. F. Symmetrically dispersed spectroscopic single-molecule localization microscopy. *Light: Science & Applications* 9, 92, doi:10.1038/s41377-020-0333-9 (2020).
8 Davis, J. L. et al. Super-Resolution Imaging of Self-Assembled Nanocarriers Using Quantitative Spectroscopic Analysis for Cluster Extraction. *Langmuir* 36, 2291-2299, doi:10.1021/acs.langmuir.9b03149 (2020).
9 Song, K.-H., Zhang, Y., Wang, G., Sun, C. & Zhang, H. F. Three-dimensional biplane spectroscopic single-molecule localization microscopy. *Optica* 6, doi:10.1364/optica.6.000709 (2019).
10 Suzuki, Y., Tani, T., Sutoh, K. & Kamimura, S. Imaging of the fluorescence spectrum of a single fluorescent molecule by prism-based spectroscopy. *FEBS Letters* 512, 235-239, doi:https://doi.org/10.1016/S0014-5793(02)02269-X (2002).
11 Howard, J. W. Formulas for the coma and astigmatism of wedge prisms used in converging light. *Appl. Opt.* 24, 4265-4268, doi:10.1364/AO.24.004265 (1985).
12 Kurvits, J. A., Jiang, M. & Zia, R. Comparative analysis of imaging configurations and objectives for Fourier microscopy. *J Opt Soc Am A Opt Image Sci Vis* 32, 2082-2092, doi:10.1364/JOSAA.32.002082 (2015).
13 Song, K.-H., Dong, B., Sun, C. & Zhang, H. F. Theoretical analysis of spectral precision in spectroscopic single-molecule localization microscopy. *Review of Scientific Instruments* 89, 123703, doi:10.1063/1.5054144 (2018).
14 Rieger, B. & Stallinga, S. The Lateral and Axial Localization Uncertainty in Super-Resolution Light Microscopy. 15, 664-670, doi:10.1002/cphc.201300711 (2014).
15 Prabhat, P., Ram, S., Ward, E. S. & Ober, R. J. Simultaneous imaging of different focal planes in fluorescence microscopy for the study of cellular dynamics in three dimensions. *IEEE Trans Nanobioscience* 3, 237-242, doi:10.1109/tnb.2004.837899 (2004).

Example 2: Symmetrically Dispersed Spectroscopic Single-Molecule Localization Microscopy Spectroscopic single-molecule localization microscopy (sSMLM) was used to achieve simultaneous imaging and spectral analysis of single molecules for the first time. Current sSMLM fundamentally suffers from a reduced photon budget because the photons from individual stochastic emissions are divided into spatial and spectral channels. Therefore, both spatial localization and spectral analysis only use a portion of the total photons, leading to reduced precisions in both channels. To improve the spatial and spectral precisions, we present symmetrically dispersed sSMLM, or SDsSMLM, to fully utilize all photons from individual stochastic emissions in both spatial and spectral channels. SDsSMLM achieved 10-nm spatial and 0.8-nm spectral precisions at a total photon budget of 1000. Compared with the existing sSMLM using a 1:3 splitting ratio between spatial and spectral channels, SDsSMLM improved the spatial and spectral precisions by 42% and 10%, respectively, under the same photon budget. We also demonstrated multicolour imaging of fixed cells and three-dimensional single-particle tracking using SDsSMLM. SDsSMLM enables more precise spectroscopic single-molecule analysis in broader cell biology and material science applications.

Introduction: The ability of spectroscopic single-molecule localization microscopy (sSMLM) to capture the spectroscopic signatures of individual molecules along with their spatial distribution allows the observation of subcellular structures and dynamics at the nanoscale. As a result, sSMLM has shown great potential in understanding fundamental biomolecular processes in cell biology and material science[1-7]. It also enables the characterization of nanoparticle properties based on the emission spectrum at the single-particle level[8-10]. Similar to other localization-based super-resolution techniques, such as stochastic optical reconstruction microscopy (STORM) and point accumulation for imaging in nanoscale topography (PAINT), the localization precision of sSMLM is fundamentally limited by the number of collected photons per emitter[11]. However, sSMLM suffers from further photon budget constraints since the collected photons of each molecule need to be divided into two separate channels to simultaneously capture the spatial and spectral information[5-10]. Thus, the spatial localization precision of sSMLM also depends on the splitting ratio between the spatial and spectral channels and is typically limited to 15-30 nm in cell imaging[2,3,5,6] Although a dual-objective sSMLM design was previously demonstrated with improved spatial localization precision, it imposes a constraint on live-cell imaging and adds complexity to system alignment[1]. The splitting of photons into two channels in sSMLM forces an inherent trade-off between the spatial and spectral localization precisions[5]. Currently, a method to fully utilize the full photon budget to maximize both the spatial and spectral localization precisions in sSMLM is lacking.

To overcome this inherent trade-off, we developed symmetrically dispersed sSMLM, or SDsSMLM, which has two symmetrically dispersed spectral channels instead of one spatial and one spectral channel. SDsSMLM fully utilizes all collected photons for both spatial localization and spectral analysis. We showed improvements in the spatial and spectral localization precisions via numerical simulation and validated them by imaging fluorescent nanospheres and quantum dots (QDs). We further demonstrated multicolour imaging of subcellular structures and three-dimensional (3D) single-particle tracking (SPT) capabilities.

Figure 5A:
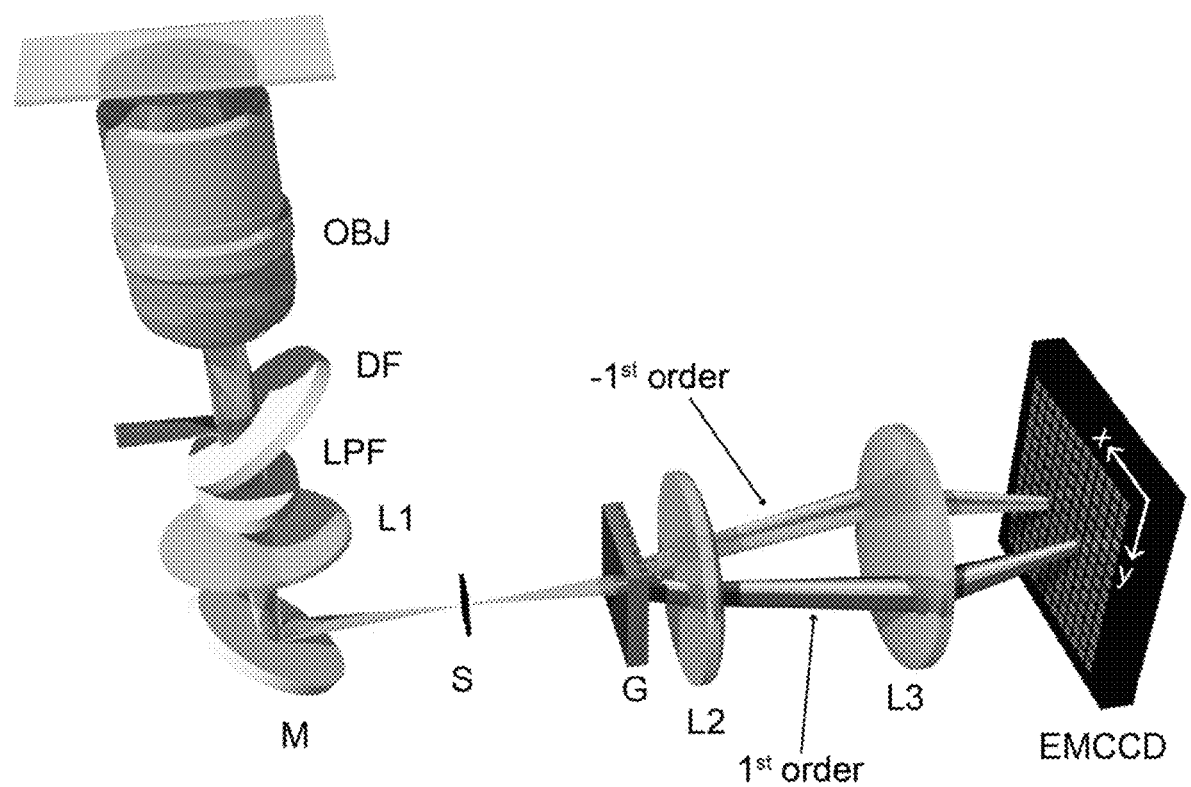
FIG. 5A: Schematic of SDsSMLM.
Figure 5B:
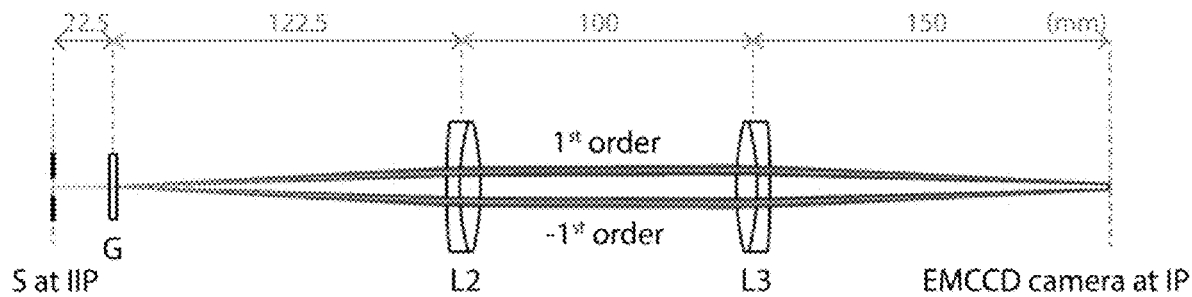
FIG. 5B: Layout of the SDsSMLM spectrometer in Zemax based on the optical components and dimensions used in the experiment.

Results:

SDsSMLM: The concept of SDsSMLM is illustrated in FIGS. 5A-5E. SDsSMLM is based on a conventional single-molecule localization microscopy (SMLM) system with a grating-based spectrometer (details are described in Materials and Protocols). In the emission path, the fluorescence light is confined by a slit at the intermediate image plane and symmetrically dispersed into the $-1^{st}$ and $1^{st}$ orders at an equal splitting ratio by a transmission grating (FIG. 5A). Then, these dispersed fluorescence emissions are captured by an electron-multiplying charge-coupled device (EMCCD) camera to form two symmetrical spectral images after passing through relay optics. In addition, FIG. 5B shows the layout of the SDsSMLM spectrometer in Zemax based on the optical components and dimensions used in our studies.

Figure 5C:
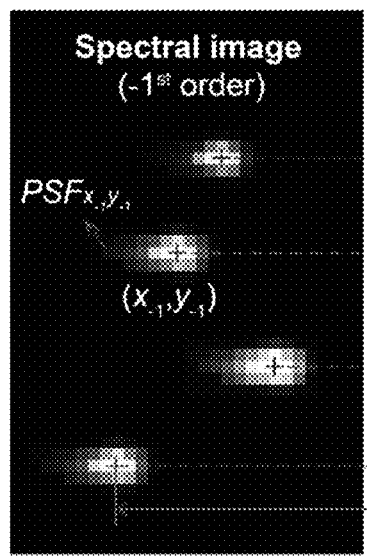
FIG. 5C: Illustrative image of four molecules from the $-1^{st}$ order spectral channel.
Figure 5E:
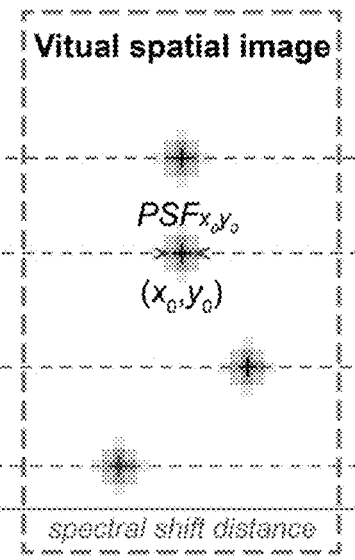
FIG. 5E: Virtual spatial image calculated from the two spectral images shown in panels b and c. OBJ: objective lens; DF: dichroic filter; LPF: longpass filter; L: lens; M: mirror; S: slit; G: grating; EMCCD: electron-multiplying charge-coupled device.

While existing sSMLM simultaneously captures spatial ($0^{th}$ order) and spectral ($1^{st}$ order) images, SDsSMLM captures only two spectral images ($-1^{st}$ and $1^{st}$ orders, FIGS. 5C and 5O). The two spectral images of a particular single molecule emission are mirror images of each other with respect to the true location of the molecule. Therefore, we can localize single molecules by identifying the middle points (black plus symbols in FIG. 5E) between the two symmetrically dispersed spectral images. This symmetry-middle point relationship holds true for all molecules regardless of their emission spectra and minute spectral variations even among the same species of molecules. A virtual spatial image can be generated by identifying all the middle points (FIG. 5E). This virtual spatial image utilizes all the detected photons in each EMCCD frame, in contrast to the portion of photons used in existing sSMLM. It should also be noted that the virtual spatial image is not affected by the spectral heterogeneity of individual molecules, which is cancelled out through the symmetry-middle point relationship.

Figure 5D:
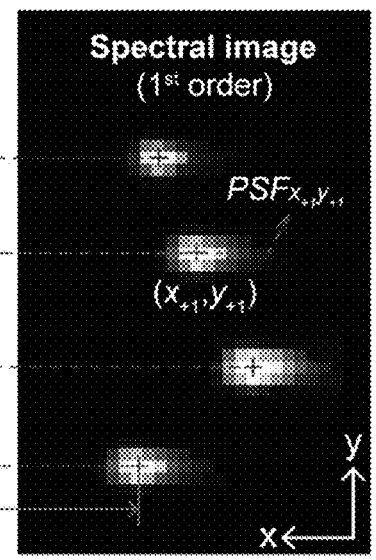
FIG. 5D: Corresponding image of the same molecules from the $1^{st}$ order spectral channel.

In SMLM, the localization position of individual molecules in the spatial image is estimated with limited certainty[12]. When the localization position is repeatedly estimated, the spatial localization precision (referred to as the spatial precision) is described by the standard deviation of the distribution of the estimated localization positions. Similarly, in SDsSMLM, we estimate the localization positions $(x_{-1}, y_{-1})$ and $(x_{+1}, y_{+1})$ from the $-1^{st}$ order and $1^{st}$ order spectral images $$(PSF_{x_{-1}y_{-1}} \text{ and } PSF_{x_{+1}y_{+1}})$$

in FIGS. 5C and 5O). Then, we determine the localization position $(x_0, y_0)$ in the virtual spatial image ($PSF_{x_0y_0}$ in FIG. 5E) using $(x_{-1}, y_{-1})$ and $(x_{+1}, y_{+1})$, as shown in FIGS. 5C-5E. Accordingly, the spatial precision in SDsSMLM is described by the standard deviation of the distribution of the estimated $(x_0, y_0)$ in the virtual spatial image ($PSF_{x_0y_0}$).

In addition from the two spectral images $$(PSF_{x_{-1}y_{-1}} \text{ and } PSF_{x_{+1}y_{+1}}),$$

we generate new spectral images $$(PSF_{\lambda y_{-1}} \text{ and } PSF_{\lambda y_{+1}})$$

based on spectral calibration (details are described in Materials and Protocols section of this Example 2, below). Then, we integrate them along the y-axis and extract spectral centroids ($\lambda_{SC}$) to represent the emission spectra of individual molecules. We calculate $\lambda_{SC}$ as $\lambda_{SC} = \Sigma_\lambda \lambda I(\lambda)/\Sigma_\lambda I(\lambda)$, where $\lambda$ is the emission wavelength and $I(\lambda)$ is the spectral intensity at $\lambda$[13]. Accordingly, the spectral localization precision (referred to as the spectral precision) is described by the standard deviation of the spectral centroid distribution.

Specifically, to generate the virtual image, we first localize the individual molecules in the two spectral images $$(PSF_{x_{-1}y_{-1}} \text{ and } PSF_{x_{+1}y_{+1}})$$

along the x-axis using Gaussian fitting based on a maximum likelihood estimator (MLE)[11,14,15]. Then, we obtain the two localization positions $x_{-1}$ and $x_{+1}$, which are symmetrically distributed with respect to the true location of the molecule. Therefore, we can determine the spatial location $x_0$ in the virtual image by calculating the mean of $x_{-1}$ and $x_{+1}$. In addition, we localize the individual molecules in the two spectral images $$(PSF_{x_{-1}y_{-1}} \text{ and } PSF_{x_{+1}y_{+1}})$$

along the y-axis, generating two localization positions $y_{-1}$ and $y_{+1}$. These localization positions share the same location of the molecule along the y-axis. Hence, we can determine the spatial location $y_0$ in the virtual image by calculating the mean of $y_{-1}$ and $y_{+1}$.

We can also perform spectral analysis of individual molecules using all the detected photons. We define the distance between $x_{-1}$ in FIG. 5C and $x_{+1}$ in FIG. 5D as the spectral shift distance (SSD)[10]. Individual molecules with longer emission wavelengths (the red plus symbols in FIGS. 5C and 5D) have larger SSD values than molecules with shorter emission wavelengths (the green and blue plus symbols in FIGS. 5C and 5D). Therefore, we can distinguish individual molecules based on their distinctive SSDs. To obtain the emission spectra of individual molecules we combine photons from the two spectral images $$(PSF_{x_{-1}y_{-1}} \text{ and } PSF_{x_{+1}y_{+1}})$$

with respect to their spatial locations $(x_0, y_0)$ before spectral fitting, fully utilizing all the collected photons for spectral analysis.

Figure 6A:
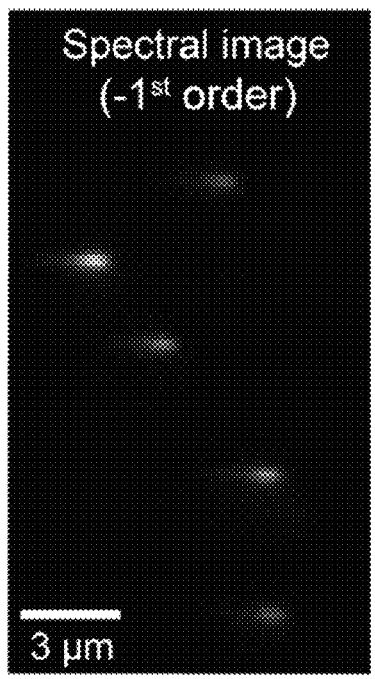
FIGS. 6A-6C: First frame of the simultaneously captured spectral images $-1^{st}$ $1^{st}$ and $0^{th}$ and actual spatial image of nanospheres, corresponding to the orders, respectively.
Figure 6C:
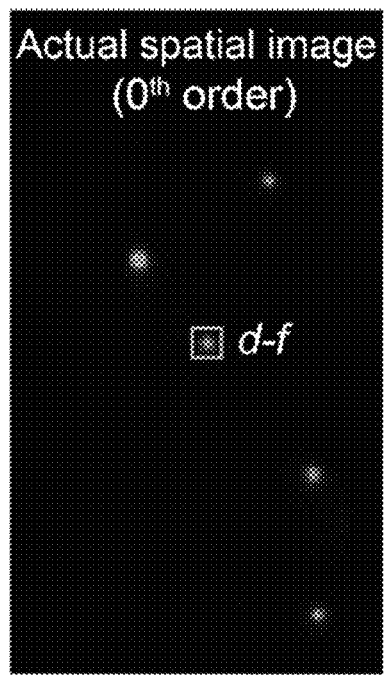
Figure 6B:
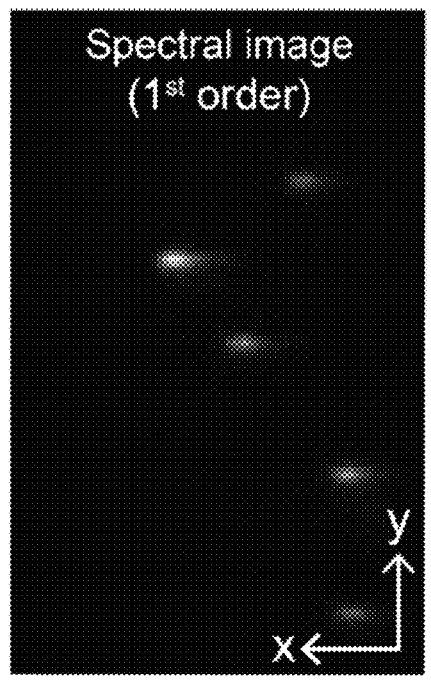
Figure 6D:
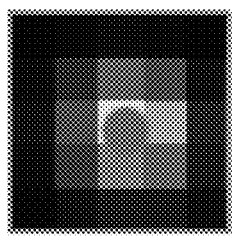
FIGS. 6D-6E: Magnified views to compare the virtual and actual spatial images of the region highlighted by the white box in FIG. 6C.
Figure 6E:
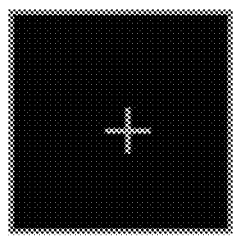
Figure 6F:
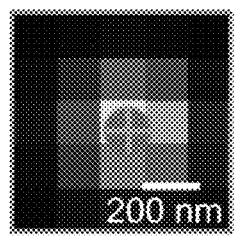
FIG. 6F: Corresponding overlaid image.
Figures 7A, 7B, 7C:
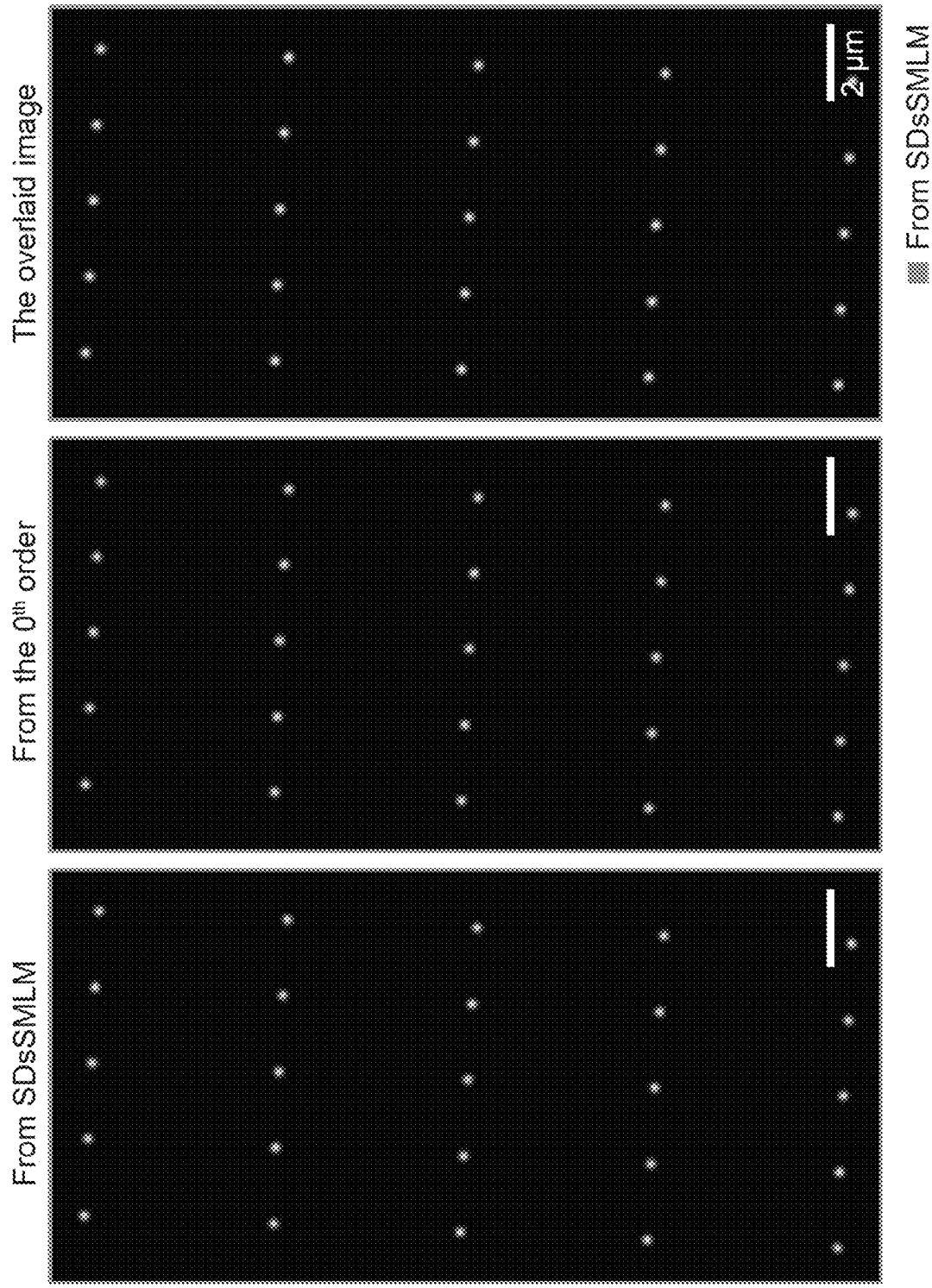
FIGS. 7A-C: A nanohole array images using SDsSMLM (FIG. 7A), $0^{th}$ order (FIG. 7B), and overlaid image (FIG. 7C).

Single and multicolour SDsSMLM imaging of nanospheres: To test the feasibility of SDsSMLM, we first imaged fluorescent nanospheres (200-nm diameter, F8807, Invitrogen). As a proof of principle, we used a grating (#46070, Edmund Optics) that split the emitted fluorescence photons into the $-1^{st}$, $0^{th}$ and $1^{st}$ orders at 22.5%, 28.5%, and 24% transmission efficiencies, respectively. The $-1^{st}$ order and $1^{st}$ order images are the symmetrically dispersed spectral images, and the $0^{th}$ order image is the spatial image. The $0^{th}$ order image was used for comparison with the virtual spatial image estimated from the $-1^{st}$ and $1^{st}$ order spectral images. FIGS. 6A and 6B show the two symmetrically dispersed spectral images, and FIG. 6C shows the simultaneously captured actual spatial image overlaid with the virtual spatial image. Details of the experiment and the image reconstruction are described in Materials and Protocols section. We observed that the virtual spatial locations (the green plus symbols in FIG. 6C) of nanospheres estimated from the spectral images agree well with the PSFs and further with the directly obtained spatial locations (the magenta circle symbols). The accuracy for the nanosphere in the highlighted region in FIG. 6C is 4.99 nm. (The average accuracy for the five nanospheres is 20.59 nm with a standard deviation of 12.71 nm.) Magnified views of the highlighted region in FIG. 6C are shown in FIGS. 6D-6F. Note that each localization is rendered using a circle with a 1-pixel diameter for better illustration in FIGS. 6D and 6F. In addition, we numerically corrected the location offset (17.68±23.28 nm and 32 nm+9.99 nm (mean±standard deviation) along the x- and y-axes, respectively) between the virtual and actual spatial locations after image reconstruction. In addition, we characterized the accuracy of the SDsSMLM system using a nanohole array in FIG. 7. The accuracy over the entire field of view (FOV) is 14.43 nm±10.25 nm along the y-axis and 19.86 nm±12.08 nm along the x-axis.

Figure 6G:
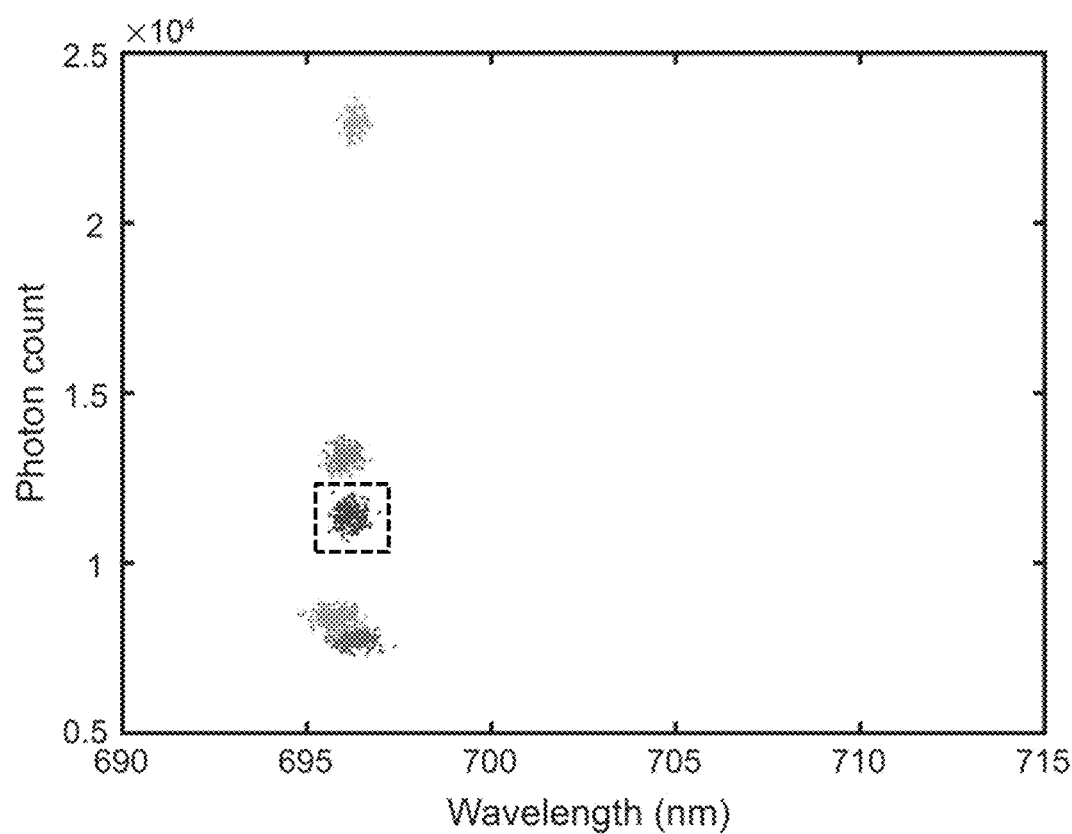
FIG. 6G: Scatter plot of the photon count versus the spectral centroid.
Figure 6H:
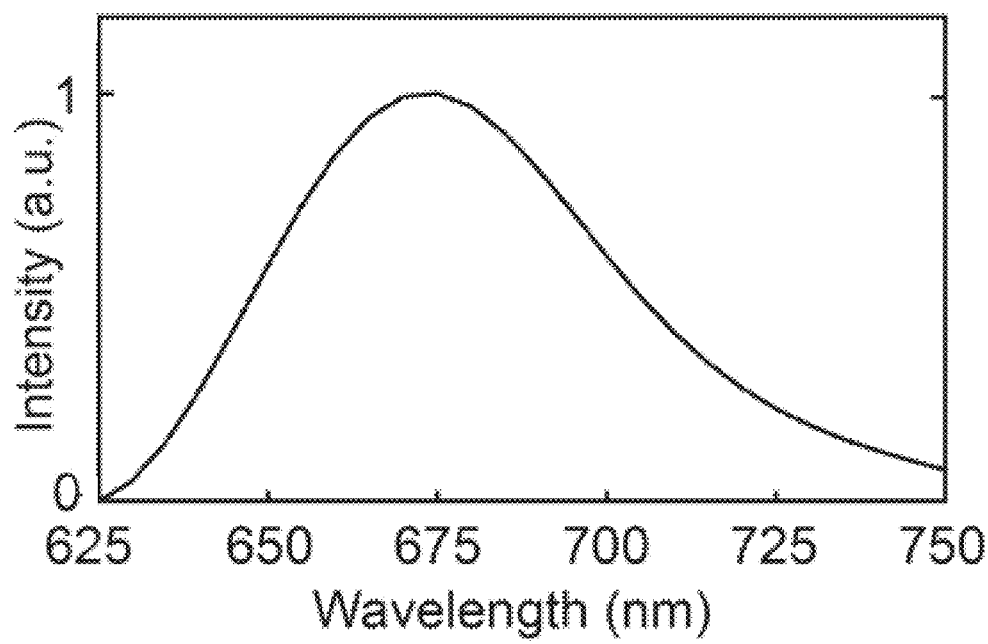
FIG. 6H: Averaged spectrum of one nanosphere from 200 frames, corresponding to the cluster identified by the dashed square in FIG. 6G.

We characterized the spectroscopic signatures of nanospheres using the spectral centroid method[5,13]. FIG. 6G shows the scatter plot of the photon count versus spectral centroid for five nanospheres. We observed a narrow spectral centroid distribution of the five nanospheres centred at 696 nm with a spectral precision of 0.35 nm. FIG. 6H shows the averaged spectrum of one of the nanospheres from 200 frames (purple cluster in FIG. 6G.)

Figure 8D:
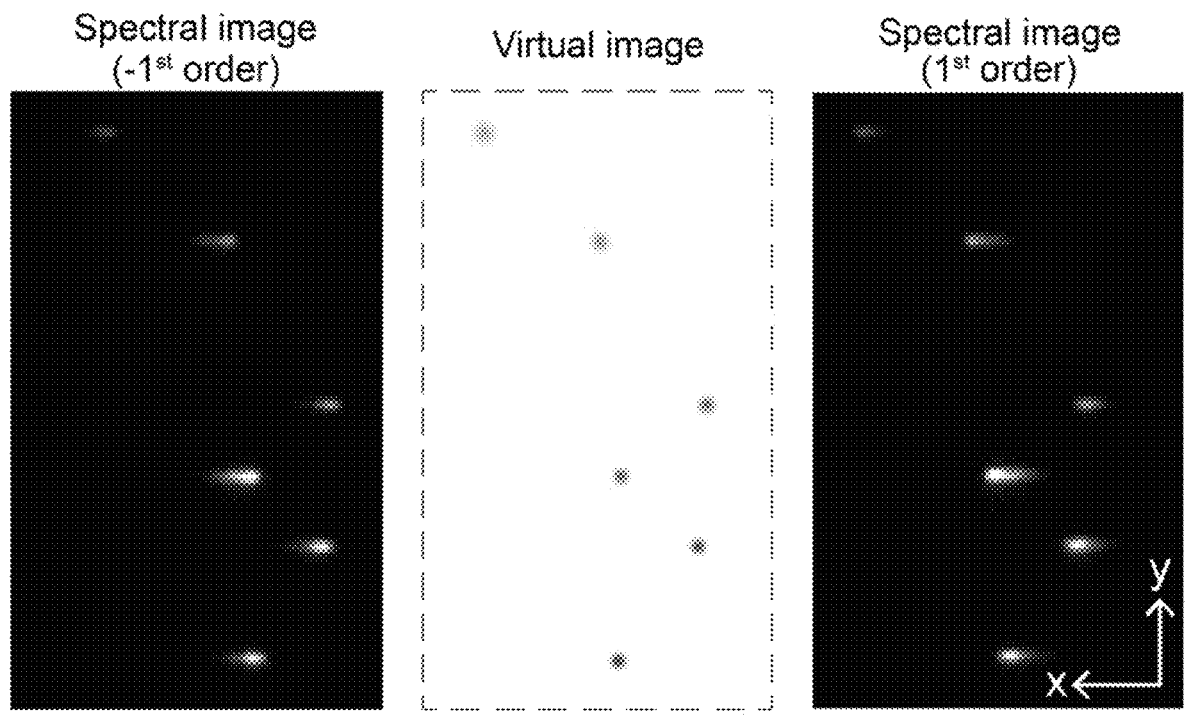
FIG. 8D: Spectral centroid distribution of individual nanospheres. The red and blue colours in FIG. 8C correspond to the spectral centroids of 690.6 nm and 696.5 nm, respectively, with spectral precisions of 0.48 nm and 0.53 nm.
Figure 8D:
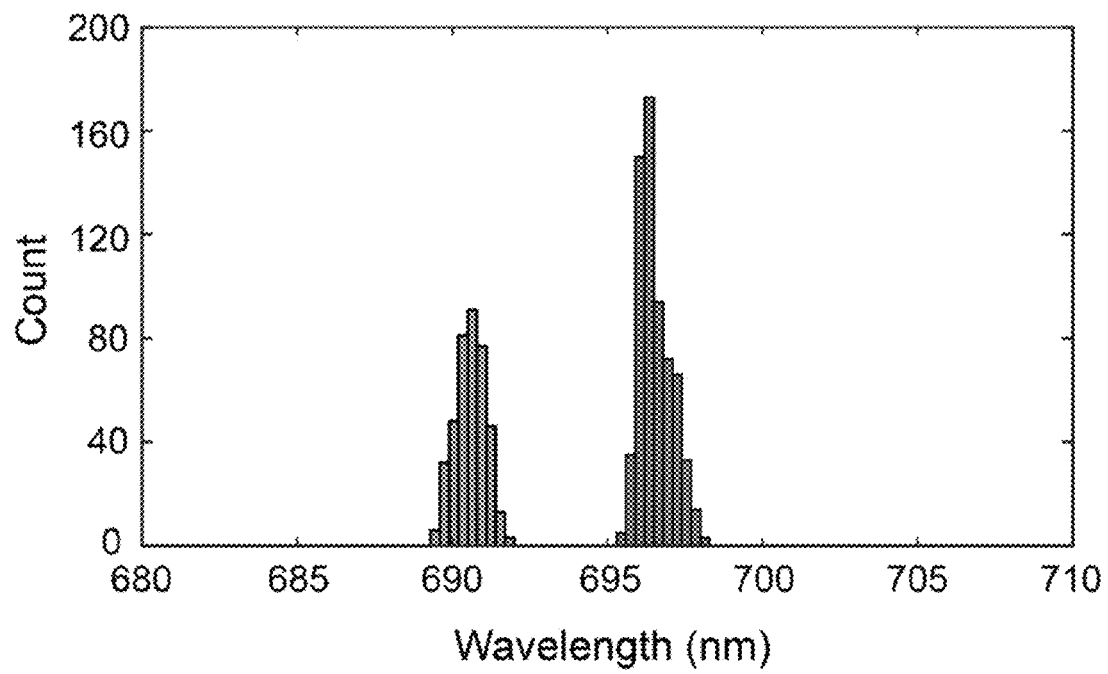

In addition to functional imaging based on spectral analysis[7], sSMLM allows multicolour imaging with theoretically unlimited multiplexing capability. The multiplexing capability is predominantly determined by the spectral separation of selected dyes and the spectral precision under given experimental conditions[1,5,6]. We validated this capability of SDsSMLM using two types of nanospheres (200-nm diameter, F8806 and F8807, Invitrogen). Experimental details are described in Materials and Protocols section. FIGS. 8A and 8B show the first frame of the simultaneously recorded spectral images. While estimating the spatial locations of individual molecules (FIG. 8C), we successfully classified different types of nanospheres based on their spectral centroid distribution (FIG. 8O). The red and blue colours in FIG. 8C correspond to the spectral centroids of the crimson nanospheres (centred at 690.6 nm with a spectral precision of 0.48 nm) and far-red nanospheres (centred at 696.5 nm with a spectral precision of 0.53 nm), respectively, in FIG. 8D.

Numerical simulation and experimental validation of the localization precision in SDsSMLM: In SDsSMLM, collected photons are dispersed into more pixels in the spectral image than in the spatial image[5,13]. Thus, the spatial precision of the PSF in spectral images ($-1^{st}$ and $1^{st}$ orders) is more sensitive to noise contributions than the spatial precision of the PSF in the spatial image (0th order). Such spatial precision is affected not only by the number of collected photons and background but also by experimental parameters in the spectral channel, such as the spectral dispersion (SD)13 and full-width at half-maximum (FWHM) of the emission spectrum, which refers to the emission bandwidth of a single molecule.

Spectral dispersion (SD) is defined as the wavelength range per individual pixel (nm pixel$^{-1}$). It is mainly determined by the camera pixel size, the diffraction angle at the −1st or 1st orders, and the effective focal length of relay optics. This can be approximated by, $$\Delta\lambda = W_p \times \frac{d\cos\theta}{f \times m}, \quad (3)$$

where $W_p$ [μm] is the camera pixel size; d [μm] is the groove spacing; θ [degree] is the diffraction angle; m [dimensionless] is the order of the maxima of the blazed grating (typically 1); and f [mm] is the effective focal length of the relay optics defined by $Df_2/f_1$. D [mm] is the distance from the grating position to the intermediate image plane; $f_1$ [mm] is the focal length of the collimating lens); $f_2$ [mm] is the focal length of the focusing lens.

Through numerical simulation, we investigated the influence of the SD and emission bandwidth of the emission spectrum on the spatial precision as well as spectral precision under different experimental conditions. We further compared the spatial and spectral precisions in SDsSMLM and sSMLM both numerically and experimentally using QDs. The experimental details are described in Materials and Protocols. We compared the achievable spatial and spectral precisions under different SD and emission bandwidth values, where the total photon count was 1000. In sSMLM, we set the splitting ratio between the spatial ($0^{th}$ order) and spectral ($1^{st}$ order) channels to 1:3, following previously reported experimental conditions[2,4-6,8]. We approximated the emission spectrum shape as a Gaussian function. To simulate two symmetrical spectral images, we first generated a spatial image. The spatial image was modeled as a 2D Gaussian function with a sigma value of 0.94 pixel, which represents the experimental conditions: back-projected pixel size of 160 nm and PSF FWHM of 350 nm. Then, we convolved the generated spatial image with the emission spectrum of the dye molecule being simulated to generate a spectral image ($1^{st}$ order). Next, we generated an identical spectral image ($-1^{st}$ order). We modeled various noise sources, such as signal and background shot noise, and readout noise. The shot and readout noises follow Poisson and Gaussian distributions, respectively. Finally, we generated noise-added spectral images at different signal and noise levels. We used a readout noise of 1 e− and 3000 iterations in all simulations.

We estimated the spatial precision of SDsSMLM using the simulated spectral images. The spatial precision was calculated using the standard deviation of the distribution of the estimated ($x_0$, $y_0$) in the virtual spatial image. By averaging the two spatial precisions along the x- and yp-axes, we calculated a final spatial precision. In addition, we estimated the spectral precision of SDsSMLM using the simulated spectral images. The spectral precision was calculated using the standard deviation from the distribution of the spectral centroid.

To compare the performance of SDsSMLM with that of sSMLM, we also estimated the spatial precision in sSMLM. We first generated noise-added spatial images at different signal and noise levels. Then, we estimated the spatial precision using standard deviation from the spatial location distributions. Additionally, we estimated the spectral precision of sSMLM. This procedure was essentially the same as described for SDsSMLM, except that only one spectral image corresponding to the $1^{st}$ order was used to obtain the emission spectrum.

Finally, we compared the spatial and spectral precisions of SDsSMLM with those obtained from sSMLM given varying splitting ratios between the $0^{th}$ and $1^{st}$ orders. For fair comparisons, we assumed that SDsSMLM and sSMLM share the same total number of photons. For SDsSMLM, the total photons were split equally between the $-1^{st}$ and $1^{st}$ orders while sSMLM varied splitting ratios between the $0^{th}$ and $1^{st}$ orders.

Figure 9A:
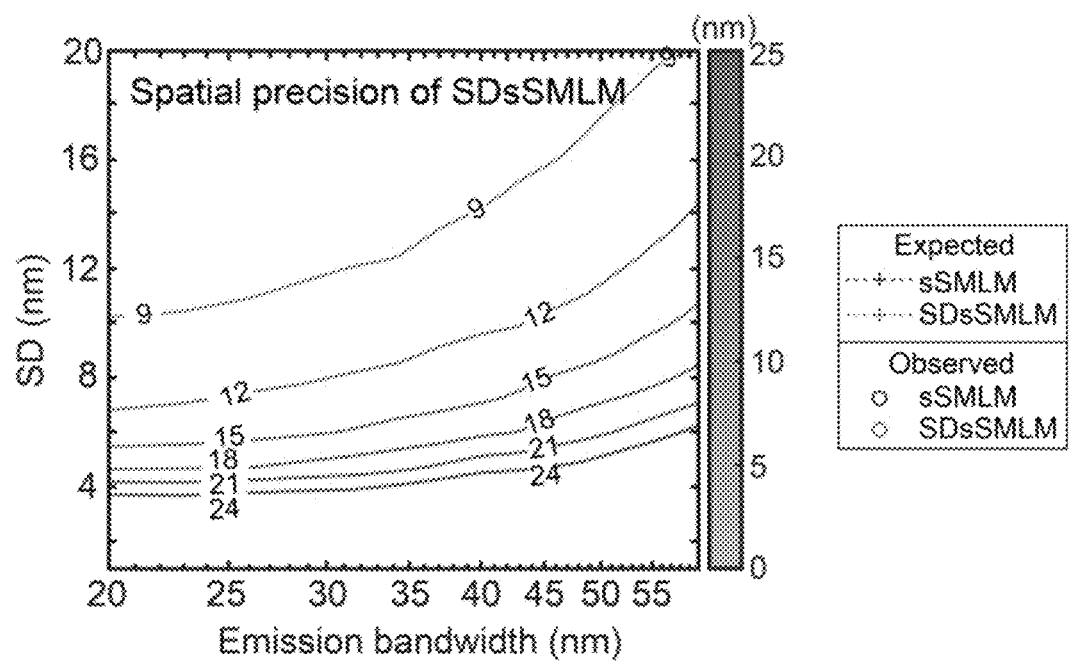
FIGS. 9A-9B: Contour map of the spatial and spectral precisions in SDsSMLM under varying SD and emission bandwidth.
Figure 9B:
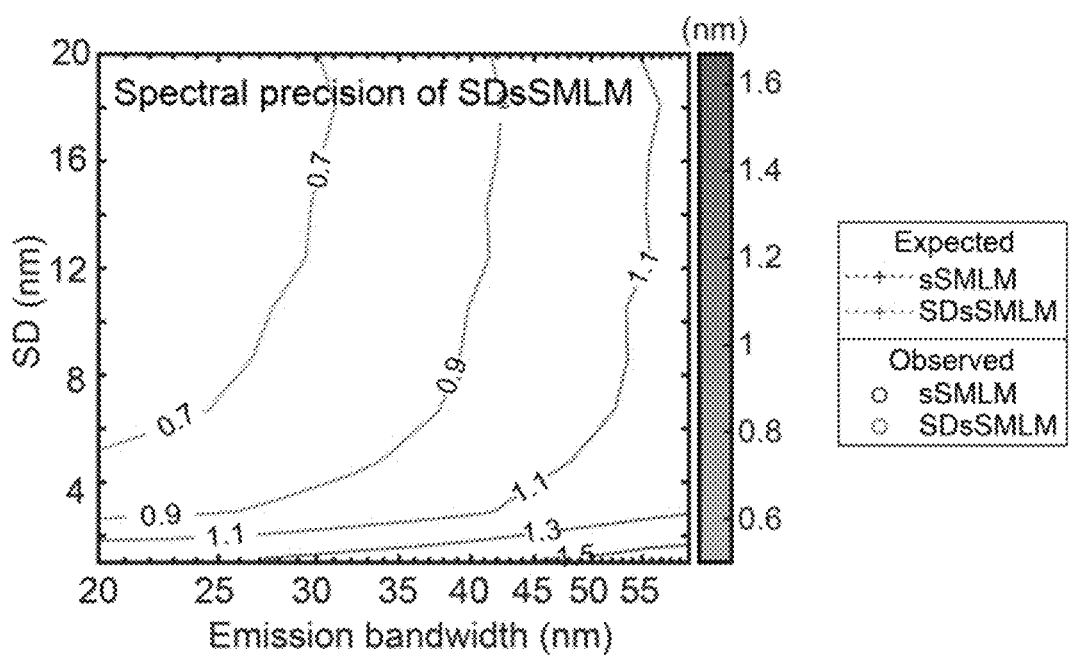
Figures 10A, 10B:
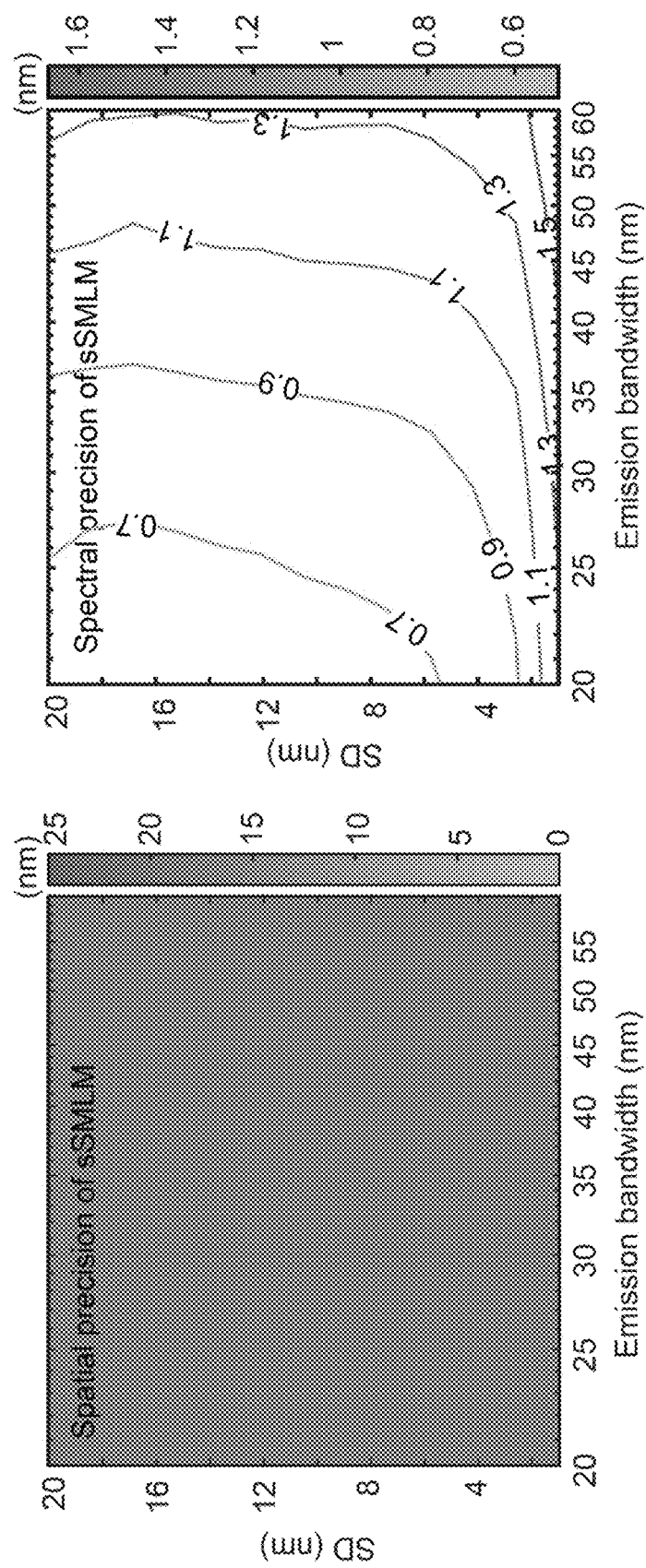
FIGS. 10A-10B: Spectral dispersion (SD) vs. emission bandwidth for SDsSMLM (FIG. 10B) and for sSMLM (FIG. 10A).

FIG. 9A shows a 2D contour map of the estimated spatial precision of SDsSMLM. Overall, a larger SD and a narrower emission bandwidth favour higher spatial precision. They also favour higher spectral precision (FIG. 9B and FIG. 10B). These trends are fundamentally governed by the contributions of various types of noise, such as the signal shot noise, background shot noise, and readout noise, and they agree well with analytical solutions, especially for the spectral precision[13]. In contrast, sSMLM shows a uniform spatial precision regardless of the SD and emission bandwidth (FIG. 10A). This is because that information in the spectral image is only used for spectral analysis in sSMLM, which is independent from and does not contribute to spatial localization.

Figure 9C:
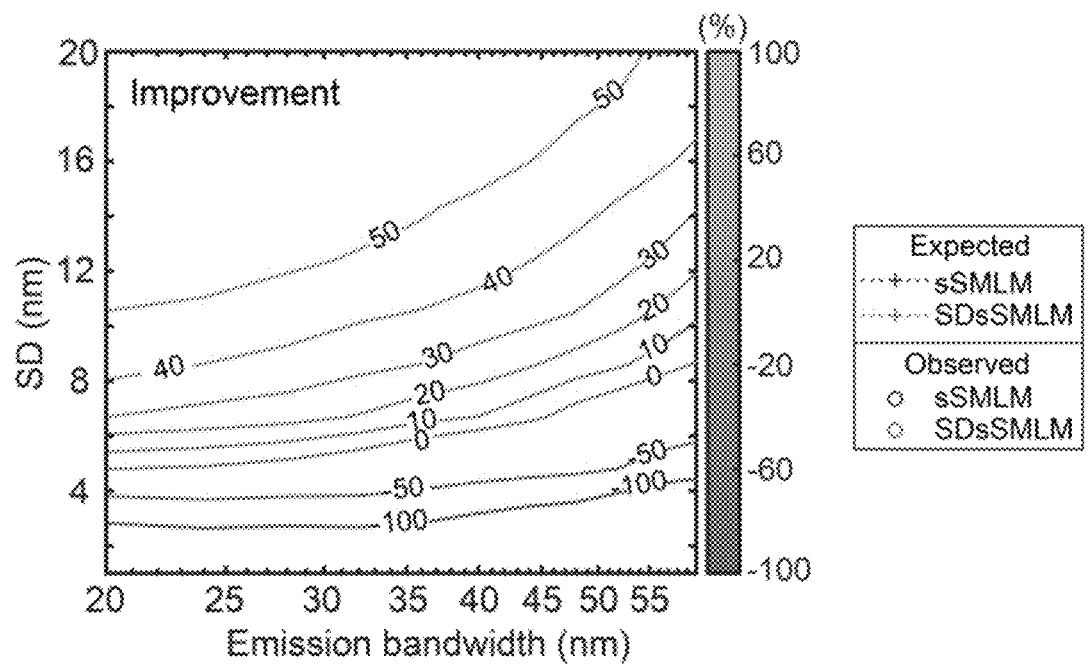
FIGS. 9C-9D: Contour map of improvements in the spatial and spectral precisions in SDsSMLM compared with sSMLM.
Figure 9D:
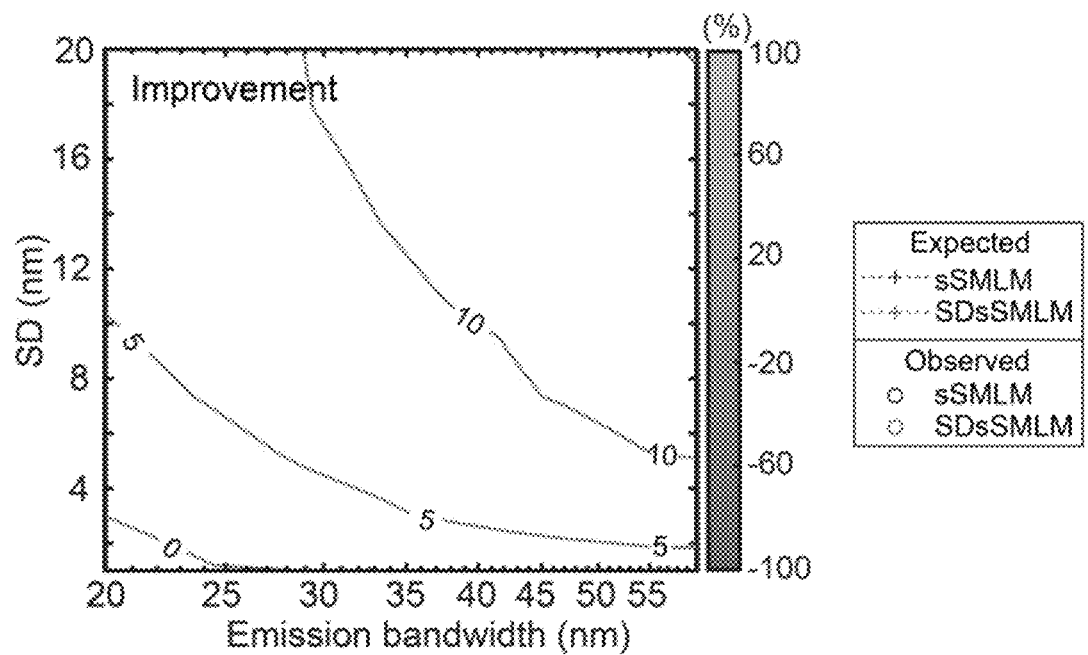
Figure 9E:
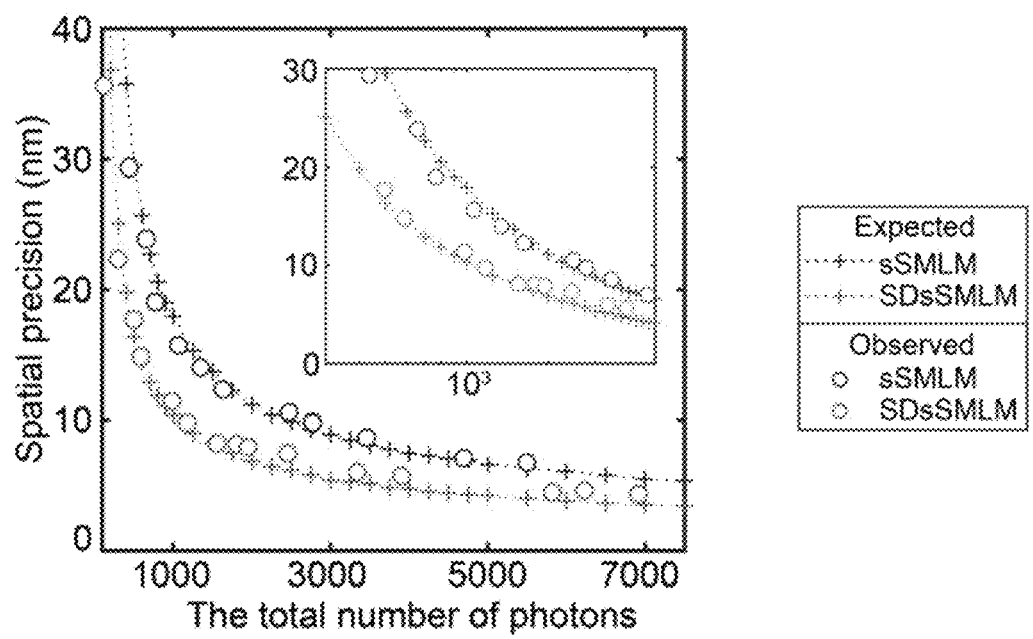
FIGS. 9E-9F: Spatial and spectral precisions in SDsSMLM and sSMLM as a function of the number of photons at a 10.5-nm SD and a 35-nm emission bandwidth. The magenta and blue colours represent SDsSMLM and sSMLM, respectively. The plus and circle symbols represent the theoretically and experimentally estimated precisions, respectively.
Figure 9F:
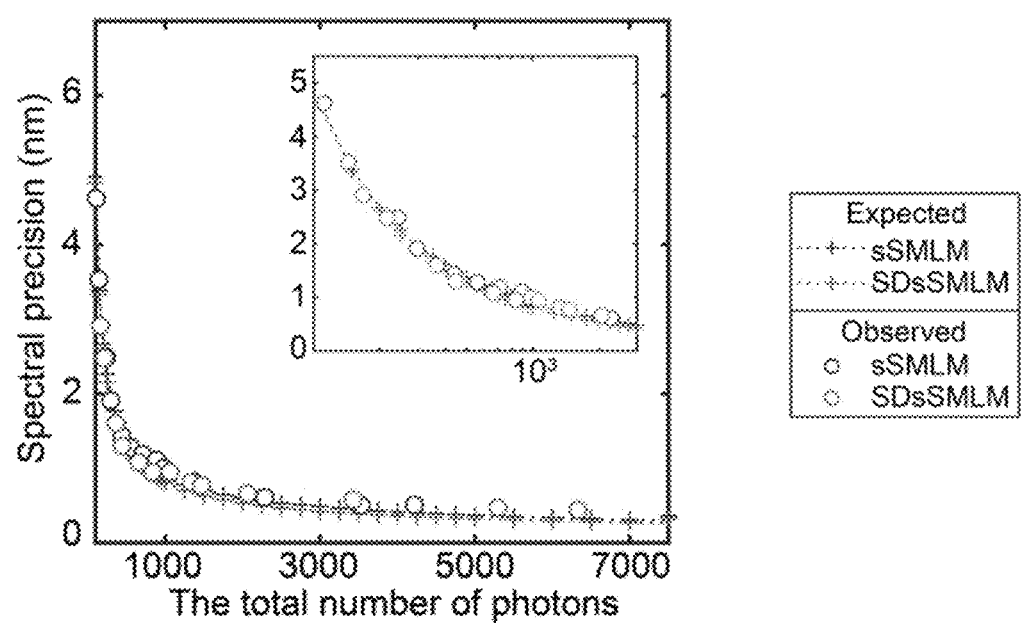
Figure 11:
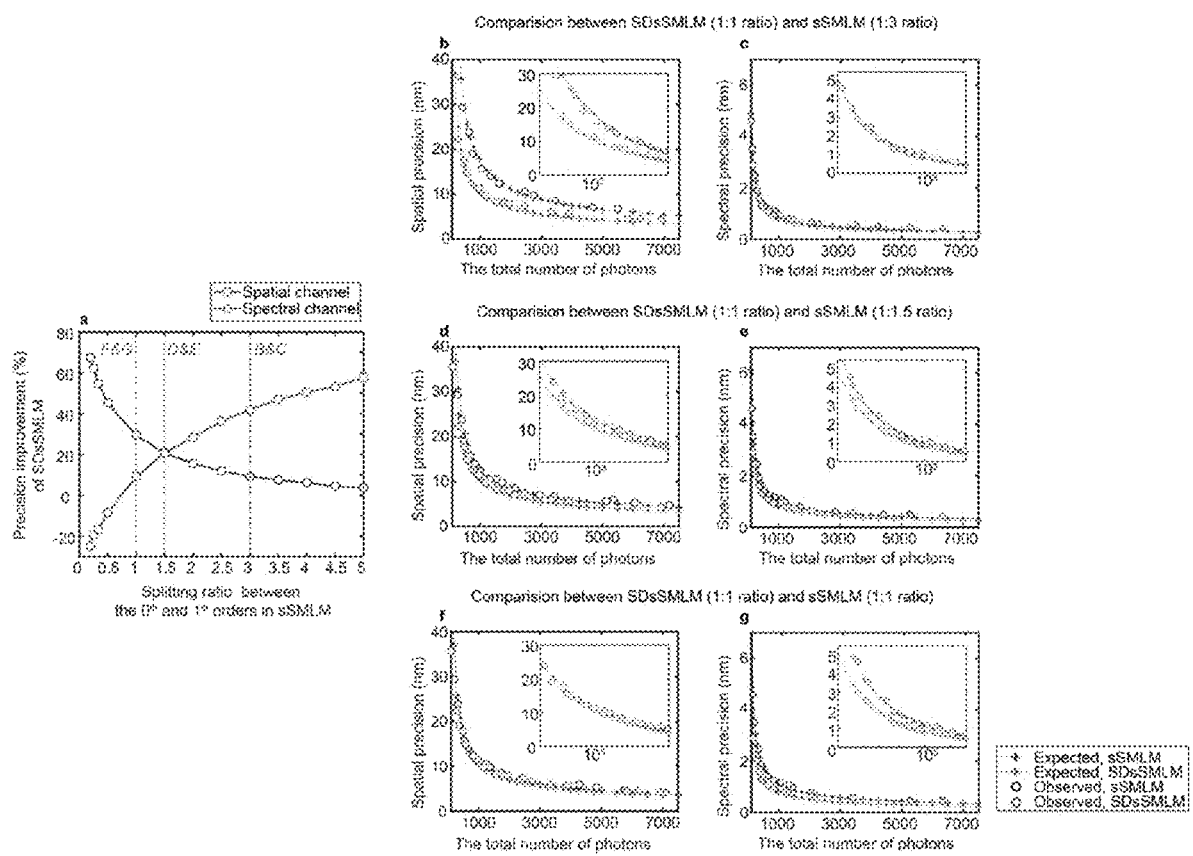
FIG. 11: Plots of spectral precision or precision improvement (using embodiments disclosed herein) vs total number of photons showing influence of the splitting ratio on the spatial and spectral precisions.

FIGS. 9C and 9D show the improvements in the spatial and spectral precisions, respectively, in SDsSMLM compared with sSMLM with respect to the SD and emission bandwidth. For example, at a 10.5-nm SD and a 35-nm emission bandwidth, which represent the experimental conditions in imaging QDs, SDsSMLM shows approximately 42% (from 17.93 to 10.34 nm) and 10% (from 0.90 to 0.81 nm) higher spatial and spectral precisions, respectively, compared with sSMLM. In particular, SDsSMLM offers a relatively uniform improvement, approximately 10%, in the spectral precision overall. This improvement is proportional to the square root of the ratio of the number of photons allocated to the spectral channel between SDsSMLM and sSMLM (FIG. 9D). We further estimated the achievable spatial and spectral precisions when the number of photons increased. As shown in FIGS. 9E and 9F, the theoretical estimations are in good agreement with the experimental results using QDs. In addition, we investigated the influence of the splitting ratio on the spatial and spectral precisions (FIG. 11).

Figures 12A, 12B:
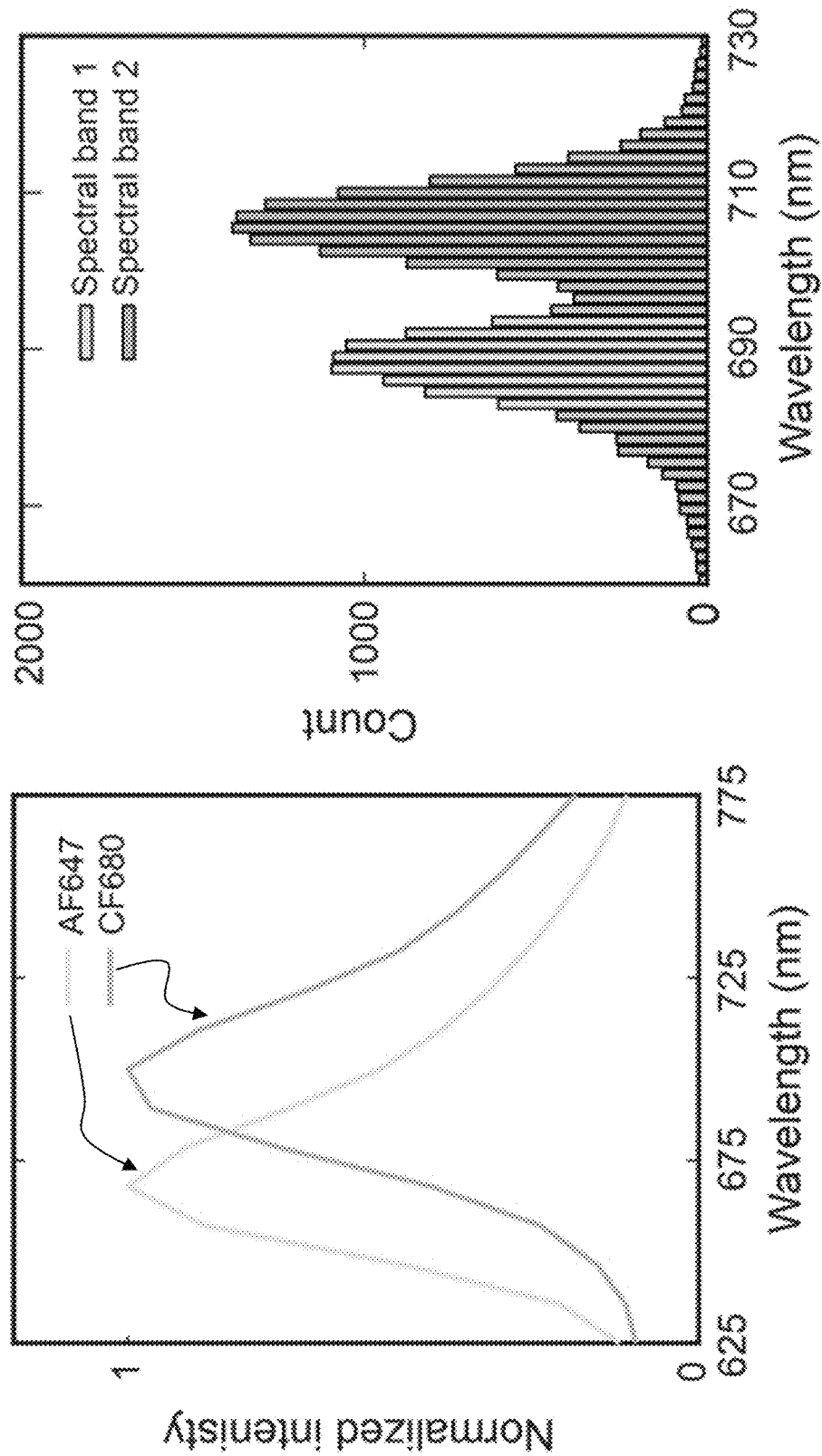
FIG. 12A: Normalized emission spectra of AF647 (yellow) and CF680 (cyan).
FIG. 12B: Spectral centroid distributions of AF647 (yellow, 682 nm to 694 nm) and CF680 (cyan, 699 nm to 711 nm).
Figure 13:
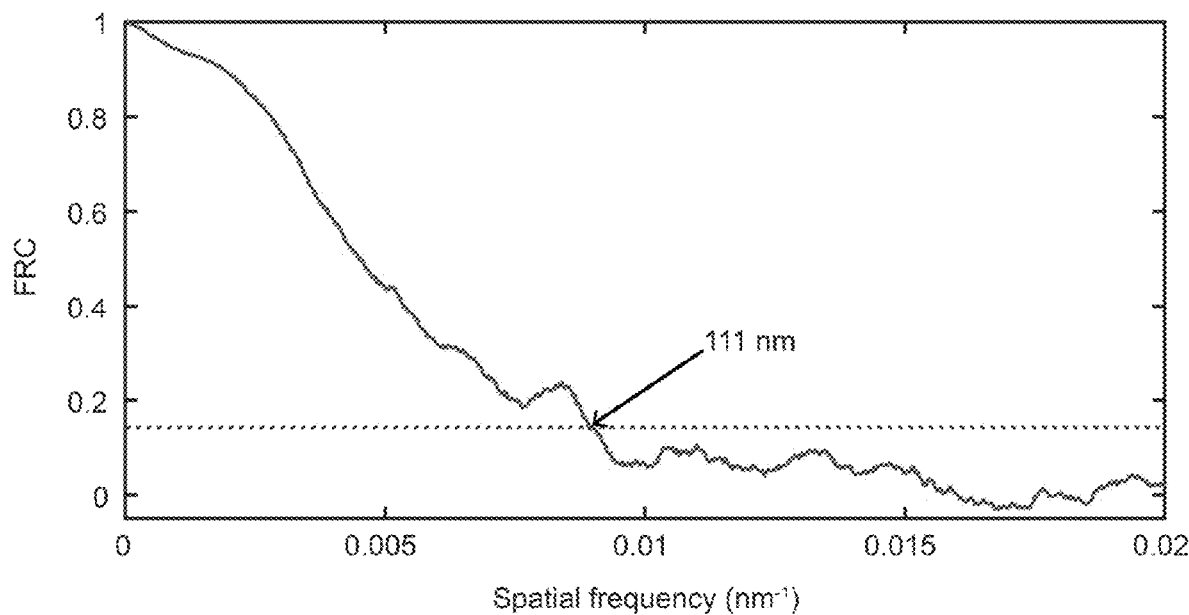
FIG. 13: Plot of FRC vs. spatial frequency. The FRC curve estimated a resolution of 111 nm at a threshold level of $\frac{1}{7}$.

Multicolour SDsSMLM imaging of COS7 cells: We demonstrated the multicolour imaging capability of SDsSMLM using fixed COS7 cells. We selected Alexa Fluor 647 (AF647) and CF680, which emit at wavelengths only ~30 nm apart (FIG. 12A), to label mitochondria and peroxisomes, respectively[1,6]. To classify them, we used different spectral bands based on the spectral centroid distribution[5,6]: the first band from 682 nm to 694 nm for AF647 and the second band from 699 nm to 711 nm for CF680, as highlighted by the yellow and cyan colours in FIG. 12B, respectively. We visualized the colocalization of mitochondria (yellow) and peroxisomes (cyan) (FIG. 12C). We also imaged microtubules labelled with AF647 (magenta) and mitochondria labelled with CF680 (green) (FIG. 12D). By measuring the FWHM of a segment of an imaged microtubule (dashed square in FIG. 12D), we estimated the spatial resolution of SDsSMLM to be 66 nm, as shown in FIG. 12E. Additionally, we observed that the minimum resolvable distance between two tubulin filaments is within the range of 81-92 nm based on multiple Gaussian fittings of the intensity profiles (FIGS. 12F and 12G). Using the Fourier ring correlation (FRC) method[16], we also evaluated the resolution of another reconstructed image (FIG. 12C) that visualizes mitochondria and peroxisomes. The FRC curve estimated a resolution of 111 nm (FIG. 13) at a threshold level of ½.

Figure 14:
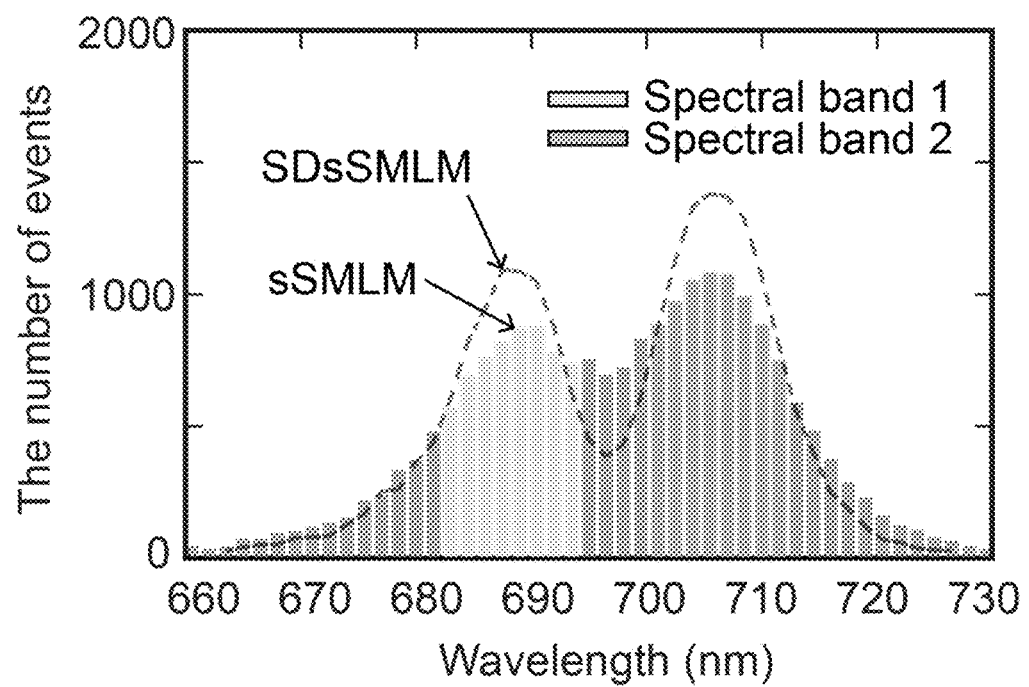
FIG. 14: Plot of number of events vs. wavelength for sSMLM and SDsSMLM.

In addition, we quantified the utilization ratio, which is defined as the ratio of the number of localizations allocated into each spectral band to the total number of localizations, in the reconstructed image (FIG. 12C). We calculated the utilization ratio in SDsSMLM using both spectral images. We also calculated the utilization ratio by using only one spectral image (1$^{st}$ order channel), which mimics conventional sSMLM with a 1:1 splitting ratio between the spatial and spectral channels, for comparison. We obtained a 17.4% improvement in the utilization ratio in SDsSMLM, on average for the two spectral channels, compared with that in sSMLM (FIG. 14). This result demonstrates that SDsSMLM benefits from improved spectral precision by fully utilizing all collected photons for spectral analysis, which subsequently leads to improved spectral classification for multicolour imaging.

Figure 15A:
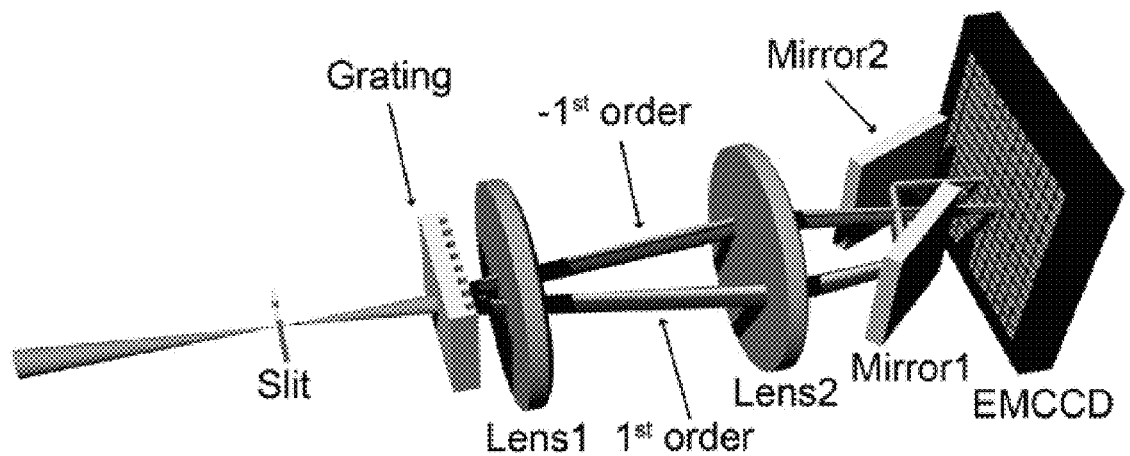
FIG. 15A: Schematic of the 3D biplane SDsSMLM system.

3D single particle tracking: We added a 3D imaging capability to SDsSMLM through biplane imaging, similar to what we reported in sSMLM[5]. Since SDsSMLM already has two symmetrically dispersed spectral channels, we can efficiently implement biplane imaging by introducing an extra optical pathlength in one channel. As shown in FIG. 15A, we added a pair of mirrors into the 1$^{st}$ order spectral channel in front of the EMCCD camera to generate such an optical pathlength difference. This optical pathlength difference introduced a 500-nm axial separation between the imaging planes of the two spectral channels. As a result, individual molecules are imaged with different PSF sizes according to their axial locations. By measuring the ratio between the sizes of the PSFs, we can determine the axial coordinate of each molecule through an axial calibration curve. The full description of biplane SDsSMLM image reconstruction is described in Materials and Protocols.

Figure 15B:
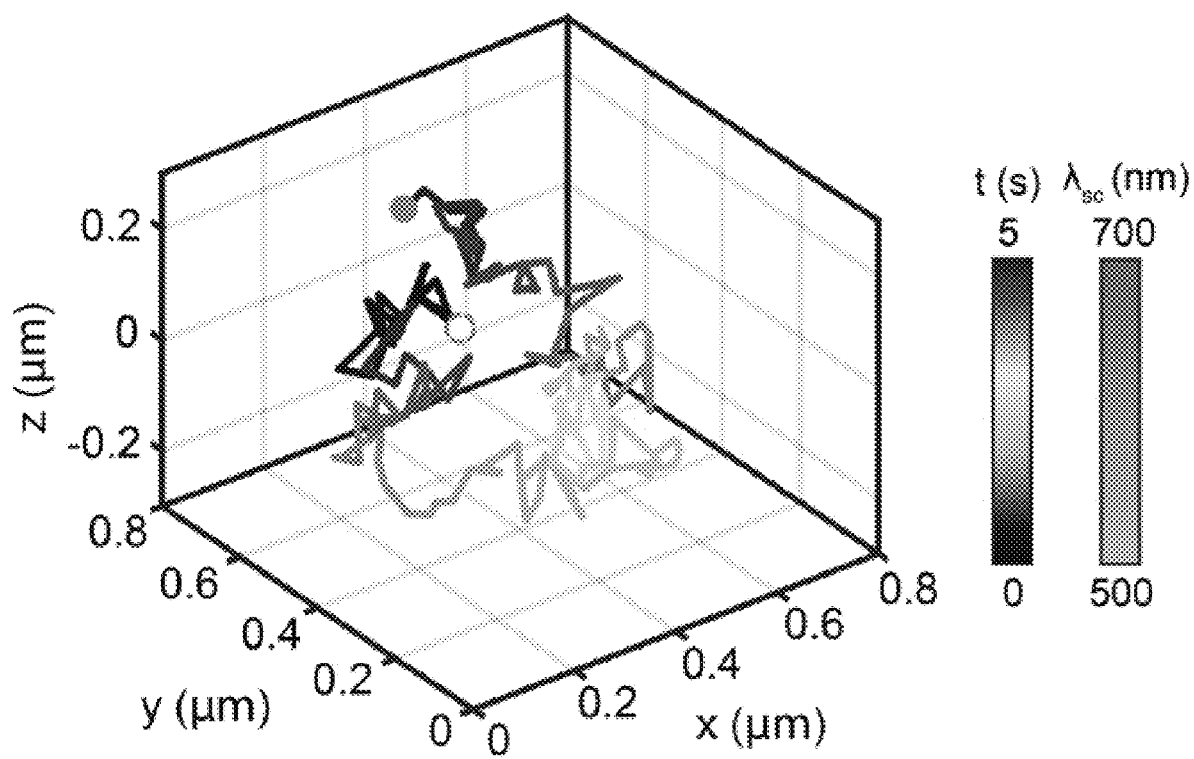
FIG. 15B: Imaged 3D trajectory of a single QD colour coded with respect to the acquisition time (solid line). The QDs in the first and last frames are highlighted by circles colour coded with respect to the measured spectral centroids.
Figure 16B:
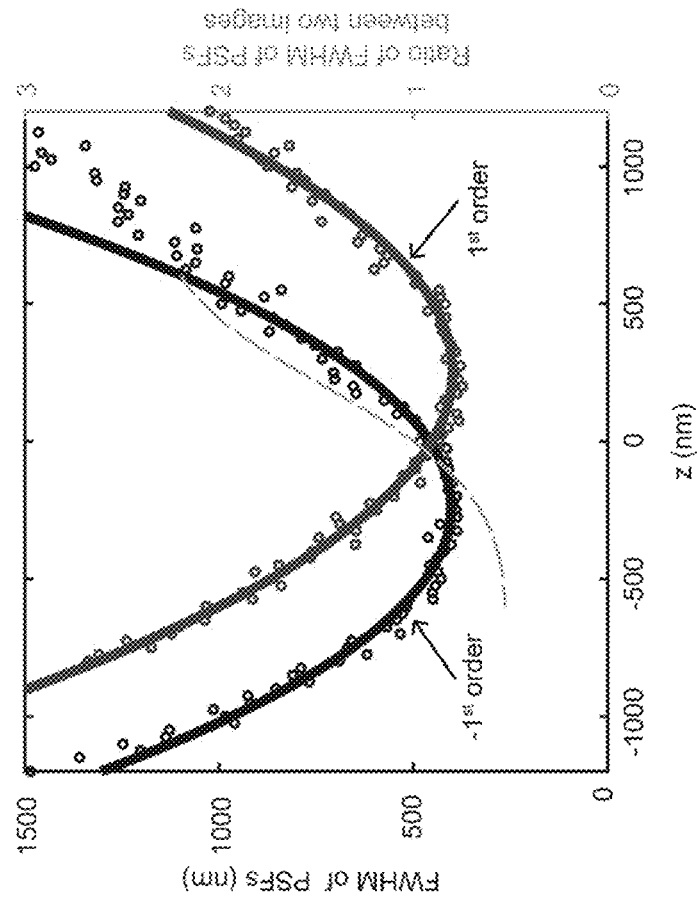
FIGS. 16A-16B: Plot of count vs wavelength showing corresponding to observing that the spectral centroids remained near 614 nm throughout the tracking period with a spectral precision of 1.5 nm (FIG. 16A). The FWHM of the two 1 D $PSF_y$s to estimate their ratio (FIG. 16B).
Figure 16A:
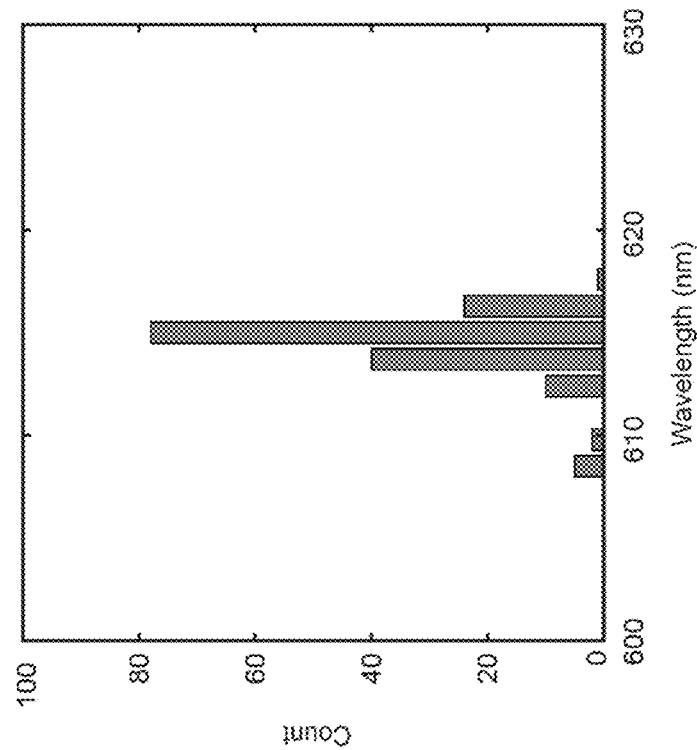

We demonstrated 3D biplane SDsSMLM by tracking individual QDs in a suspension. We tracked the movement of QDs for 5 s. We recorded 160 frames with an exposure time of 5 ms at a frame rate of 30 Hz. FIG. 15B shows the 3D trajectory of one QD, colour coded with respect to time (represented by the line). The QD locations in the first and last frames are highlighted by the circles colour coded according to the measured spectral centroids. We observed that the spectral centroids remained near 614 nm throughout the tracking period with a spectral precision of 1.5 nm (FIG. 16A). We approximated the diffusion coefficient from the 3D trajectory using D=MSD/6t, where MSD is the mean squared displacement and t is the frame acquisition time[17]. The calculated diffusion coefficient is 0.012 μm²/s. These results demonstrate the capability of 3D biplane SDsSMLM to precisely reconstruct the 3D spatial and spectral information of single molecules in SPT.

Discussion: We demonstrated that SDsSMLM acquires both spatial and spectral information of single molecules from two symmetrically dispersed spectral images without capturing the spatial image. SDsSMLM maintains the highest achievable spectral precision per emitter in given experimental conditions, as it fully uses all collected photons for spectral analysis. In addition, it addresses the inherent trade-off between the spatial and spectral precisions by sharing all collected photons in both spatial and spectral channels. We observed that SDsSMLM achieved 10.34-nm spatial and 0.81-nm spectral precisions with 1000 photons, which correspond to 42%, approximately doubled photon enhancement, and 10% improvements in the spatial and spectral precisions, respectively, compared with sSMLM using a 1:3 ratio between the spatial and spectral channels.

We applied SDsSMLM to multicolour imaging and 3D SPT. It should be noted that these experimental demonstrations were based on a grating that split the beam into the -1$^{st}$ and 1$^{st}$ orders with efficiencies of 22.5% and 24%, respectively. Thus, only approximately half of the photons of the emitted fluorescence were used for image reconstruction in multicolour imaging. Consequently, the current implementation of SDsSMLM has a reduced image resolution. This can be improved by replacing this grating with a new phase grating that can significantly suppress the 0$^{th}$ order and maximize the transmission efficiency only at the -1$^{st}$ and 1$^{st}$ orders, with the relatively high total transmission efficiency expected to be more than 85%[18]. In comparison, the blazed grating reported in our previous sSMLM system[5,6] has an absolute transmission efficiency of ~18% for the $0^{th}$ order and an absolute transmission efficiency of ~50% for the $1^{st}$ order in the far-red channel, corresponding to an overall efficiency of ~68%. Considering the ~85% efficiency of the phase grating, the localization precision will scale favourably due to the increased photon utilization efficiency. In this work, to compare both the spatial and spectral precisions between SDsSMLM and conventional sSMLM, we assumed an identical total number of photons in both systems and 100% absolute transmission efficiency. Specifically, we compared two cases: (1) 25% absolute transmission efficiency for the $0^{th}$ order and 75% absolute transmission efficiency for the $1^{st}$ order in the standard sSMLM system and (2) 50% absolute transmission efficiency for both the $1^{st}$ and $-1^{st}$ orders in SDsSMLM. This reasonably mimics a comparison study using the optimized phase grating and the normal blazed grating. In addition, the resolution can be further improved by using a larger SD and a narrower emission bandwidth, as SDsSMLM favours a large SD and a narrow emission bandwidth for high spatial precision. However, an extremely low SD may compromise one of the benefits of SDsSMLM for functional studies that involve resolving minute spectroscopic features in single-molecule spectroscopy. This suggests that SDsSMLM requires careful dye selection and system optimization to achieve the desired spatial and spectral precisions.

The FOV in SMLM is mainly determined by the objective lens, the field of illumination, and the active area of the camera. For sSMLM equipped with a grating-based spectrometer, the FOV is further restricted by the diffraction angle of the $1^{st}$ order of the grating, which determines the separation between the spatial and spectral images. In this work, our FOV was restricted to ~30×5 µm², as we also captured the $0^{th}$ order to compare the virtual and actual spatial images. This constraint can be relaxed in the future by using a customized grating that suppresses the $0^{th}$ order. In this case, the FOV primarily depends on the separation between the $-1^{st}$ and $1^{st}$ orders, which could increase the FOV by at least two-fold. Additionally, it can be further addressed in 3D biplane SDsSMLM by separately manipulating the two diffraction orders.

In 3D biplane SDsSMLM, the PSFs of the individual molecules in the spectral images are blurred when they are at out of focus planes. This does not allow for a detailed spectral analysis. However, the calculated spectral centroid can still be used to separate two dyes with slightly different fluorescence spectra[5]. In addition, small differences occur in the magnification and the SD between the two spectral images, caused by their different pathlengths. However, the spectral centroid is not significantly affected by these issues and is sufficient for extracting spectroscopic signatures of individual molecules. We numerically corrected them before image reconstruction and spectral analysis. We observe a spectral precision of 1.5 nm throughout the tracking period under the given experimental conditions: the signal level is ~6700 photons, and the background level is ~800 photons in total.

Exemplary Materials and Protocols:
Optical Setup and Image Acquisition for SDsSMLM Imaging.

We performed all experiments using a home-built SDsSMLM system based on an inverted microscope body (Eclipse Ti-U, Nikon) (FIG. 5A). We used a 640-nm laser to excite nanospheres, AF647, and CF680 and a 532-nm laser to excite QDs. The laser beam was reflected by a dichroic filter (FF538-FD101/FF649-D101-25X36, Semrock) and focused onto the back aperture of an oil immersion objective lens (CFI Apochromat 100X, Nikon). We used a high oblique angle to illuminate the samples. The emitted fluorescence light was collected by the objective lens and focused by the tube lens onto the intermediate image plane after passing through a longpass filter (LPF) (BLP01-532R/647R-25, Semrock). We inserted a slit at the intermediate image plane to confine the FOV and subsequently placed a transmission grating (46070, Edmund Optics) to disperse the emitted fluorescence into the $-1^{st}$, $0^{th}$ and $1^{st}$ orders. Then, the dispersed fluorescence emissions were captured by an EMCCD camera (iXon 897, Andor) with a back-projected pixel size of 160 nm after passing through relay optics (f=150 mm, AC508-150-B-ML, Thorlabs).

For SDsSMLM imaging of nanospheres, we acquired 200 frames at a power density of ~0.02 kW/m² with an exposure time of 20 ms. For the experimental validation of the localization precision using QDs, we acquired 200 frames while varying the signal intensity (photon count) by adjusting the EMCCD exposure time and controlling the illumination power using a neutral density filter (NDC-50C-4M, Thorlabs). For multicolour SDsSMLM imaging of fixed COS7 cells, we acquired 20000 frames at ~10 kW/cm² with an exposure time of 20 ms. For SPT in 3D, we acquired 160 frames at ~0.02 kW/cm² with an exposure time of 5 ms.

Image Reconstruction for SDsSMLM Imaging

For image reconstruction, we first localized the individual molecules in two spectral images $$(PSF_{x_{-1}y_{-1}} \text{ and } PSF_{x_{+1}y_{+1}})$$

with 2D Gaussian fitting using ThunderSTORM[14]. Then, using customized MATLAB codes, we classified them into two groups corresponding to the $-1^{st}$ and $1^{st}$ orders and estimated the spatial locations of pairs of localizations by calculating their mean values. Next, we formed the virtual image ($PSF_{x_0y_0}$) using the estimated spatial locations.

Figures 17A, 17B:
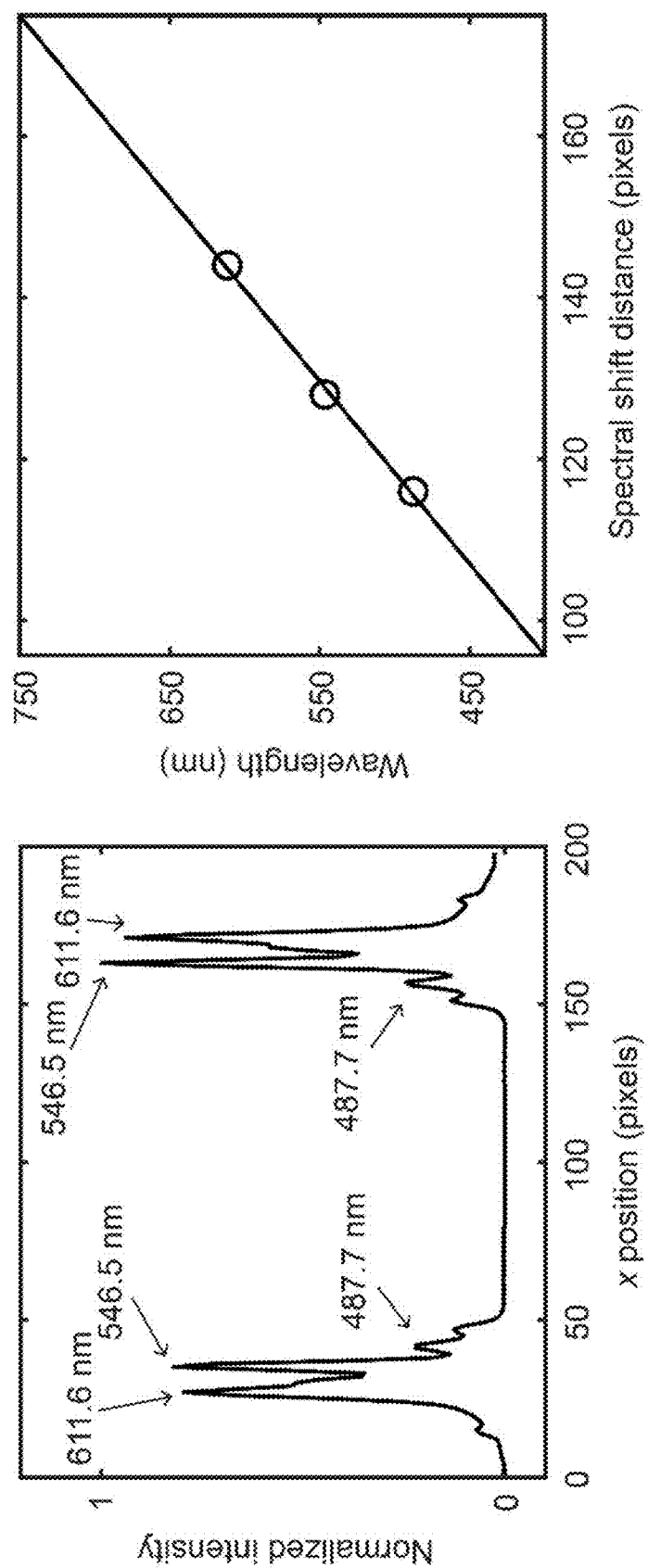
FIGS. 17A-17B: The calibration image included multiple spectral lines of the calibration lamp in the two spectral images. By integrating the two spectral images along the y-axis, we obtained emission peaks centred at 487.7, 546.5, and 611.6 nm (FIG. 17A). Then, we obtained a calibration curve by fitting the wavelengths of the emission peaks with their corresponding pixel distances using a linear polynomial function (FIG. 17B).

For spectral calibration, we first captured a calibration image using a narrow slit and a calibration lamp. This calibration image included multiple spectral lines of the calibration lamp in the two spectral images. By integrating the two spectral images along the y-axis, we obtained emission peaks centred at 487.7, 546.5, and 611.6 nm (FIG. 17A). Then, we obtained a calibration curve by fitting the wavelengths of the emission peaks with their corresponding pixel distances using a linear polynomial function (FIG. 17B). Using the obtained calibration curve, we calibrated the emission spectra of individual molecule pairs. Finally, we obtained the final emission spectra by combining the two symmetrical emission spectra. We used the three emission peaks at 487.7, 546.5, and 611.6 nm of the calibration lamp for the first experimental demonstration using nanospheres and the two emission peaks at 620.23 and 603.24 nm of a neon lamp (6032, Newport) in all other experiments.

To characterize the spectroscopic signatures of individual molecules, we used the spectral centroid[13]. For all the experimental demonstrations, we estimated the spectral centroid in the same manner except for multicolour imaging using nanospheres. Unfortunately, in this experiment, we rarely distinguished two different types of nanospheres based on the spectral centroid values, as the emission of one of the nanospheres (crimson) was partially rejected by the LPF. Thus, we fitted the emission spectrum using a Gaussian function and used the emission peak as an approximation of the spectral centroid.

For imaging nanospheres, QDs, and fixed cells, we used spectral windows of 650-750 nm, 565-665 nm, and 625-775 nm, respectively. In addition, we rejected blinking events below 500 photons during the spectral analysis in multicolour imaging of fixed cells. In addition, we used an SD of 8.8 nm/pixel in nanosphere imaging and an SD of 10.5 nm in all other experiments.

Image Reconstruction for 3D Biplane SDsSMLM

We reconstructed the 3D image in a similar manner as previously described for 3D biplane sSMLM[5] except that we used one symmetrically dispersed spectral image (~$1^{st}$ order), instead of the spatial image ($0^{th}$ order), together with another spectral image ($1^{st}$ order) for biplane imaging. We first captured a 3D calibration image using QDs. This image contained a few samples in both spectral images at different depths. The QDs were scanned from −1.5 µm to +1.5 µm along the z-axis with a step size of 25 nm. Next, we obtained one-dimensional (1D) $PSF_y$s by integrating the spectral images along the x-axis. Then, we measured the FWHM of the two 1 D $PSF_y$s and estimated their ratio (FIG. 16B). We used this ratio to calibrate the axial coordinate of each molecule.

Sample Preparation for SDsSMLM Imaging

We prepared nanosphere samples for single and multicolour SDsSMLM imaging according to the following steps. Cover glass was rinsed with phosphate buffered saline (PBS), coated with poly-l-lysine (PLL, P8920, Sigma-Aldrich) for 1 hour, and washed with PBS 3 times. Nanospheres (200-nm diameter; F8806 and F8807, Invitrogen) were diluted $10^4$ times with a cross-linking buffer containing EDC (1 mg mL$^{-1}$, 1-ethyl-3-(3-dimethylaminopropyl) carbodiimide hydrochloride) and NHS (1 mg mL$^{-1}$, N-hydroxysuccinimide) in 50 mM MES buffer (2-(N-morpholino) ethanesulfonic acid, pH=~6, 28390, Thermo Fisher). Two hundred microlitres of the cross-linking buffer with nanospheres was added to the PLL-coated cover glass. The cover glass was rinsed with PBS and dried under filtered air. Then, a drop of antifade mounting medium (P36965, Invitrogen) was added to a cover slip. The cover glass with the samples was mounted on the cover slip by sandwiching the samples between them.

We prepared the QD sample according to the following steps. QDs (777951, Sigma-Aldrich) were diluted $10^4$ times in water. A total of 400 µL of the QD solution with a concentration of 0.5 µg mL$^{-1}$ was deposited onto cover glass using a Laurell WS-650SZ-23NPPB spin-coater at 2000 rpm for 1 min. The cover glass with the sample was mounted on a cover slip by sandwiching the sample between them.

For multicolour SDsSMLM imaging, COS7 cells (ATCC) were maintained in Dulbecco's Modified Eagle Medium (DMEM, Gibco/Life Technologies) supplemented with 2 mM L-glutamine (Gibco/Life Technologies), 10% fetal bovine serum (Gibco/Life Technologies), and 1% penicillin and streptomycin (100 U mL$^{-1}$, Gibco/Life Technologies) at 37° C. with 5% CO2. Cells were plated on cover glass at approximately 30% confluency. After 48 hours, the cells were rinsed with PBS and then fixed with 3% paraformaldehyde and 0.1% glutaraldehyde in PBS for 10 min at room temperature. After washing with PBS twice, the cells were quenched with 0.1% sodium borohydride in PBS for 7 min and rinsed twice with PBS. The fixed cells were permeabilized with a blocking buffer (3% bovine serum albumin (BSA) and 0.5% Triton X-100 in PBS for 20 min), followed by incubation with the primary antibodies in the blocking buffer for 1 hour. For multicolour imaging of mitochondria and peroxisomes, the primary antibodies used in the study were mouse anti-TOM20 directly labelled with AF647 (2.5 µg mL$^{-1}$, sc-17764-AF647, Santa Cruz) and rabbit anti-PMP70 (1:500 dilution, PA1-650, Thermo Fisher). The samples were washed three times with washing buffer (0.2% BSA and 0.1% Triton X-100 in PBS) for 5 min and incubated with secondary antibodies labelled with CF680 (2.5 µg mL$^{-1}$ donkey anti-rabbit IgG-CF680) for 40 min. For multicolour imaging of microtubules and mitochondria, the primary antibodies used in the study were sheep anti-tubulin (2.5 µg mL$^{-1}$, ATN02, Cytoskeleton) and mouse anti-TOM20 (2.5 µg mL$^{-1}$, sc-17764, Santa Cruz). After washing with washing buffer three times for 5 min, the samples were incubated with secondary antibodies labelled with AF647 and CF680 (2.5 µg mL$^{-1}$ donkey anti-sheep IgG-AF647 and anti-mouse IgG-CF680) for 40 min. The dyes were conjugated to the IgG following a literature protocol (degree of label=~1)[19]. The cells were then washed with PBS three times for 5 min and stored at 4° C. An imaging buffer (pH=~8.0, 50 mM Tris, 10 mM NaCl, 0.5 mg mL$^{-1}$ glucose oxidase (G2133, Sigma-Aldrich), 2000 U/mL catalase (C30, Sigma-Aldrich), 10% (w/v) D-glucose, and 100 mM cysteamine) was used to replace PBS before image acquisition.

For 3D SPT, a QD solution of 0.5 µg mL$^{-1}$ in water was mixed with glycerol (v/v=1:9) and vortexed for 10 s. Then, 50 µL of the final solution was immediately added onto cover glass. The free-diffusing single QDs were then observed and tracked.

REFERENCES CORRESPONDING TO EXAMPLE 2

1 Zhang, Z. et al. Ultrahigh-throughput single-molecule spectroscopy and spectrally resolved super-resolution microscopy. Nature Methods 12, 935-938 (2015).

2 Dong, B. et al. Super-resolution spectroscopic microscopy via photon localization. Nature Communications 7, 12290 (2016).

3 Bongiovanni, M. N. et al. Multi-dimensional super-resolution imaging enables surface hydrophobicity mapping. Nature Communications 7, 13544 (2016).

4 Zhang, Y. et al. Far-red photoactivatable BODIPYs for the super-resolution imaging of live cells. Journal of the American Chemical Society 140, 12741-12745 (2018).

5 Song, K. H. et al. Three-dimensional biplane spectroscopic single-molecule localization microscopy. Optica 6, 709-715 (2019).

6 Zhang, Y. et al. Multicolor super-resolution imaging using spectroscopic single-molecule localization microscopy with optimal spectral dispersion. Applied Optics 58, 2248-2255 (2019).

7 Lee, J. E. et al. Mapping surface hydrophobicity of α-synuclein oligomers at the nanoscale. Nano Letters 18, 7494-7501 (2018).

8 Dong, B. et al. Parallel three-dimensional tracking of quantum rods using polarization-sensitive spectroscopic photon localization microscopy. ACS Photonics 4, 1747-1752 (2017).

9 Kakizuka, T. et al. Simultaneous nano-tracking of multiple motor proteins via spectral discrimination of quantum dots. Biomedical Optics Express 7, 2475-2493 (2016).

10 Huang, T. et al. Simultaneous multicolor single-molecule tracking with single-laser excitation via spectral imaging. Biophysical Journal 114, 301-310 (2018).

11 Rieger, B. & Stallinga, S. The lateral and axial localization uncertainty in super-resolution light microscopy. ChemPhysChem 15, 664-670 (2014).

12 Deschout, H. et al. Precisely and accurately localizing single emitters in fluorescence microscopy. Nature Methods 11, 253-266 (2014).
13 Song, K. H. et al. Theoretical analysis of spectral precision in spectroscopic single-molecule localization microscopy. Review of Scientific Instruments 89, 123703 (2018).
14 Ovesný, M. et al. ThunderSTORM: a comprehensive ImageJ plug-in for PALM and STORM data analysis and super-resolution imaging. Bioinformatics 30, 2389-2390 (2014).
15 Long, F., Zeng, S. Q. & Huang, Z. L. Effects of fixed pattern noise on single molecule localization microscopy. Physical Chemistry Chemical Physics 16, 21586-21594 (2014).
16 Banterle, N. et al. Fourier ring correlation as a resolution criterion for super-resolution microscopy. Journal of Structural Biology 183, 363-367 (2013).
17 Kao, H. P. & Verkman, A. S. Tracking of single fluorescent particles in three dimensions: use of cylindrical optics to encode particle position. Biophysical Journal 67, 1291-1300 (1994).
18 Ebeling, C. G. et al. Increased localization precision by interference fringe analysis. Nanoscale 7, 10430-10437 (2015).
19 Dempsey, G. T. et al. Evaluation of fluorophores for optimal performance in localization-based super-resolution imaging. Nature Methods 8, 1027-1036 (2011).

Example 3: Designing Three-Dimensional Spectroscopic Single-Molecule Localization Microscopy Using a Dual-Wedge Prism-Based Lensless Spectrometer We report three-dimensional (3D) spectroscopic single-molecule localization microscopy design using a dual-wedge prism (DWP)-based lensless spectrometer. All components are integrated into a compact assembly, minimizing absolute transmission loss and significantly reducing optical alignment requirement. We show its feasibility using ray-tracing and numerical simulation. Comparing with existing grating-based design, our new module improves lateral spatial precision by 45% (6.4 nm at the photon budget of 1000), while maintaining a similar spectral precision (3.6 nm). In addition, it also improves the axial precision by 27% (26.9 nm at the photon budget of 3000) in bi-plane 3D imaging.

Spectroscopic single-molecule localization microscopy (sSMLM) simultaneously provides spatial and spectral information of fluorescent molecules. It has been demonstrated as a powerful tool for cell biology and material science [1-6]. Existing sSMLM implementations can be classified into two categories: (1) prism-based [1-3] and (2) grating-based designs [4-6]. In prism-based sSMLM, it suffers from an inherent difficulty as it splits the collected photons into two separate optical beam paths, using a beam splitter (BS) and additional discrete optical components, to simultaneously form spatial and spectral images. Spectral analysis of sSMLM requires a precise mapping of the recorded spatial and spectral images, which imposes stringent requirement of precise alignment of these discrete optical components. It thus requires users with sophisticated optical alignment skills to achieve and maintain optimal performance of sSMLM systems.

In contrast, grating-based sSMLM better addresses these practical issues. It uses one diffraction grating to separate an incident beam into $0^{th}$ and $1^{st}$ diffraction orders, both of which are imaged onto a camera using the same imaging lens. Grating-based design significantly reduces the number of required discrete optical components [5-7] and improves system's reliability. However, grating-based design has its own limitations. Specifically, the $1^{st}$ diffraction order beam has angular incidence with respect to the imaging lens (or an optical axis), which may undermine localization uncertainty, either accuracy or precision, of the reconstructed image and the spectra analysis. The worsen uncertainty is particularly problematic in three-dimensional (3D) sSMLM using either astigmatism or biplane method as extra discrete optical elements, such as a cylindrical lens or pickoff mirrors, are necessary [1, 8, 9]. Hence, 3D grating-based sSMLM further required users to have with advanced expertise in optical instrumentation. Moreover, gratings often have higher transmission losses (~30%) comparing with prisms, which reduces photon budgets for spatial imaging and spectral analysis [6-8]. The transmission loss issue has not yet been fully addressed in grating-based sSMLM.

To make sSMLM accessible by biology research community, we aim to (1) vastly reduce the number of discrete optical components for simplified optical configuration and alignment and (2) significantly improve transmission loss. We designed a compact optical assembly using dual-wedge prism (DWP), referred to as DWP unit, to achieve our goals. By integrating a DWP-containing spectrometer into a lensless spectrometer, we can achieve 2D sSMLM with improved spatial precisions.

Figure 18A:
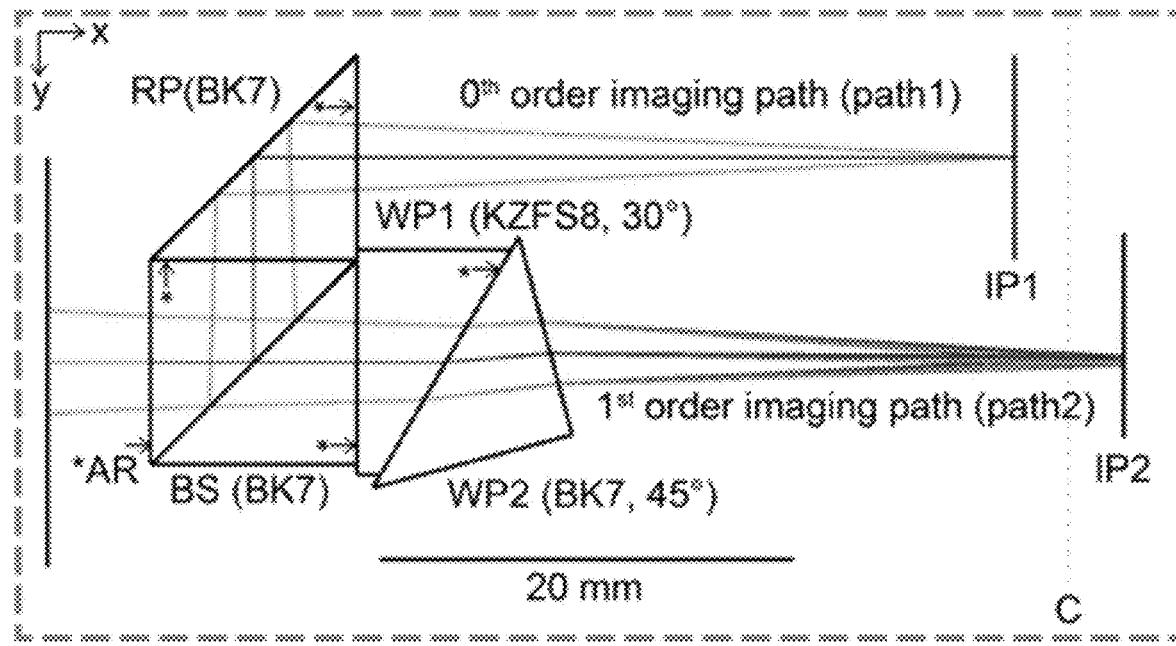
FIG. 18A. Proposed 3D sSMLM module design using Zemax. The preliminary model was demonstrated using off-the-shelf optics.

FIG. 18A illustrates a DWP-containing spectrometer, according to certain embodiments, which comprises a cube BS with a 1:1 split ratio, a right-angle prism (RP), and two wedge prisms (WP) that have different refractive index values. The incident beam is first split into two beam paths by the BS. The reflected beam (path 1) by the BS is further reflected by the RP and form a spatial image at its corresponding image plane (IP1). The transmitted beam (path 2) passes through WP1 (KZFS8 material, n=1.79 at 550 nm) and WP2 (BK7 material, n=1.52 at 550 nm) to be spectrally dispersed and form a spectral image at the corresponding image plane (IP2). This design was inspired by grating-prism or Grism, which has been widely used for spectroscopy in astronomy [10]. All incident surfaces of optics are anti-reflection coated to minimize transmission loss. This DWP-containing spectrometer permits an in-line optical layout because light is dispersed while canceling out the beam deviations with respect to an optical axis (or an image plane of a camera) by WP1 and WP2. In FIG. 18A: "BS" refers to a beam splitter, according to embodiments herein; "RP" refers to a right angle prism, which is an exemplary light-reflective device, according to embodiments herein; "WP" refers to a wedge prism, which is an exemplary dispersive optical device (e.g., WP1 is a first dispersive optical device and WP2 is a second dispersive optical device), according to embodiments herein; "IP" refers to an image plane, according to embodiments herein; and "AR" refers to an antireflective coating, according to embodiments herein.

We adjusted the optical path length difference between the path 1 and the path 2 to ~4 mm for axial separation of IP1 and IP2, which enables 3D biplane imaging [8]. We cemented all the optical components together to form the single DWP-containing spectrometer and the size of each component can be customized based on a specific requirement. In this work, we used off-the-shelf optical components for feasibility test and its layout is shown in FIG. 18A. We selected WP1 (PS873-A, Thorlabs, KZFS8 material, a wedge angle of 30°) for mainly dispersing the beam to obtain emission spectra of single molecules and WP2 (PS910H-A, Thorlabs, BK7 material, a wedge angle of 45°) to compensate for the deviation angle of WP1, together with a cube BS (BS010, Thorlabs, BK7 material) and a RP (PS910L-A, Thorlabs, BK7 material).

Figure 18B:
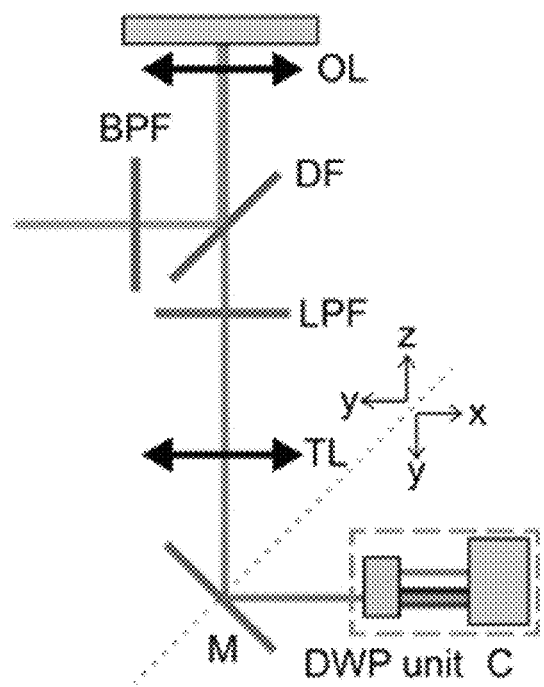
FIG. 18B. Optical setup of the integrated 3D sSMLM system. BS: cube beam splitter; RP: right-angle prism; WP: wedge prism; AR: anti-reflection coating; OL: objective lens; BPF: band pass filter; DF: dichroic filter; LPF: long pass filter; TL: tube lens; M: mirror; DWP unit: dual-wedge prism unit; IP: Image plane; C: Camera.

FIG. 18B shows the schematic of sSMLM using the new DWP-containing spectrometer, which is placed in front of a scientific complementary metal-oxide-semiconductor (sCMOS) camera (Prime95B, photometrics). The overall system is based on an inverted optical microscope (Eclipse Ti-U, Nikon), equipped with 647-nm laser (2RU-VFL-P-2000-647-B1R, MPB communications) with 2-W maximum output and an objective lens (100×, NA1.49, CFI apochromat TIRF, Nikon). The filter set consisted of a band-pass filter (FF01-642/10-25, Semrock), a dichroic mirror (FF649-D101-25X36, Semrock), and a long-pass filter (BLP01-647R-25, Semrock). The emitted fluorescence is guided by a mirror to the DWP-containing spectrometer after passing through the tube lens (TL). The fluorescence is further divided into a non-dispersed spatial channel and a spectrally dispersed spectral channel, and then captured by the sCMOS camera, which is placed in the middle of the two IPs, which is highlighted by C in FIG. 19A.

Figure 19A:
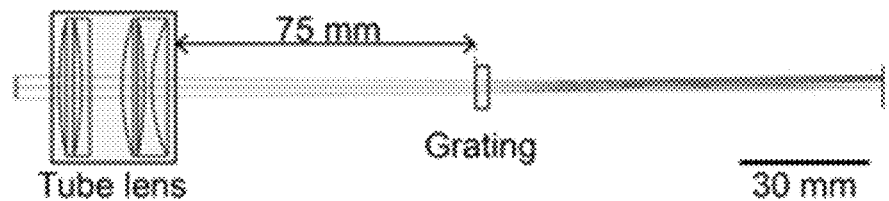
FIGS. 19A-19F. Layouts of (FIG. 19A) the grating-based and (FIG. 19B) the proposed DWP-based designs using Zemax.
Figure 19B:
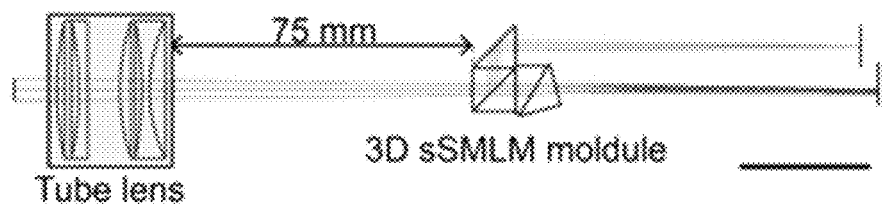
Figure 19C:
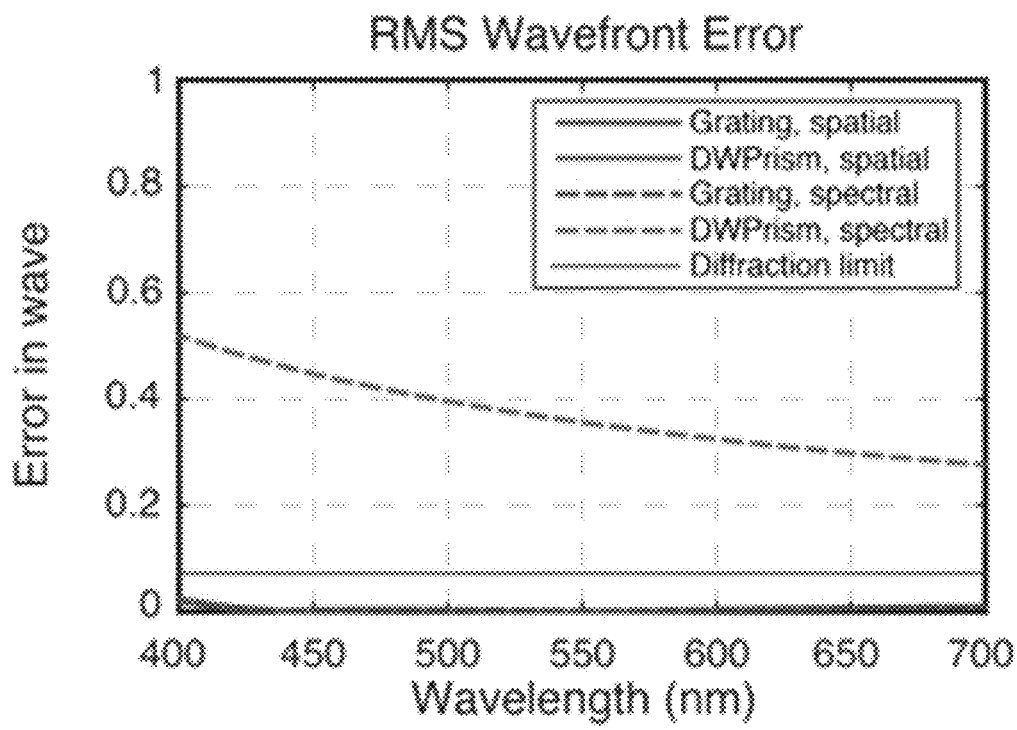

We compared performances of grating-based and DWP-based sSMLM using Zemax®, where their spectrometer layouts are shown in FIGS. 19A and 19B, respectively. In both designs, an incident beam was focused by a TL, which was modeled as an actual microscope component reported in [11]. And, the proposed module or the grating was placed a 75-mm distance from the TL. As shown in FIG. 19C, the simulated root-mean-square (RMS) wavefront errors of spatial beam paths in both designs are significantly lower than the reference diffraction-limited criterion over the visible range, indicating that both designs offer the diffraction-limited performance in the spatial image. And, we observed that a spectral beam path in the DWP-based design shows a slight error less than 0.5 wave. Although this error may influence the point spread function (PSF) in the y-axis in spectral image, it is not coupled with lateral spatial localization in the spatial image. Besides, calculating spectral centroid (SC) is tolerant enough to characterize emission spectra of single molecules and its influence on spectral precision is negligible [6-8, 12].

Figure 19D:
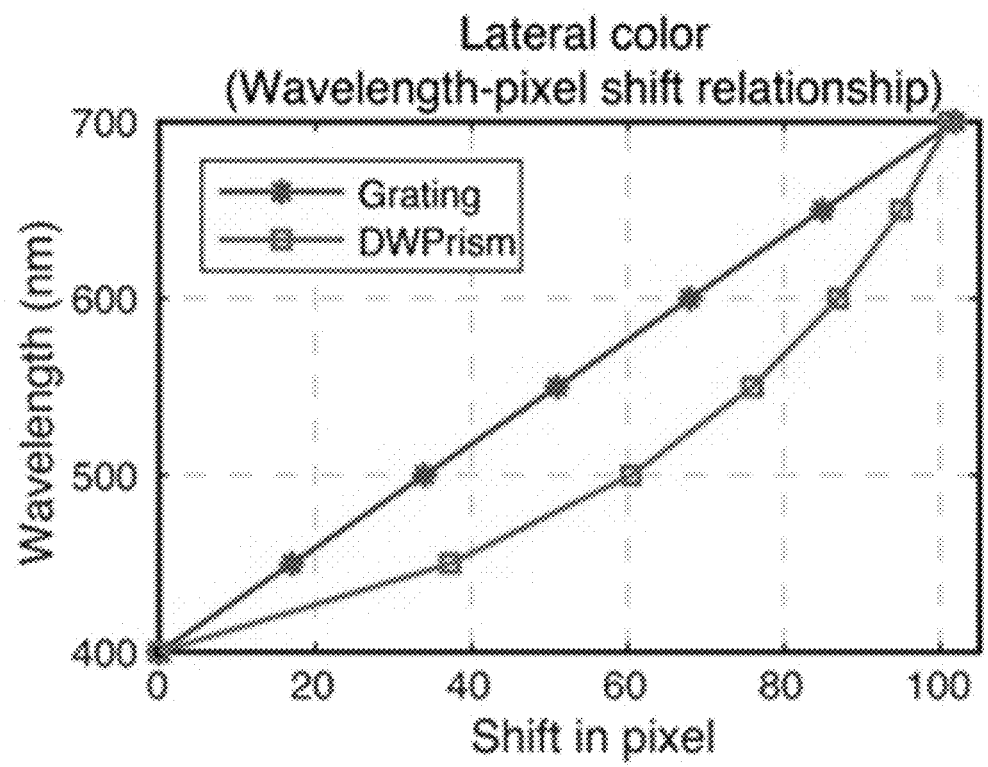
Figure 19E:
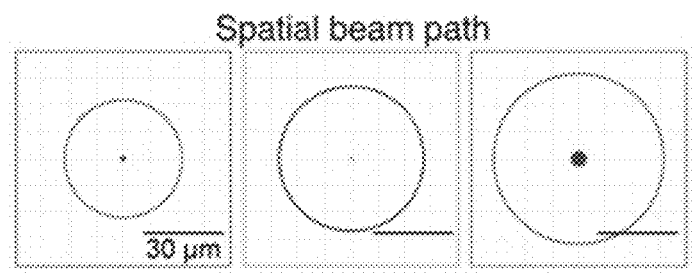
Figure 19E:
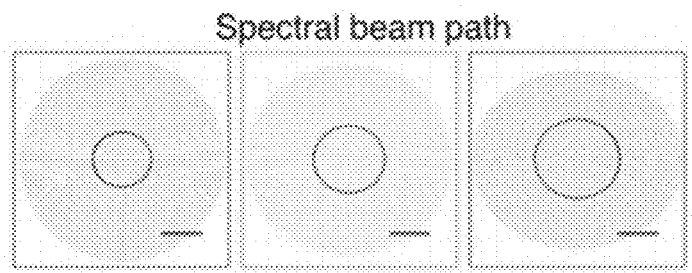
Figure 19F:
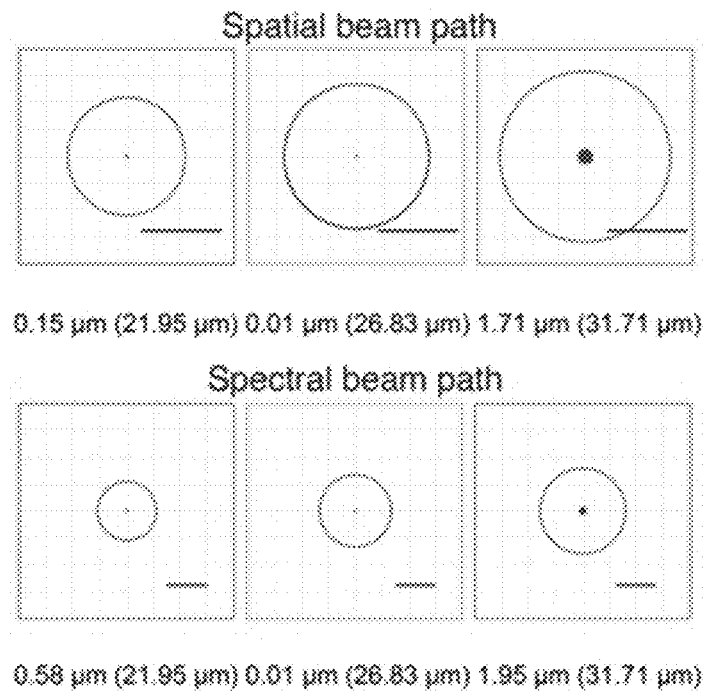

FIG. 19D shows a wavelength-pixel shift relationship, which indicates an achievable spectral dispersion (SD) [12] considering a given configuration and a camera pixel size of 11 μm. The grating is known for its linear dispersion (the blue curve in FIG. 19D) while the prism shows non-linear dispersion (the orange curve in FIG. 19D), which can be fitted using a third polynomial equation [1]. Overall, both designs provide an SD of 3 nm/pixel and, notably, the DWP-based design offers an optimal SD for multi-color imaging in a far-red channel, reported as ~6 nm/pixel [6]. FIGS. 19E and 19F show spot diagrams at different wavelengths in the grating-based and the DWP-based designs, respectively. The diffraction-limited performance of the spatial beam paths in both designs was also demonstrated by spots diagrams, as shown in FIGS. 19E and 19F. We observed 0.147-μm RMS radius with 21.95-μm Airy Radius in the DWP-based design and 0.147-μm RMS radius with 21.95-μm Airy Radius in the grating-based design, at 450 nm as an example.

We further estimated spatial and spectral precisions of the proposed DWP-based design and compared it with the grating-based sSMLM system, which generally contains a transmission grating and two imaging lenses [6, 7]. Given manufacturer's specifications, we assumed absolute transmission loss (at 670 nm) of 1% for each lens and 30% for the grating in the grating-based sSMLM system, and 5% for BS, 0.5% for RP, 3% for WP1 and 0.5% for WP2 in the DWP-based sSMLM system. It should be noted that we only considered the transmission loss of materials, in this estimation, by ignoring any absorption loss. Accordingly, absolute transmission efficiencies of the spatial and spectral images in the grating-based sSMLM system are 14% and 42%, respectively, given a quantum efficiency of the used sCMOS camera (85% at 670 nm) and a previously reported ~1:3 split ratio [6-8]. And, absolute transmission efficiencies of the spatial and spectral images in the DWP-based sSMLM system are 38% and 41% for, respectively. Then, we estimated lateral the spatial precision using Eq. (1) [13] and the spectral precision using Eq. (2) [12].

$$\Delta x^2 = \frac{\sigma^2 + a^2/12}{N}\left(1 + 4\tau + \sqrt{\frac{2\tau}{1+4\tau}}\right). \quad (1)$$

where $\tau=2\pi(b+n_{ro}^2)(\sigma^2+a^2/12)/Na^2$, $\sigma$ is the standard deviation of the Gaussian function (nm); a is the back-projected pixel size (nm); N is the number of detected photons; b is the number of background photons per pixel; and $n_{ro}$ is the readout noise (e−).

$$\sigma_\lambda^2 = \frac{s_\lambda^2}{N} + \frac{1024n_{bg}^2 s_\lambda^3 s_y}{3\Delta\lambda\Delta y N^2} + \frac{1024n_{ro}^2 s_\lambda^3 s_y}{3\Delta\lambda\Delta y N^2}. \quad (2)$$

where $s_\lambda$ and $s_y$ are standard deviations of the Gaussian function along the spectral-axis and the y-axis (nm); $n_{bg}^2$ is the number of background photons per pixel; $\Delta\lambda$ is the SD (nm/pixel); $\Delta y$ is the back-projected pixel size along y-axis (nm).

Figure 20A:
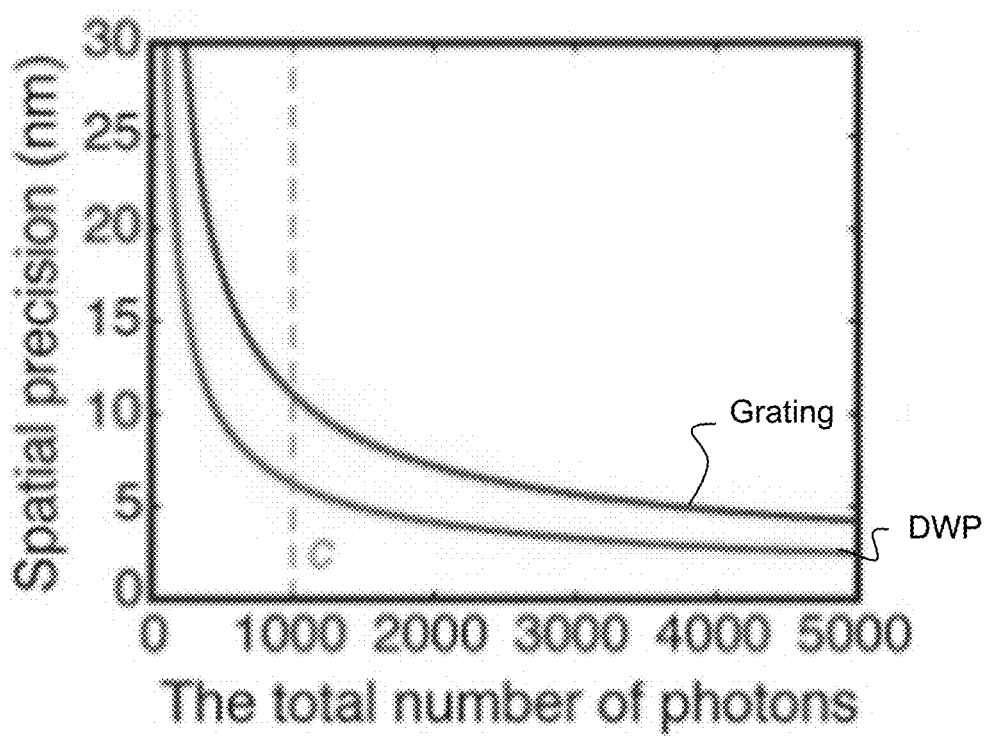
FIG. 20A. Theoretically estimated lateral spatial precision and (FIG. 20B) spectral precision of the grating-based and the proposed DWP-based designs.

As shown in FIG. 20A, we observed the proposed DWP-based design offers a significantly improved lateral spatial precision, almost doubled precision, (as 6.42 nm at 1000 photons), compared with the grating-based design (11.65 nm). This improvement is primarily originated from a higher transmission efficiency of the dispersive prism itself comparing to the grating. Meanwhile, both provides comparable spectral precisions (3.42 nm for the DWP-based design and 3.36 nm for the grating-based design) as their absolute transmission efficiencies are quite similar. In this work, we also performed a numerical simulation to understand a physical behavior of each parameter under realistic experimental conditions and compared with the results obtained by the analytical solution. The numerical simulations were implemented in the same manner described our previous works in Ref. [12]. All the related key parameters used in the estimation are listed in Table. 1. From the numerical simulation, we obtained the spatial precisions of 6.66 nm in the DWP-based design and 12.71 nm in the grating-based design (FIG. 20C), while we observed similar spectral precisions as 3.61 nm in the DWP-based design and 3.42 nm in the grating-based design (FIG. 20D), which nicely have matched with the analytical solution. These results suggest that the proposed design allows not only for reduced system complexity but also better photon utilization, which potentially can facilitate the limited photon budget issues in sSMLM.

TABLE 3

List of parameters used in analytical solutions

| | σ (nm) | a (nm) | b (photons/pixel) | $n_{ro}$ (e-) | | |
|---|---|---|---|---|---|---|
| For Δx | 96 | 110 | 5 | 1.6 | | |
| | $s_\lambda$ (nm) | $s_y$ (nm) | $n_{bg}^2$ (photons/pixel) | $n_{ro}$ (e-) | Δλ (nm/pixel) | Δy (nm) |
| For $\sigma_\lambda$ | 20 | 96 | 5 | 1.6 | 6 | 110 |

Figure 21A:
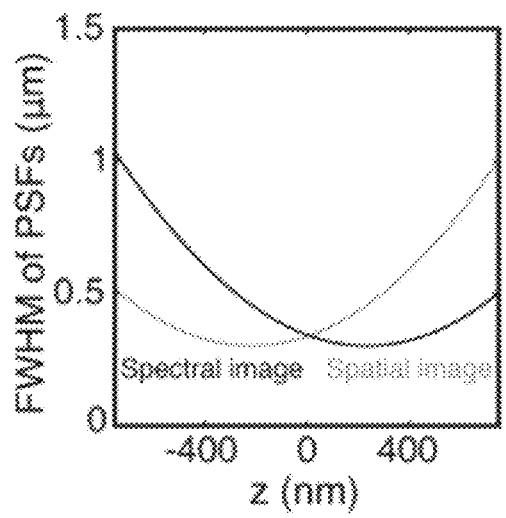
FIG. 21A. Depth calibration curve of biplane imaging.
Figure 21B:
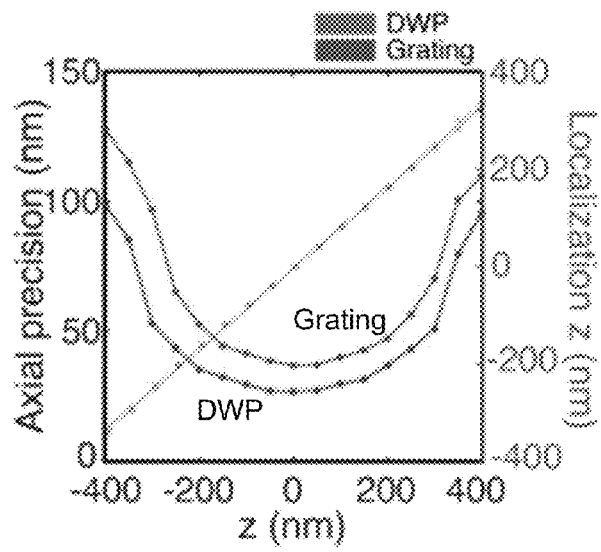
FIG. 21B. Theoretically estimated axial spatial precision of the grating-based and the proposed DWP-based designs.

We further extended the numerical simulation into 3D to estimate axial spatial precision of the proposed 3D sSMLM module. As shown in FIG. 19B, the proposed design using the off-the-shelf-optics has an optical path difference of ~4 mm between the spatial (IP1) and spectral (IP2) image planes, which can be converted to an axial separation of ~450 nm given a magnification of the objective lens according to Ref. [14]. Based on this axial separation, we first generated an ideal 3D calibration curve for biplane imaging, as shown in FIG. 21A, which shows the full width at the half maximum (FWHM) of PSFs along the y-axis in both spatial and spectral images. This calibration curve was used to generate PSFs at different depths as ground-truth. Using the generated PSFs, we estimated the axial precision of the biplane sSMLM system in the same manner previously reported our work in Ref. [8]. The other characteristic parameters used in this simulation are listed in Table 2. FIG. 21B shows the estimated axial precision (the left vertical axis) and the reconstructed localization z-position (the right vertical axis). As a result, we obtained the axial precision of 26.9 nm for the proposed DWP-based design and 36.8 nm for the grating-based design, respectively, at a 0-nm depth with a signal of 3000 photons and a background of 5-photons/pixel, as an example. This corresponds 27% improvement.

Here we demonstrated a compact 3D sSMLM module with DWP spectrometer and, though the simulations, we determined theoretically achievable spatial and spectral precisions. We also compared the results with those of the existing grating-based design. Finally, we validated its 3D spectroscopic single-molecule imaging capability using the realistic simulated data set as an example, which shows the potential to uncover rich information about single molecules for fundamental understanding of subcellular structures and nanomaterial properties. In particular, the proposed 3D sSMLM module eliminates alignment of additional discrete optical components, through manufacturing a single unit of the compound optical element. Thus, it ensures straightforward implementation and reliable operation of the 3D sSMLM system. Its compactness allows for an easy integration into the conventional fluorescence microscope system and make sSMLM broadly accessible by users in biology research community.

REFERENCES CORRESPONDING TO EXAMPLE 3

1. Z. Zhang, S. J. Kenny, M. Hauser, W. Li, and K. Xu, Nat Methods 12, 935-938 (2015).
2. M. J. Mlodzianoski, N. M. Curthoys, M. S. Gunewardene, S. Carter, and S. T. Hess, PLoS One 11, e0147506 (2016).
3. J. Comtet, E. Glushkov, V. Navikas, J. Feng, V. Babenko, S. Hofmann, K. Watanabe, T. Taniguchi, and A. Radenovic, Nano Letters 19, 2516-2523 (2019).
4. B. Dong, L. Almassalha, B. E. Urban, T. Q. Nguyen, S. Khuon, T. L. Chew, V. Backman, C. Sun, and H. F. Zhang, Nat Commun 7, 12290 (2016).
5. M. N. Bongiovanni, J. Godet, M. H. Horrocks, L. Tosatto, A. R. Carr, D. C. Wirthensohn, R. T. Ranasinghe, J. E. Lee, A. Ponjavic, J. V. Fritz, C. M. Dobson, D. Klenerman, and S. F. Lee, Nat Commun 7, 13544 (2016).

TABLE 4

List of parameters used in simulations

| Camera | Pixel size (μm) | QE @ 670 nm (%) | Readout noise (e-) | Background (photons) | Standard deviation of PSF (nm) | Precision | Signal (photons) | Iteration number | Spectral dispersion (nm/pixel) | Axial separation (nm) |
|---|---|---|---|---|---|---|---|---|---|---|
| Prime 95B | 11 | 85 | 1.6 | 5 | 96 | For lateral | 1000 | 300 | — | |
| | | | | | | For spectral | 1000 | 300 | 6 | |
| | | | | | | For axial | 3000 | 1000 | — | 450 |

Figure 21C:
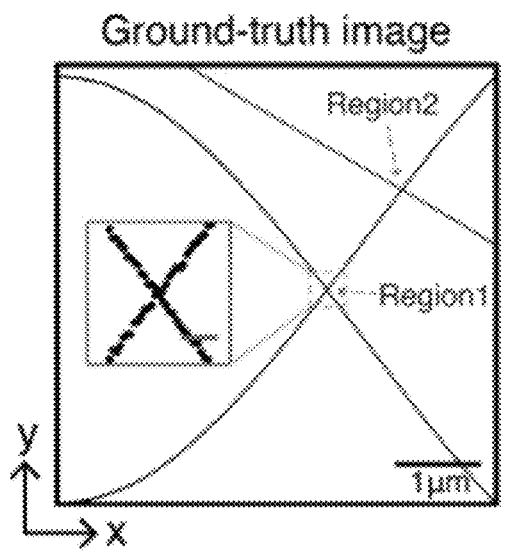
FIG. 21C. 2D projection of simulated 3D image with a labeling density of 100 molecules/μm along the line structure.
Figure 21D:
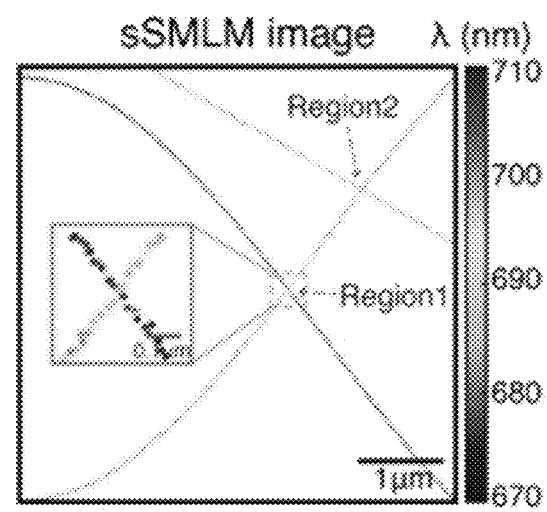
FIG. 21D. Reconstructed sSMLM image with pseudo colors corresponding to the SC of single molecules.
Figure 21E:
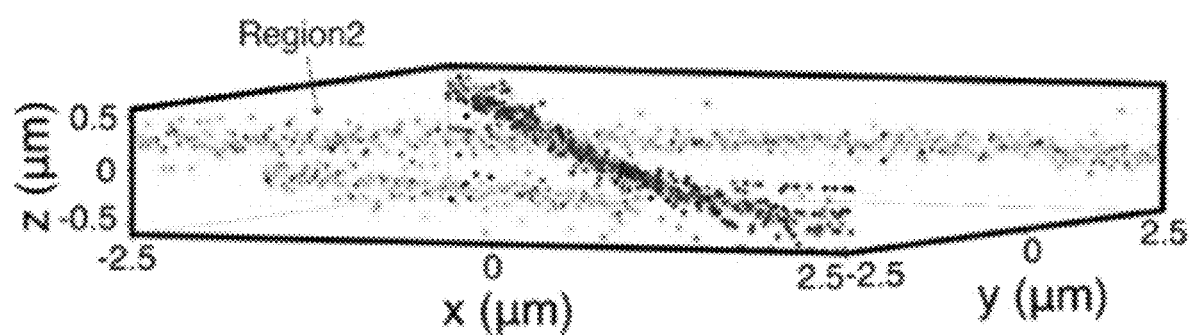
FIG. 21E. The corresponding 3D scatter plot.

To validate the 3D spectroscopic single-molecule imaging capability of the proposed 3D sSMLM module, we applied it to a realistic simulated data set, which comprises filaments in 3D (FIG. 21C), with a size of 5×5×0.8 μm³ and a labeling density of 100 molecules/μm along the line structure. FIG. 21D shows the computationally generated sSMLM image with pseudocolors corresponding to SCs of single molecules. Notably, we successfully distinguished two filaments labeled with different species near one of cross-sections (region 1 in FIGS. 21C and 21D) using SC, as shown in the inset of FIG. 21D, which is beyond the capability of existing SMLM technologies shown in the inset of FIG. 21C. Furthermore, the simultaneously acquired 3D information enables to clearly distinguish another cross-section (region 2 in FIGS. 21C-21E), as shown in FIG. 21E.

6. Y. Zhang, K.-H. Song, B. Dong, J. L. Davis, G. Shao, C. Sun, and H. F. Zhang, Appl. Opt. 58, 2248-2255 (2019).
7. J. L. Davis, Y. Zhang, S. Yi, F. Du, K. H. Song, E. A. Scott, C. Sun, and H. F. Zhang, Langmuir 36, 2291-2299 (2020).
8. K.-H. Song, Y. Zhang, G. Wang, C. Sun, and H. F. Zhang, Optica 6 (2019).
9. B. Dong, B. T. Soetikno, X. Chen, V. Backman, C. Sun, and H. F. Zhang, ACS Photonics 4, 1747-1752 (2017).
10. Y. Feng, P. A. Dalgarno, D. Lee, Y. Yang, R. R. Thomson, and A. H. Greenaway, Opt. Express 20, 20705-20714 (2012).
11. J. A. Kurvits, M. Jiang, and R. Zia, J Opt Soc Am A Opt Image Sci Vis 32, 2082-2092 (2015).
12. B. D. K. Song, C. Sun, and H. F. Zhang, Review of Scientific Instruments 89, 123703 (2018).

13. B. Rieger, and S. Stallinga, 15, 664-670 (2014).
14. Prabhat, S. Ram, E. S. Ward, and R. J. Ober, IEEE Trans Nanobioscience 3, 237-242 (2004).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A spectrometer for a microscope, the spectrometer comprising:
   a monolithic optic, the monolithic optic comprising:
      a beam splitter configured to split an incident light into a first beam and a second beam, wherein the first beam forms a spatial image at a first image plane, the first beam and the spatial image comprising spatial information; and
      a dual-wedge prism ("DWP") having a first dispersive optical device and a second dispersive optical device, the DWP being configured to receive the second beam, to spectrally disperse the second beam into a third beam, and to direct the third beam to a second image plane, wherein the second beam interacts with the first dispersive optical device and wherein the third beam exits the second dispersive optical device and forms a spectral image at the second image plane, the third beam and the spectral image comprising spectral information,
   wherein the first image plane and the second image plane are parallel, and
   wherein the first image plane and the second image plane are each independently perpendicular to an optical axis.

2. The spectrometer of claim 1, the monolithic optic further comprising a light-reflecting device configured to receive the second beam from the beam splitter and redirect the second beam to the DWP,
   wherein the DWP receives the second beam from the light-reflecting device, and
   wherein there is no air/dielectric interface in the monolithic optic between the beam splitter, the DWP, and the light-reflecting device.

3. The spectrometer of claim 1, wherein the first dispersive optical device is characterized by a refractive index that is equal to or within 0.1 of a refractive index of the second dispersive optical device at a same wavelength, and wherein the first dispersive optical device is characterized by a chromatic dispersion different from that of the second dispersive optical device.

4. The spectrometer of claim 2, wherein the first beam comprises a portion of the incident light that is transmitted by the beam splitter toward the first image plane, and wherein the second beam comprises a portion of the incident light that is reflected by the light-reflecting device onto the DWP.

5. The spectrometer of claim 2, wherein:
   the incident light is incident onto a first side of the beam splitter,
   the first beam exits the beam splitter at a third side of the beam splitter toward the first image plane,
   the second beam exits the beam splitter at a second side of the beam splitter,
   after the second beam exits the beam splitter, the second beam is incident onto a first side of the light-reflecting device and the second beam exits a second side of the light-reflecting device,
   after exiting the light-reflecting device, the second beam is incident onto a first side of the first dispersive optical device,
   photons from the second beam pass from a second side of the first dispersive optical device to a first side of the second dispersive optical device,
   the third beam exits at a second side of the second dispersive optical device,
   the second side of the beam splitter is adhered to the first side of the light-reflecting device, and
   the second side of the light-reflecting device is adhered to the first side of the first dispersive optical device.

6. The spectrometer of claim 1, the spectrometer comprising:
   a light-reflecting device configured to receive the first beam from the beam splitter and redirect first beam to the first image plane,
   wherein the DWP receives the second beam from the beam splitter.

7. The spectrometer of claim 2, wherein the first dispersive optical device is characterized by a refractive index that is different from a refractive index of the second dispersive optical device by an absolute value greater than 0.1 at a same wavelength, wherein the first beam comprises a portion of the incident light that is reflected by the beam splitter to the light-reflecting device, and wherein the second beam comprises a portion of the incident light that is transmitted by the beam splitter to the DWP.

8. The spectrometer of claim 6, wherein:
   the incident light is incident onto a first side of the beam splitter,
   the first beam exits the beam splitter at a second side of the beam splitter,
   the first beam is incident onto a first side of the light-reflecting device and the first beam exits a second side of the light-reflecting device toward the first image plane,
   the second beam exits the beam splitter at a third side of the beam splitter,
   the second beam is incident onto a first side of the first dispersive optical device,
   photons from the second beam pass from a second side of the first dispersive optical device to a first side of the second dispersive optical device,
   the third beam exits at a second side of the second dispersive optical device toward the second image plane,
   the second side of the beam splitter is adhered to the first side of the light-reflecting device, and
   the third side of the beam splitter is adhered to the first side of the first dispersive optical device.

9. The spectrometer of claim 1, wherein the beam splitter is a cube beam splitter, wherein the first dispersive optical device is a first wedge prism, and wherein the second dispersive optical device is a second wedge prism.

10. The spectrometer of claim 1, wherein each of the first beam and the third beam is independently parallel to the optical axis, and wherein the incident light is parallel to the optical axis.

11. The spectrometer of claim 1, further comprising:
a camera configured to capture the spatial image and the spectral image; or
a plurality of cameras each configured to capture the spatial image and/or the spectral image,
wherein the spatial image and the spectral image are captured simultaneously.

12. The spectrometer of claim 1, wherein the spectrometer does not comprise a grating.

13. The spectrometer of claim 1, wherein the first image plane and the second image plane are spatially separated along the optical axis by an image plane separation distance in a range of 3 to 6 mm.

14. The spectrometer of claim 1, wherein the spectrometer is configured to determine bi-plane three-dimensional information using the spatial image and the spectral image.

15. The spectrometer of claim 1, wherein, for each respective wavelength of a range of wavelengths, the third beam at the second image plane is characterized by a root-mean-square (RMS) wavefront error of less than or equal to 0.5 wave.

16. The spectrometer of claim 1, wherein, for a camera pixel size of a camera configured to capture the spectral image, the third beam at the second image plane is characterized by a spectral dispersion in a range of 3±0.5 nm/pixel to 6±0.5 nm/pixel.

17. The spectrometer of claim 1, wherein the first beam at the first image plane is characterized by a RMS radius at 450 nm of less than 0.5 µm.

18. The spectrometer of claim 1, wherein, for a particular photon budget for a camera configured to capture the spatial image, the spatial image is characterized by a spatial precision of 10 nm or less.

19. The spectrometer of claim 1, wherein, for a particular photon budget for a camera configured to capture the spectral image, the spectral image is characterized by a spectral precision of 5 nm or less.

20. The spectrometer of claim 11, wherein, for a photon budget of 3000 photons, bi-plane three-dimensional image information determined using the spatial image and the spectral image has an axial precision in a range of 30 nm or less.

* * * * *